(12) United States Patent
Gellett et al.

(10) Patent No.: US 8,907,133 B2
(45) Date of Patent: Dec. 9, 2014

(54) ELECTROLYTE COMPOSITIONS AND ELECTROCHEMICAL DOUBLE LAYER CAPACITORS FORMED THERE FROM

(71) Applicant: eSionic ES, Inc., Menlo Park, CA (US)

(72) Inventors: Wayne L. Gellett, Fremont, CA (US); Benjamin L. Rupert, Berkeley, CA (US); Levi J. Irwin, Alexandria, VA (US); Leanne Beer, San Francisco, CA (US); Shilpa A. Worlikar, Sunnyvale, CA (US); Steven Z. Shi, Santa Clara, CA (US)

(73) Assignee: eSionic ES, Inc., Menlo Park, CA (US)

( * ) Notice: Subject to any disclaimer, the term of this patent is extended or adjusted under 35 U.S.C. 154(b) by 0 days.

(21) Appl. No.: 13/706,233

(22) Filed: Dec. 5, 2012

(65) Prior Publication Data

US 2013/0095351 A1   Apr. 18, 2013

Related U.S. Application Data

(63) Continuation-in-part of application No. 12/501,913, filed on Jul. 13, 2009, now Pat. No. 8,586,797.

(60) Provisional application No. 61/080,650, filed on Jul. 14, 2008.

(51) Int. Cl.

| | | |
|---|---|---|
| *C07F 9/02* | (2006.01) | |
| *H01M 12/00* | (2006.01) | |
| *H01L 29/08* | (2006.01) | |
| *H01L 51/40* | (2006.01) | |
| *H01G 9/00* | (2006.01) | |
| *H01M 10/0568* | (2010.01) | |
| *H01G 11/62* | (2013.01) | |
| *H01G 9/035* | (2006.01) | |
| *H01G 9/20* | (2006.01) | |
| *H01M 16/00* | (2006.01) | |
| *H01M 10/052* | (2010.01) | |

(52) U.S. Cl.
CPC .............. *H01G 9/035* (2013.01); *Y02E 60/13* (2013.01); *Y02E 10/542* (2013.01); *H01M 10/0568* (2013.01); *H01G 9/155* (2013.01); *Y02T 10/7022* (2013.01); *H01G 11/62* (2013.01); *Y02E 60/12* (2013.01); *H01G 9/2013* (2013.01); *Y02T 10/7011* (2013.01); *H01M 16/003* (2013.01); *H01M 10/052* (2013.01)
USPC ......... 568/9; 438/99; 429/9; 361/502; 257/40

(58) Field of Classification Search
USPC ................ 568/9; 257/40; 438/99; 361/327
See application file for complete search history.

(56) References Cited

U.S. PATENT DOCUMENTS

| | | |
|---|---|---|
| 3,036,132 A | 5/1962 | Becker |
| 4,482,616 A | 11/1984 | Connolly et al. |
| 5,188,914 A | 2/1993 | Blomgren et al. |
| 5,648,125 A | 7/1997 | Cane |
| 5,827,602 A | 10/1998 | Koch et al. |
| 5,965,054 A | 10/1999 | Mcewen et al. |
| 5,965,299 A | 10/1999 | Khan et al. |
| 5,985,785 A | 11/1999 | Lane et al. |
| 6,026,010 A | 2/2000 | Ema et al. |
| 6,208,553 B1 | 3/2001 | Gryko et al. |
| 6,212,093 B1 | 4/2001 | Lindsey |
| 6,218,318 B1 | 4/2001 | Ohkura et al. |
| 6,221,653 B1 | 4/2001 | Caren et al. |
| 6,272,038 B1 | 8/2001 | Clausen et al. |
| 6,284,317 B1 | 9/2001 | Laibinis et al. |
| 6,324,091 B1 | 11/2001 | Gryko et al. |
| 6,330,108 B1 | 12/2001 | Nishikouji et al. |
| 6,365,301 B1 | 4/2002 | Michot et al. |
| 6,381,169 B1 | 4/2002 | Bocian et al. |
| 6,406,605 B1 | 6/2002 | Moles |
| 6,440,560 B1 | 8/2002 | Gates et al. |
| 6,451,942 B1 | 9/2002 | Li et al. |
| 6,484,394 B1 | 11/2002 | Heo et al. |
| 6,579,343 B2 | 6/2003 | Brennecke et al. |
| 6,599,623 B2 | 7/2003 | Gates et al. |

(Continued)

FOREIGN PATENT DOCUMENTS

| | | |
|---|---|---|
| WO | 01/03126 | 1/2001 |
| WO | 01/87900 | 11/2001 |

(Continued)

OTHER PUBLICATIONS

Arnold et al., "Mixed Phthalocyaninato-Porphyrinato Europium(III) Triple-decker Sandwich Complexes Containing a Conjugated Dimeric Porphyrin Ligand," Chemistry Letters, 1999, pp. 483-484.

(Continued)

*Primary Examiner* — Sikarl Witherspoon
(74) *Attorney, Agent, or Firm* — Nixon Peabody LLP

(57) ABSTRACT

The invention generally encompasses phosphonium ionic liquids, salts, compositions and their use in many applications, including but not limited to: as electrolytes in electronic devices such as memory devices including static, permanent and dynamic random access memory, as electrolytes in energy storage devices such as batteries, electrochemical double layer capacitors (EDLCs) or supercapacitors or ultracapacitors, electrolytic capacitors, as electrolytes in dye-sensitized solar cells (DSSCs), as electrolytes in fuel cells, as a heat transfer medium, among other applications. In particular, the invention generally relates to phosphonium ionic liquids, salts, compositions, wherein the compositions exhibit superior combination of thermodynamic stability, low volatility, wide liquidus range, ionic conductivity, and electrochemical stability. The invention further encompasses methods of making such phosphonium ionic liquids, salts, compositions, operational devices and systems comprising the same.

35 Claims, 48 Drawing Sheets

(56) References Cited

U.S. PATENT DOCUMENTS

| | | | |
|---|---|---|---|
| 6,642,376 B2 | 11/2003 | Lindsey et al. |
| 6,657,884 B2 | 12/2003 | Bocian et al. |
| 6,674,121 B2 | 1/2004 | Misra et al. |
| 6,728,129 B2 | 4/2004 | Lindsey et al. |
| 6,737,107 B2 | 5/2004 | Gates et al. |
| 6,777,516 B2 | 8/2004 | Li et al. |
| 6,828,581 B2 | 12/2004 | Zangmeister et al. |
| 6,855,950 B2 | 2/2005 | McCreery |
| 6,891,248 B2 | 5/2005 | Akram et al. |
| 6,900,382 B2 | 5/2005 | Chittibabu et al. |
| 6,919,128 B2 | 7/2005 | McCreery |
| 6,943,054 B2 | 9/2005 | Bocian et al. |
| 7,005,237 B2 | 2/2006 | Lindsey |
| 7,025,716 B1 | 4/2006 | Meloul et al. |
| 7,026,051 B2 | 4/2006 | Schauer et al. |
| 7,032,277 B2 | 4/2006 | Rolla et al. |
| 7,061,791 B2 | 6/2006 | Bocian et al. |
| 7,101,591 B2 | 9/2006 | Hayashi et al. |
| 7,129,005 B2 | 10/2006 | Wensley et al. |
| 7,136,275 B2 | 11/2006 | Koning et al. |
| 7,141,299 B2 | 11/2006 | Mccreery |
| 7,217,769 B2 | 5/2007 | Zamora et al. |
| 7,223,628 B2 | 5/2007 | Bocian |
| 7,307,870 B2 | 12/2007 | Kuhr et al. |
| 7,324,385 B2 | 1/2008 | Mobley et al. |
| 7,332,599 B2 | 2/2008 | Yu et al. |
| 7,348,206 B2 | 3/2008 | Bocian et al. |
| 7,369,952 B2 | 5/2008 | Petrich et al. |
| 7,452,572 B1 | 11/2008 | Bocian et al. |
| 7,695,756 B2 | 4/2010 | Gallo et al. |
| 8,525,155 B2 | 9/2013 | Hawkins et al. |
| 8,586,797 B2 | 11/2013 | Hawkins et al. |
| 8,586,798 B2 | 11/2013 | Hawkins et al. |
| 2002/0055045 A1 | 5/2002 | Michot et al. |
| 2002/0076714 A1 | 6/2002 | Kuhr et al. |
| 2002/0110739 A1 | 8/2002 | McEwen et al. |
| 2002/0154535 A1 | 10/2002 | Bocian et al. |
| 2002/0180446 A1 | 12/2002 | Kuhr et al. |
| 2003/0082444 A1 | 5/2003 | Kuhr et al. |
| 2003/0092896 A1 | 5/2003 | Lindsey et al. |
| 2003/0109056 A1 | 6/2003 | Vossmeyer et al. |
| 2003/0111670 A1 | 6/2003 | Misra et al. |
| 2003/0169618 A1 | 9/2003 | Lindsey et al. |
| 2004/0094741 A1 | 5/2004 | Sato et al. |
| 2004/0106823 A1 | 6/2004 | Roberstson et al. |
| 2004/0115524 A1 | 6/2004 | Misra et al. |
| 2004/0120180 A1 | 6/2004 | Rotenberg et al. |
| 2004/0150465 A1 | 8/2004 | Nishida et al. |
| 2004/0190429 A1 | 9/2004 | McCreery |
| 2004/0191536 A1 | 9/2004 | Heimann et al. |
| 2004/0248428 A1 | 12/2004 | Bureau et al. |
| 2004/0254383 A1 | 12/2004 | Yu et al. |
| 2005/0039790 A1 | 2/2005 | Chittibabu et al. |
| 2005/0041494 A1 | 2/2005 | Bocian et al. |
| 2005/0048691 A1 | 3/2005 | Bocian et al. |
| 2005/0062097 A1 | 3/2005 | Misra et al. |
| 2005/0072462 A1 | 4/2005 | Kang et al. |
| 2005/0143517 A1 | 6/2005 | Schmidt |
| 2005/0162895 A1 | 7/2005 | Kuhr et al. |
| 2005/0175898 A1 | 8/2005 | Yong et al. |
| 2005/0181195 A1 | 8/2005 | Dubrow |
| 2005/0185447 A1 | 8/2005 | Kuhr et al. |
| 2005/0207208 A1 | 9/2005 | Bocian et al. |
| 2005/0243597 A1 | 11/2005 | Gallo et al. |
| 2005/0270820 A1 | 12/2005 | Mobley et al. |
| 2006/0081950 A1 | 4/2006 | Kuhr et al. |
| 2006/0092687 A1 | 5/2006 | Kuhr et al. |
| 2006/0103018 A1 | 5/2006 | Bureau et al. |
| 2006/0108320 A1 | 5/2006 | Lazovsky et al. |
| 2006/0141156 A1 | 6/2006 | Viel et al. |
| 2006/0176646 A1 | 8/2006 | Sato et al. |
| 2006/0195296 A1 | 8/2006 | Petrich et al. |
| 2006/0209587 A1 | 9/2006 | Bocian et al. |
| 2006/0210873 A1 | 9/2006 | Hollenkamp et al. |
| 2006/0211236 A1 | 9/2006 | Bureau et al. |
| 2006/0217568 A1* | 9/2006 | Ignatyev et al. ............... 558/54 |
| 2006/0223995 A1* | 10/2006 | Uchimura et al. ............. 544/59 |
| 2007/0000865 A1 | 1/2007 | Yoo et al. |
| 2007/0051459 A1 | 3/2007 | Yamano et al. |
| 2007/0066090 A1 | 3/2007 | Ono et al. |
| 2007/0108438 A1* | 5/2007 | Lindsey et al. ............... 257/40 |
| 2007/0123678 A1 | 5/2007 | Bocian et al. |
| 2007/0125422 A1 | 6/2007 | Hammami et al. |
| 2007/0148421 A1 | 6/2007 | Sohn et al. |
| 2007/0212615 A1 | 9/2007 | Jost et al. |
| 2008/0008930 A1 | 1/2008 | Matsumoto et al. |
| 2010/0003597 A1 | 1/2010 | Tsunashima et al. |
| 2010/0006794 A1 | 1/2010 | Hawkins et al. |
| 2010/0006797 A1 | 1/2010 | Hawkins et al. |
| 2010/0009255 A1 | 1/2010 | Hawkins et al. |
| 2010/0029970 A1 | 2/2010 | West et al. |
| 2010/0068604 A1 | 3/2010 | Hawkins et al. |
| 2010/0099030 A1 | 4/2010 | Nishida et al. |
| 2010/0118598 A1 | 5/2010 | Hawkins et al. |
| 2011/0064988 A1 | 3/2011 | Yu |
| 2011/0151317 A1 | 6/2011 | Giroud et al. |
| 2012/0082901 A1 | 4/2012 | Schmidt et al. |
| 2012/0082903 A1 | 4/2012 | Zhang et al. |
| 2013/0092866 A1 | 4/2013 | Rupert et al. |
| 2013/0095392 A1 | 4/2013 | Shin et al. |

FOREIGN PATENT DOCUMENTS

| | | |
|---|---|---|
| WO | 03/020843 | 3/2003 |
| WO | 2005/086826 | 9/2005 |
| WO | 2005/104288 | 11/2005 |
| WO | 2006/070545 | 7/2006 |
| WO | 2006/111712 | 10/2006 |
| WO | 2008/032688 | 3/2008 |
| WO | 2010/009083 | 1/2010 |

OTHER PUBLICATIONS

Chen, H. et al., "Phase Characterization and Properties of Completely Saturated Quaternary Phosphonium Salts. Ordered, Room-Temperature Ionic Liquids," Chemical Matter, 2002, 14, pp. 4063-4072.

Connelly et al., "Chemical Redox Agents for Organometallic Chemistry," Chem. Rev. 1996, 96, pp. 877-910.

Connelly, N., et al., "The Electron-Transfer Reactions of Mononuclear Organotransition Metal Complexes," Advances in Organometallic Chemistry, vol. 23, 1984, pp. 1-93.

Del Sesto, R., et al., "Tetraalkylphosphonium-based Ionic Liquids," Journal of Organometallic Chemistry, 690, 2005, pp. 2536-2542.

Duffy, N., et al., "Macroelectrode Voltammetry in Toluene Using a Phosphonium-Phosphate Ionic Liquid as the Supporting Electrolyte," Electrochemistry Communications, 8, 2006. pp. 892-898.

Gassman, P. et al., "(Trifluoromethyl) cyclopentadienide: A Powerful Electron-Withdrawing Ligand for Transition-Metal Complexes," J. Am. Chem. Soc. 108:1986, pp. 4228-4229.

Geiger, W. et al., "The Electron-Transfer Reactions of Polynuclear Organotransition Metal Complexes," Advances in Organometallic Chenstry, vol. 24, 1985, pp. 87-130.

Jiang, J. et al , "Double-decker Yttrium (III) Complexes with Phthalocyaninato and Porphyrinato Ligands," J. Porphyrins Phthalocyanines, vol. 3, 1999, pp. 322-328.

Kuhr, W., et al., "Molecular Memories Based on a CMOS Platform," MRS Bulletin, Nov. 2004, 5 pages.

Li, F. et al., "Effects of Central Metal Ion (Mg, Zn) and Solvent on Singlet Excited-Stae Energy Flow in Porphyrin-based Nanostructures," J. Matter Chem., vol. 7: 1997, pp. 1245-1262.

Ng, D. et al., "Sandwich-type Heteroleptic Phthalocyaninato and Porphyrinato Metal Complexes," (1997) Chem. Society Reviews, vol. 26, pp. 433-442.

Nippon Chemical Industrial (Brochure): "Room Temperature Ionic Liquids": Quaternary Phosphonium Ionic Liquids, May 23, 2011, 3 pages.

Ramirez, R., et al., "Electrochemical Aspects of Asymmetric Phosphonium Ionic Liquids," Journal of the Electrochemical Society, vol. 154, No. 2, 2007, pp. B229-B233.

(56) References Cited

OTHER PUBLICATIONS

Robbins, J.L., et al., "Syntheses and Electronic Structures of Decamethylmetallocenes," J. Am. Chem. Soc., vol. 104, 1982, pp. 1882-1893.
Roth, K. et al., "Molecular Approach Toward Information Storage Based on the Redox Properties of Porphyrins in Self-Assembled Monolayers," J. Vac. Sci. Technol. B, 18 (5), Sep./Oct. 2000, pp. 2359-2364.
Roth. K et al "Measurements of Electron-Transfer Rates of Charge-Storage Molecular Monolayers on Si(100). Toward Hybrid Molecular/Semiconductor Information Storage Devices," J. Am. Chem. Soc., 125, 2003, pp. 505-517.
Seth, J., et al., "Soluble Synthetic Multiporphyrin Arrays. 3. Static Spectroscopic and Electrochemical Probes of Electronic Communication," J. Am. Chem. Soc., 118, 1996, pp. 11194-11207.
Seth, J., et al., "Investigation of Electronic Communication in Multi-Porphyrin Light-harvesting Arrays," J. Am. Chem. Soc., 116, 1994, pp. 10578-10592.
Strachan, J-P. et al., "Synthesis and Characterization of Tetrachlorodiarylethyne-Linked Porphyrin Dimers. Effects of Linker Architecture on Intradimer Electronic Communication," Inorg Chem, 37, 1998, pp. 1191-1201.
Strachan, J-P, "Effects of Orbital Ordering on Electronic Communication Multiporphyrin Arrays," J. Am. Chem. Soc., 119, 1997, pp. 11191-11201.
Tsunashima, K. et al., "Physical and electrochemical properties of low-viscosity phosphonium ionic liquids as potential electrolytes," Electrochemistry Communications, vol. 9, 2007, pp. 2353-2358.
Vaughan, J., et al., "Density, Viscosity and Conductivity of Tetra-alkyl Phosphonium Ionic Liquids," International Symposium on Electrochemistry in Mineral and Metal Processing, May 7-12, 2006, 12 pages.
Yang, S., et al., "Ground and Excited State Electronic Properties of Halogenated Tetraarylporphyrins. Tuning the Building Blocks for Porphyrin-Based Photonic Devices," J. Porphyrins Phthalocyanines, 3, 1999, pp. 117-147.
Yang, S., et al., "Interplay of Orbital Tuning and Linker Location in Controling Electronic Communication in Porphyrin Arrays," J. Am. Chem. Soc., 121, 1999, pp. 4008-4018.
Office Action in U.S. Appl. No. 12/501,913, mailed Jan. 20, 2012.
Office Action in U.S. Appl. No. 12/501,913, mailed Sep. 11, 2012.
Office Action in U.S. Appl. No. 12/501,913, mailed Apr. 4, 2013.
Notice of Allowance in U.S. Appl. No. 12/501,913, mailed Jul. 8, 2013.
Office Action in U.S. Appl. No. 12/501,946, mailed May 13, 2011.
Office Action in U.S. Appl. No. 12/501,946, mailed Jan. 27, 2012.
Office Action in U.S. Appl. No. 12/501,946, mailed Oct. 3, 2012.
Office Action in U.S. Appl. No. 12/501,946, mailed Jul. 30, 2013.
Notice of Allowance in U.S. Appl. No. 12/501,946, mailed Nov. 18, 2013.
U.S. Appl. No. 14/214,574, filed Mar. 14, 2014.
Office Action in U.S. Appl. No. 12/502,078, mailed Aug. 29, 2012.
Notice of Allowance in U.S. Appl. No. 12/502,078, mailed Apr. 19, 2013.
Office Action in U.S. Appl. No. 12/502,113, mailed Dec. 22, 2011.
Office Action in U.S. Appl. No. 12/502,113, mailed Jul. 23, 2012.
Office Action in U.S. Appl. No. 12/502,113, mailed Jun. 4, 2013.
Office Action in U.S. Appl. No. 12/502,113, mailed Apr. 2, 2014.
Notice of Allowance in U.S. Appl. No. 12/502,113, mailed May 22, 2014.
Office Action in U.S. Appl. No. 12/502,152, mailed Jan. 20, 2012.
Office Action in U.S. Appl. No. 12/502,152, mailed Sep. 11, 2012.
Office Action in U.S. Appl. No. 12/502,152, mailed Apr. 4, 2013.
Notice of Allowance in U.S. Appl. No. 12/502,152, mailed Jul. 9, 2013.
Office Action in U.S. Appl. No. 13/706,207, mailed Feb. 4, 2014.
Notice of Allowance in U.S. Appl. No. 13/706,207, mailed Jun. 27, 2014.
Office Action in U.S. Appl. No. 13/706,233, mailed Jan. 27, 2014.
International Search Report and Written Opinion for International Application No. PCT/US2009/50475 dated Sep. 8, 2009.
International Preliminary Report on Patentability for International Application No. PCT/US2009/50475, mailed Jan. 27, 2011.
International Search Report for International Application No. PCT/US2013/065751, mailed Dec. 27, 2013.
International Search Report for International Application No. PCT/US2013/065784, mailed Feb. 6, 2014.
International Search Report for International Application No. PCT/US2013/065788, mailed Feb. 17, 2014.
Office Action and Search Report in Taiwanese Application No. 98123750, dated Nov. 11, 2013.
Office Action and Search Report in Chinese Application No. 200980135853.3, mailed Jan. 14, 2013.
Search Report in Chinese Application No. 200980135853.3, mailed Dec. 17, 2012.
Decision of Rejection in Chinese Application No. 200980135853.3, mailed Jan. 27, 2014.

* cited by examiner

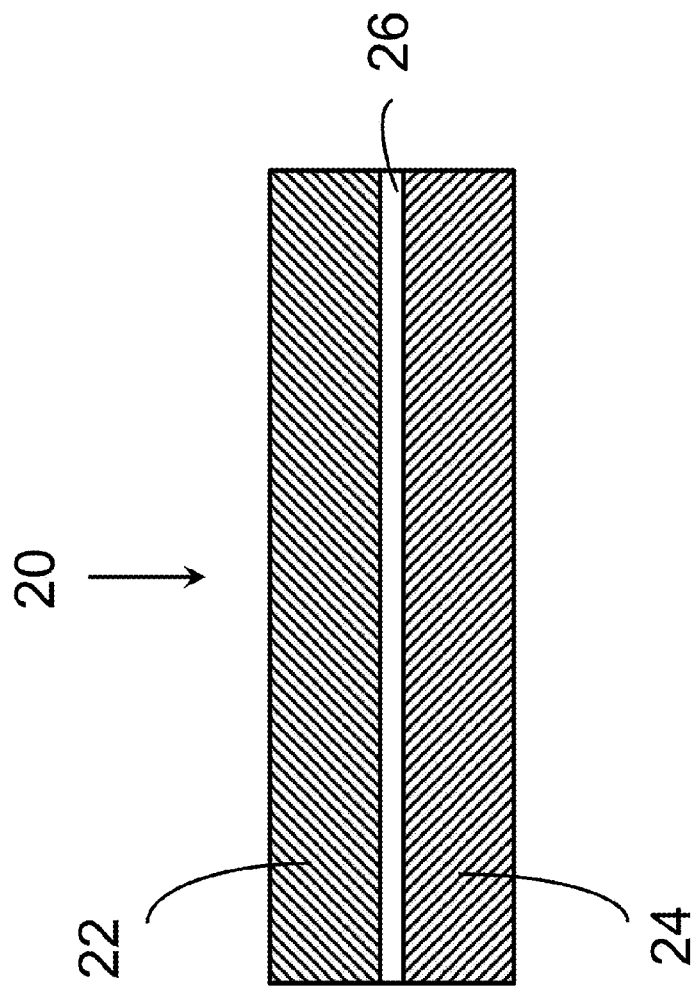

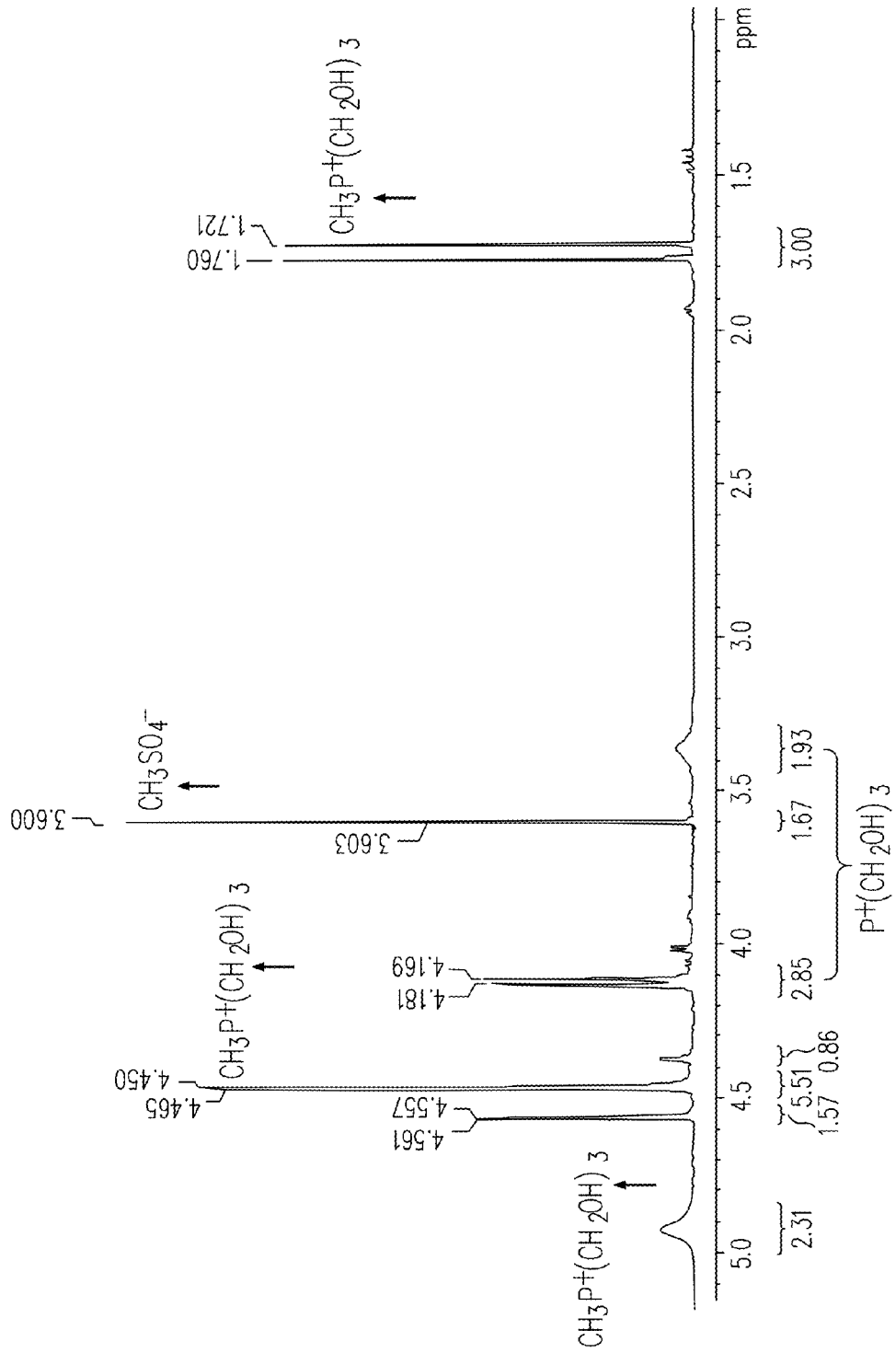

ELECTROLYTE COMPOSITIONS AND ELECTROCHEMICAL DOUBLE LAYER CAPACITORS FORMED THERE FROM

CROSS REFERENCE TO RELATED APPLICATIONS

This application is a Continuation-In-Part (CIP) application of U.S. patent application Ser. No. 12/501,913 filed on Jul. 13, 2009, which claims the benefit of, and priority to, U.S. Provisional Patent Application Ser. No. 61/080,650 filed on Jul. 14, 2008, the entire disclosure of both of which is incorporated by reference herein.

FIELD OF THE INVENTION

The invention generally encompasses electrolyte compositions based on phosphonium ionic liquids, salts, compositions and their use in many applications, including but not limited to: as electrolytes in electronic devices such as memory devices including static, permanent and dynamic random access memory, as electrolytes in energy storage devices such as batteries, electrochemical double layer capacitors (EDLCs) or supercapacitors or ultracapacitors, electrolytic capacitors, as electrolytes in dye-sensitized solar cells (DSSCs), as electrolytes in fuel cells, as a heat transfer medium, high temperature reaction and/or extraction media, among other applications. In particular, the invention relates to phosphonium ionic liquids, salts, compositions and molecules possessing structural features, wherein the compositions exhibit desired combination of at least two or more of: thermodynamic stability, low volatility, wide liquidus range, and ionic conductivity. The invention further encompasses methods of making such phosphonium ionic liquids, salts, compositions and molecules, and operational devices and systems comprising the same.

BACKGROUND OF THE INVENTION

Ionic liquids have received significant attention due in part to their wide potential use and application. The term "ionic liquid" is commonly used for salts whose melting point is relatively low (at and below 100° C.). Salts that are liquid at room temperature are commonly called room-temperature ionic liquids. Early investigators employed ionic liquids based on dialkylimidazolium salts. For example, Wilkes et. al developed ionic liquids based on dialkylimidazolium salts for use with an aluminum metal anode and chlorine cathode in an attempt to create a battery. J. Wilkes, J. Levisky, R. Wilson, C. Hussey, Inorg. Chem., 21, 1263 (1982).

Some of the most widely studied and commonly used ionic liquids are based on pyridinium salts, with N— alkylpyridinium and N,N'-dialkylimidazolium finding significant use. Pyridinium based ionic liquids, including N-alkyl-pyridinium and N,N-dialkylimidazolium, and nitrogen-based ionic liquids generally possess thermodynamic stabilities limited to 300° C., or less, are readily distillable, and tend to have measurable vapor pressures at temperatures significantly less than 200° C. Such properties limit their usefulness, as well as their applications. For example, such ionic liquids are susceptible to decomposition during back end of line (BEOL) thermal processing. Additionally, such ionic liquids are also decomposed during other heat-transfer processing steps which often subject the ionic liquids to continuous thermal cycling to temperatures exceeding 300° C.

The diverse nature of ionic liquids continues to be explored, and additional uses of ionic liquids have been considered. For example, electrochemical methods and applications are in need of electrolytes to enhance conductivity in a variety of devices and applications. Recent studies have been conducted in the area of room temperature ionic liquids as a possible alternative to conventional solvent based electrolytes.

While developments have been made, it is apparent that a continuing need exists for new developments in ionic liquids, salts, and electrolyte compositions and for materials and uses in which the electrolytes may be employed for use in electrochemical double layer capacitors, lithium metal and lithium ion batteries, fuel cells, dye-sensitized solar cells and molecular memory devices.

SUMMARY OF THE INVENTION

The invention broadly encompasses phosphonium ionic liquids, salts, compositions and their use in many applications, including but not limited to: as electrolytes in electronic devices such as memory devices including static, permanent and dynamic random access memory, as electrolytes in energy storage devices such as batteries, electrochemical double layer capacitors (EDLCs) or supercapacitors or ultracapacitors, electrolytic capacitors, as electrolytes in dye-sensitized solar cells (DSSCs), as electrolytes in fuel cells, as a heat transfer medium, high temperature reactions and/or extraction media, among other applications. In particular, the invention relates to phosphonium ionic liquids, salts, compositions and molecules possessing structural features, wherein the compositions exhibit desired combinations of at least two or more of: thermodynamic stability, low volatility, wide liquidus range and ionic conductivity.

In one aspect, an ionic liquid composition is provided, comprising: one or more phosphonium based cations of the general formula:

$$R^1R^2R^3R^4P$$

wherein: $R^1$, $R^2$, $R^3$ and $R^4$ are optional and each independently a substituent group; and one or more anions. In some embodiments $R^1$, $R^2$, $R^3$ and $R^4$ are each independently a different alkyl group comprised of 2 to 14 carbon atoms. In some embodiments, at least one of $R^1$, $R^2$, $R^3$ and $R^4$ is an aliphatic, heterocyclic moiety. Alternatively, at least one of $R^1$, $R^2$, $R^3$ and $R^4$ is an aromatic, heterocyclic moiety. In other embodiments, $R^1$ and $R^2$ are the same and are comprised of: tetramethylene phospholane, pentamethylele phosphorinane, tetramethinyl phosphole, phospholane or phosphorinane. In another embodiment, $R^2$, $R^3$ and $R^4$ are the same and are comprised of: phospholane, phosphorinane or phosphole.

In another embodiment, an ionic liquid composition is provided, comprising one or more phosphonium based cations, and one or more anions, wherein the ionic liquid composition exhibits thermodynamic stability greater than 375° C., a liquidus range greater than 400° C., and ionic conductivity up to 10 mS/cm at room temperature In another aspect, the invention encompasses electrolyte compositions comprised of phosphonium based cations with suitable anions. In some embodiments, the term "electrolyte" or "electrolyte solution" or "electrolyte composition" or "ionic electrolyte" or "ion conducting electrolyte" or "ion conducting composition" or "ionic composition" is used and is herein defined as any one or more of: (a) an ionic liquid, (b) a room temperature ionic liquid, (c) one or more salts dissolved in at least one solvent, and (d) one or more salts dissolved in at least one solvent together with at least one polymer to form a gel electrolyte. Additionally, the one or more salts are defined to include: (a) one or more salts that are a solid at a temperature of 100° C. and below, and (b) one or more salts that are a liquid at a temperature of 100° C. and below.

In another embodiment, electrolyte compositions are provided and are comprised of: one or more salts dissolved in a solvent, the one or more salts comprising one or more phosphonium based cations of the general formula:

$$R^1R^2R^3R^4P \qquad (1)$$

and one or more anions, and wherein: $R^1$, $R^2$, $R^3$ and $R^4$ are each independently a substituent group, such as but not limited to an alkyl group as described below. In some embodiments $R^1$, $R^2$, $R^3$ and $R^4$ are each independently an alkyl group comprised of 1 to 6 carbon atoms, more usually 1 to 4 carbon atoms. Any one or more of the salts may be liquid or solid at a temperature of 100° C. and below. In some embodiments, a salt is comprised of one cation and one anion pair. In other embodiments, a salt is comprised of one cation and multiple anions. In other embodiments, a salt is comprised of one anion and multiple cations. In further embodiments, a salt is comprised of multiple cations and multiple anions.

In another embodiment, the electrolyte composition further comprises one or more conventional, non-phosphonium salts. In some embodiments the electrolyte composition may be comprised of conventional salts, and wherein the phosphonium based ionic liquids or salts disclosed herein are additives. In some embodiments electrolyte composition is comprised of phosphonium based ionic liquids or salts and one or more conventional salts, present at a mole (or molar) ratio in the range of 1:100 to 1:1, phosphonium based ionic liquid or salt: conventional salt. Examples of the conventional salts include but are not limited to salts which are comprised of one or more cations selected from the group consisting of: tetraalkylammonium such as $(CH_3CH_2)_4N^+$, $(CH_3CH_2)_3(CH_3)N^+$, $(CH_3CH_2)_2(CH_3)_2N^+$, $(CH_3CH_2)(CH_3)_3N^+$, $(CH_3)_4N^+$, imidazolium, pyrazolium, pyridinium, pyrazinium, pyrimidinium, pyridazinium, pyrrolidinium and one or more anions selected from the group consisting of: $ClO_4^-$, $BF_4^-$, $CF_3SO_3^-$, $PF_6^-$, $AsF_6^-$, $SbF_6^-$, $(CF_3SO_2)_2N^-$, $(CF_3CF_2SO_2)_2N^-$, $(CF_3SO_2)_3C^-$. In some embodiments, the one or more conventional salts include but not limited to: tetraethylammonium tetrafluorborate (TEABF$_4$), triethylmethylammonium tetrafluoroborate (TEMABF$_4$), 1-ethyl-3-methylimidazolium tetrafluoroborate (EMIBF$_4$), 1-ethyl-1-methylpyrrolidinium tetrafluoroborate (EMPBF$_4$), 1-ethyl-3-methylimidazolium bis(trifluoromethanesulfonyl)imide (EMIIm), 1-ethyl-3-methylimidazolium hexafluorophosphate (EMIPF$_6$). In some embodiments, the one or more conventional salts are lithium based salts including but not limited to: lithium hexafluorophosphate (LiPF$_6$), lithium tetrafluoroborate (LiBF$_4$), lithium perchlorate (LiClO$_4$), lithium hexafluoroarsenate (LiAsF$_6$), lithium trifluoromethanesulfonate or lithium triflate (LiCF$_3$SO$_3$), lithium bis(trifluoromethanesulfonyl)imide (Li(CF$_3$SO$_2$)$_2$N or LiIm), and lithium bis(pentafluoromethanesulfonyl)imide (Li(CF$_3$CF$_2$SO$_2$)$_2$N or LiBETI).

Further aspects of the invention provide a battery, comprising: a positive electrode, a negative electrode, a separator between said positive and negative electrode; and an electrolyte. The electrolyte is comprised of an ionic liquid composition or one or more salts dissolved in a solvent, comprising: one or more phosphonium based cations of the general formula:

$$R^1R^2R^3R^4P$$

wherein: $R^1$, $R^2$, $R^3$ and $R^4$ are each independently a substituent group; and one or more anions. In one embodiment, the electrolyte is comprised of an ionic liquid having one or more phosphonium based cations, and one or more anions, wherein the ionic liquid composition exhibits thermodynamic stability up to 375° C., a liquidus range greater than 400° C., and ionic conductivity of at least 1 mS/cm, or at least 5 mS/cm, or at least 10 mS/cm at room temperature. In another embodiment, the electrolyte is comprised of one or more salts having one or more phosphonium based cations, and one or more anions dissolved in a solvent, wherein the electrolyte composition exhibits ionic conductivity of at least 5 mS/cm, or at least 10 mS/cm, or at least 15 mS/cm, or at least 20 mS/cm, or at least 30 mS/cm, or at least 40 mS/cm, or at least 50 mS/cm, or at least 60 mS/cm at room temperature. In a further aspect, the phosphonium electrolyte exhibits reduced flammability as compared to conventional electrolytes, and thus improves the safety of battery operation. In an additional aspect, the phosphonium ionic liquid or salt can be used as an additive to facilitate the formation of a solid electrolyte interphase (SEI) layer or electrode protective layer. The SEI layer may widen the electrochemical stability window, suppress battery degradation or decomposition reactions and hence improve battery cycle life.

Further aspects of the invention provide an electrochemical double layer capacitor (EDLC), comprising: a positive electrode, a negative electrode, a separator between said positive and negative electrode; and an electrolyte. The electrolyte is comprised of an ionic liquid composition or one or more salts dissolved in a solvent, comprising: one or more phosphonium based cations of the general formula:

$$R^1R^2R^3R^4P$$

wherein: $R^1$, $R^2$, $R^3$ and $R^4$ are each independently a substituent group; and one or more anions. In one embodiment, the electrolyte is comprised of an ionic liquid having one or more phosphonium based cations, and one or more anions, wherein the ionic liquid composition exhibits thermodynamic stability up to 375° C., a liquidus range greater than 400° C., and ionic conductivity of at least 1 mS/cm, or at least 5 mS/cm, or at least 10 mS/cm at room temperature. In another embodiment, the electrolyte is comprised of one or more salts having one or more phosphonium based cations, and one or more anions dissolved in a solvent, wherein the electrolyte composition exhibits ionic conductivity of at least at least 5 mS/cm, or at least 10 mS/cm, or at least 15 mS/cm, or at least 20 mS/cm, or at least 30 mS/cm, or at least 40 mS/cm, or at least 50 mS/cm, or at least 60 mS/cm at room temperature. In a further aspect, the phosphonium electrolyte exhibits reduced flammability as compared to conventional electrolytes, and thus improves the safety of EDLC operation. In an additional aspect, the phosphonium ionic liquid or salt can be used as an additive to facilitate the formation of a solid electrolyte interphase (SEI) layer or electrode protective layer. Without being bound by any particular theory, the inventors believe that the protective layer acts to widen the electrochemical stability window, suppress EDLC degradation or decomposition reactions and hence improve EDLC cycle life.

Embodiments of the present invention further provide a heat transfer medium, comprising an ionic liquid composition or one or more salts dissolved in a solvent, comprising: one or more phosphonium based cations, and one or more anions, wherein the heat transfer medium exhibits thermodynamic stability at temperatures greater than 375° C., a liquidus range of greater than 400° C.

The phosphonium ionic liquid compositions and salts are useful in forming a variety of hybrid electrical devices. For example, in one embodiment a device is provided, comprising a first electrode, a second electrode; and an electrolyte comprised of an ionic liquid composition or one or more salts dissolved in a solvent, comprising: one or more phosphonium based cations of the general formula:

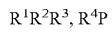

where $R^1$, $R^2$, $R^3$ and $R^4$ are each independently a substituent group; and one or more anions, and wherein said electrolyte is electrically coupled to at least one of said first and second electrodes. In some embodiments the first electrode is comprised of redox active molecules (ReAMs).

In another embodiment a molecular storage device is provided, comprising a working electrode and a counter electrode configured to afford electrical capacitance; and an ion conducting composition comprising: one or more phosphonium based cations of the general formula above and wherein the ion conducting composition is electrically coupled to at least the working and counter electrodes.

In another embodiment the invention encompasses a molecular memory element that includes a switching device, a bit line and a word line coupled to the switching device and a molecular storage device accessible through the switching device. The molecular storage device is capable of being placed in two or more discrete states, wherein the molecular storage device is placed in one of the discrete states by signals applied to the bit and word line. The molecular storage device comprises a first electrode, a second electrode and an electrolyte of phosphonium based cations and suitable anions between the first and second electrode.

Another embodiment encompasses molecular memory arrays comprising a plurality of molecular storage elements where each molecular storage element is capable of being placed in two or more discrete states. A plurality of bit lines and word lines are coupled to the plurality of molecular storage elements such that each molecular storage element is coupled to and addressable by at least one bit line and at least one word line.

BRIEF DESCRIPTION OF THE DRAWINGS

Other aspects, embodiments and advantages of the invention will become apparent upon reading of the detailed description of the invention and the appended claims provided below, and upon reference to the drawings in which:

FIGS. 2A and 2B are cross-sectional views of bipolar electrode and multi-cell stack structures of an EDLC according to one embodiment of the present invention;

FIG. 10B shows the $^1$H NMR spectrum for exemplary embodiments of phosphonium ionic liquids prepared as described in FIG. 4 and Example 4;

DETAILED DESCRIPTION OF INVENTION

Overview

Figure 1:
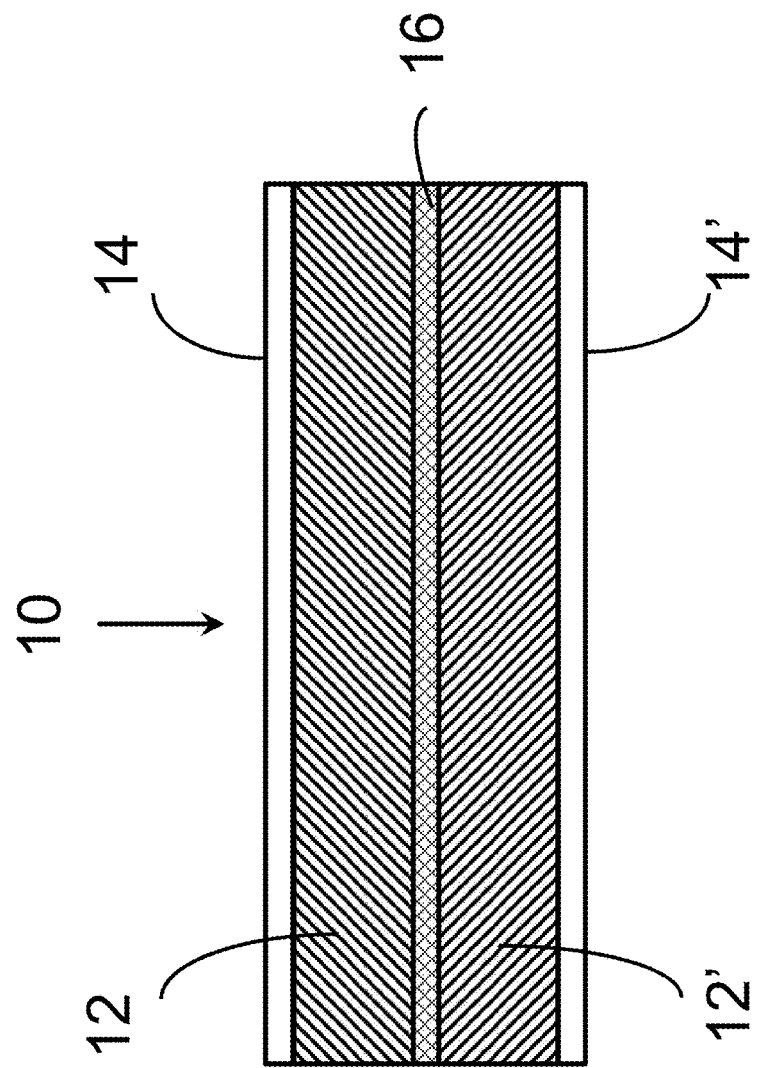
FIG. 1 is cross-sectional view of an electrochemical double layer capacitor (EDLC) according to one embodiment of the present invention.

The present invention is generally directed to phosphonium ionic liquids, salts, and compositions and their use in many applications.

General Description

The invention encompasses novel phosphonium ionic liquids, salts, compositions and their use in many applications, including but not limited to: as electrolytes in electronic devices such as memory devices including static, permanent and dynamic random access memory, as electrolytes in batteries, electrochemical double layer capacitors, electrolytic capacitors, fuel cells, dye-sensitized solar cells, and electrochromic devices. Additional applications include use as a heat transfer medium, high temperature reaction and/or extraction media, among other applications. In particular, the invention relates to phosphonium ionic liquids, salts, compositions and molecules possessing structural features, wherein the composition exhibits desirable combination of at least two or more of: thermodynamic stability, low volatility, wide liquidus range, ionic conductivity, and electrochemical stability. The invention further encompasses methods of making such phosphonium ionic liquids, compositions and molecules, and operational devices and systems comprising the same.

In another aspect, embodiments of the present invention provide devices having an electrolyte comprised of phosphonium ionic liquid compositions or one or more salts dissolved in a solvent. In another aspect, embodiments of the present invention provide a battery comprising an electrolyte comprised of phosphonium ionic liquid compositions or one or more salts dissolved in a solvent. In a further aspect, embodiments of the present invention provide an electrochemical double layer capacitor (EDLC) comprising an electrolyte comprised of phosphonium ionic liquid compositions or one or more salts dissolved in a solvent.

The advantageous properties of the phosphonium ionic liquid compositions make them particularly suited for applications as an electrolyte in electronic devices, batteries, EDLC's, fuel cells, dye-sensitized solar cells (DSSCs), and electrochromic devices.

In a further aspect of the present invention, a heat transfer medium is provided comprised of phosphonium ionic liquid compositions or one or more salts dissolved in a solvent. The advantageous properties of the compositions of the present invention are well suited as a heat transfer medium, and useful in processes and systems where a heat transfer medium is employed such as in heat extraction process and high temperature reactions.

Definitions

As used herein and unless otherwise indicated, the term "electrolyte" or "electrolyte solution" or "electrolyte composition" or "ionic electrolyte" or "ion conducting electrolyte" or "ion conducting composition" or "ionic composition" is used and is herein defined as any one or more of: (a) an ionic liquid, (b) a room temperature ionic liquid, (c) one or more salts dissolved in at least one solvent, and (d) one or more salts dissolved in at least one solvent together with at least one polymer to form a gel electrolyte. Additionally, the one or more salts are defined to include: (a) one or more salts that are a solid at a temperature of 100° C. and below, and (b) one or more salts that are a liquid at a temperature of 100° C. and below.

As used herein and unless otherwise indicated, the term "acyl" refers to an organic acid group in which the OH of the carboxyl group is replaced by some other substituent (RCO—), such as described herein as "R" substituent groups. Examples include, but are not limited to, halo, acetyl, and benzoyl.

As used herein and unless otherwise indicated, the term "alkoxy group" means an —O-alkyl group, wherein alkyl is as defined herein. An alkoxy group can be unsubstituted or substituted with one, two or three suitable substituents. Preferably, the alkyl chain of an alkoxy group is from 1 to 6 carbon atoms in length, referred to herein, for example, as "(C1-C6) alkoxy."

As used herein and unless otherwise indicated, "alkyl" by itself or as part of another substituent, refers to a saturated or unsaturated, branched, straight-chain or cyclic monovalent hydrocarbon radical derived by the removal of one hydrogen atom from a single carbon atom of a parent alkane, alkene or alkyne. Also included within the definition of an alkyl group are cycloalkyl groups such as C5, C6 or other rings, and heterocyclic rings with nitrogen, oxygen, sulfur or phosphorus (heterocycloalkyl). Alkyl also includes heteroalkyl, with heteroatoms of sulfur, oxygen, nitrogen, phosphorous, and silicon finding particular use in certain embodiments. Alkyl groups can be optionally substituted with R groups, independently selected at each position as described below.

Examples of alkyl groups include, but are not limited to, (C1-C6) alkyl groups, such as methyl, ethyl, propyl, isopropyl, 2-methyl-1-propyl, 2-methyl-2-propyl, 2-methyl-1-butyl, 3-methyl-1-butyl, 2-methyl-3-butyl, 2,2-dimethyl-1-propyl, 2-methyl-1-pentyl, 3-methyl-1-pentyl, 4-methyl-1- pentyl, 2-methyl-2-pentyl, 3-methyl-2-pentyl, 4-methyl-2-pentyl, 2,2-dimethyl-1-butyl, 3,3-dimethyl-1-butyl, 2-ethyl-1-butyl, butyl, isobutyl, t-butyl, pentyl, isopentyl, neopentyl, and hexyl, and longer alkyl groups, such as heptyl, and octyl.

The term "alkyl" is specifically intended to include groups having any degree or level of saturation, i.e., groups having exclusively carbon-carbon single bonds, groups having one or more carbon-carbon double bonds, groups having one or more carbon-carbon triple bonds and groups having mixtures of single, double and triple carbon-carbon bonds. Where a specific level of saturation is intended, the expressions "alkanyl," "alkenyl," and "alkynyl" are used.

"Alkanyl" by itself or as part of another substituent, refers to a saturated branched, straight-chain or cyclic alkyl radical derived by the removal of one hydrogen atom from a single carbon atom of a parent alkane. "Heteroalkanyl" is included as described above.

"Alkenyl" by itself or as part of another substituent, refers to an unsaturated branched, straight-chain or cyclic alkyl radical having at least one carbon-carbon double bond derived by the removal of one hydrogen atom from a single carbon atom of a parent alkene. The group may be in either the cis or trans conformation about the double bond(s). Suitable alkenyl groups include, but are not limited to (C2-C6) alkenyl groups, such as vinyl, allyl, butenyl, pentenyl, hexenyl, butadienyl, pentadienyl, hexadienyl, 2-ethylhexenyl, 2-propyl-2-butenyl, 4-(2-methyl-3-butene)-pentenyl. An alkenyl group can be unsubstituted or substituted with one or more independently selected R groups.

"Alkynyl" by itself or as part of another substituent, refers to an unsaturated branched, straight-chain or cyclic alkyl radical having at least one carbon-carbon triple bond derived by the removal of one hydrogen atom from a single carbon atom of a parent alkyne.

Also included within the definition of "alkyl" is "substituted alkyl". "Substituted" is usually designated herein as "R", and refers to a group in which one or more hydrogen atoms are independently replaced with the same or different substituent(s). R substituents can be independently selected from, but are not limited to, hydrogen, halogen, alkyl (including substituted alkyl (alkylthio, alkylamino, alkoxy, etc.), cycloalkyl, substituted cycloalkyl, cycloheteroalkyl, and substituted cycloheteroalkyl), aryl (including substituted aryl, heteroaryl or substituted heteroaryl), carbonyl, alcohol, amino, amido, nitro, ethers, esters, aldehydes, sulfonyl, sulfoxyl, carbamoyl, acyl, cyano, thiocyanato, silicon moieties, halogens, sulfur containing moieties, phosphorus containing moieties, etc. In some embodiments, as described herein, R substituents include redox active moieties (ReAMs). In some embodiments, optionally R and R' together with the atoms to which they are bonded form a cycloalkyl (including cycloheteroalkyl) and/or cycloaryl (including cycloheteroaryl), which can also be further substituted as desired. In the structures depicted herein, R is hydrogen when the position is unsubstituted. It should be noted that some positions may allow two or three substitution groups, R, R', and R", in which case the R, R', and R" groups may be either the same or different.

In some embodiments, the R groups (subunits) are used to adjust the redox potential(s) of the subject compound. Thus, as is more fully described below and in references cited herein, an R group such as a redox active subunit can be added to a macrocycle, particularly a porphyrinic macrocycle to alter its redox potential. Certain preferred substituents include, but are not limited to, 4-chlorophenyl, 3-acetamidophenyl, 2,4-dichloro-4-trifluoromethyl, and ferrocene (including ferrocene derivatives). When the substituents are used for altering redox potentials, preferred substituents provide a redox potential range of less than about 5 volts, preferably less than about 2 volts, more preferably less than about 1 volt.

In certain embodiments, the R groups are as defined and depicted in the figures and the text from U.S. Provisional Ser. No. 60/687,464 which is incorporated herein by reference. A number of suitable proligands and complexes, as well as suitable substituents, are outlined in U.S. Pat. Nos. 6,212,093; 6,728,129; 6,451,942; 6,777,516; 6,381,169; 6,208,553; 6,657,884; 6,272,038; 6,484,394; and U.S. Ser. Nos. 10/040,059; 10/682,868; 10/445,977; 10/834,630; 10/135,220; 10/723,315; 10/456,321; 10/376,865; all of which are expressly incorporated by reference, in particular for the structures and descriptions thereof depicted therein, hereby expressly incorporated as substituent embodiments, both for the particular macrocycle the substituents are depicted within and for further substituted derivatives.

By "aryl" or grammatical equivalents herein is meant an aromatic monocyclic or polycyclic hydrocarbon moiety generally containing 5 to 14 carbon atoms (although larger polycyclic rings structures may be made) and any carbocyclic ketone, imine, or thioketone derivative thereof, wherein the carbon atom with the free valence is a member of an aromatic ring. Aromatic groups include arylene groups and aromatic groups with more than two atoms removed. For the purposes of this application aryl includes heteroaryl. "Heteroaryl" means an aromatic group wherein 1 to 5 of the indicated carbon atoms are replaced by a heteroatom chosen from nitrogen, oxygen, sulfur, phosphorus, boron and silicon wherein the atom with the free valence is a member of an aromatic ring, and any heterocyclic ketone and thioketone derivative thereof. Thus, heterocycle includes both single ring and multiple ring systems, e.g. thienyl, furyl, pyrrolyl, pyrimidinyl, indolyl, purinyl, quinolyl, isoquinolyl, thiazolyl, imidazolyl, naphthalene, phenanthroline, etc. Also included within the definition of aryl is substituted aryl, with one or more substitution groups "R" as defined herein and outlined above and herein. For example, "perfluoroaryl" is included and refers to an aryl group where every hydrogen atom is replaced with a fluorine atom. Also included is oxalyl.

As used herein the term "halogen" refers to one of the electronegative elements of group VIIA of the periodic table (fluorine, chlorine, bromine, iodine, and astatine).

The term "nitro" refers to the —$NO_2$ group.

By "amino groups" or grammatical equivalents herein is meant —$NH2$, —NHR and —NRR' groups, with R and R' independently being as defined herein.

As used herein the term "pyridyl" refers to an aryl group where one CH unit is replaced with a nitrogen atom.

As used herein the term "cyano" refers to the —CN group.

As used here the term "thiocyanato" refers to the —SCN group.

The term "sulfoxyl" refers to a group of composition RS(O)— where R is a substitution group as defined herein, including alkyl, (cycloalkyl, perfluoroalkyl, etc.), or aryl (e.g., perfluoroaryl group). Examples include, but are not limited to methylsulfoxyl, phenylsulfoxyl, etc.

The term "sulfonyl" refers to a group of composition RSO2- where R is a substituent group, as defined herein, with alkyl, aryl, (including cycloalkyl, perfluoroalkyl, or perfluoroaryl groups). Examples include, but are not limited to methylsulfonyl, phenylsulfonyl, p-toluenesulfonyl, etc.

The term "carbamoyl" refers to the group of composition R(R')NC(O)— where R and R' are as defined herein, examples include, but are not limited to N-ethylcarbamoyl, N,N-dimethylcarbamoyl, etc.

The term "amido" refers to the group of composition RiCONR$_2$— where R$_1$ and R$_2$ are substituents as defined herein. Examples include, but are not limited to acetamido, N-ethylbenzamido, etc.

The term "imine" refers to =NR.

In certain embodiments, when a metal is designated, e.g., by "M" or "M$_n$", where n is an integer, it is recognized that the metal can be associated with a counterion.

As used herein and unless otherwise indicated, the term "amperometric device" is a device capable of measuring the current produced in an electrochemical cell as a result of the application of a specific field potential ("voltage").

As used herein and unless otherwise indicated, the term "aryloxy group" means an —O-aryl group, wherein aryl is as defined herein. An aryloxy group can be unsubstituted or substituted with one or two suitable substituents. Preferably, the aryl ring of an aryloxy group is a monocyclic ring, wherein the ring comprises 6 carbon atoms, referred to herein as "(C6) aryloxy."

As used herein and unless otherwise indicated, the term "benzyl" means —CH2-phenyl.

As used herein and unless otherwise indicated, the term "carbonyl" group is a divalent group of the formula —C(O)—.

As used herein and unless otherwise indicated, the term "coulometric device" is a device capable of measuring the net charge produced during the application of a potential field ("voltage") to an electrochemical cell.

As used herein and unless otherwise indicated, the term "cyano" refers to the —CN group.

As used herein and unless otherwise indicated, the term "different and distinguishable" when referring to two or more oxidation states means that the net charge on the entity (atom, molecule, aggregate, subunit, etc.) can exist in two different states. The states are said to be "distinguishable" when the difference between the states is greater than thermal energy at room temperature.

As used herein and unless otherwise indicated, the term "$E_{1/2}$" refers to the practical definition of the formal potential ($E_0$) of a redox process as defined by $E=E_0+(RT/nF)\ln(D_{ox}/D_{red})$ where R is the gas constant, T is temperature in K (Kelvin), n is the number of electrons involved in the process, F is the Faraday constant (96,485 Coulomb/mole), $D_{ox}$ is the diffusion coefficient of the oxidized species and $D_{red}$ is the diffusion coefficient of the reduced species.

As used herein and unless otherwise indicated, the term "electrically coupled" when used with reference to a storage molecule and/or storage medium and electrode refers to an association between that storage medium or molecule and the electrode such that electrons move from the storage medium/molecule to the electrode or from the electrode to the storage medium/molecule and thereby alter the oxidation state of the storage medium/molecule. Electrical coupling can include direct covalent linkage between the storage medium/molecule and the electrode, indirect covalent coupling (e.g. via a linker), direct or indirect ionic bonding between the storage medium/molecule and the electrode, or other bonding (e.g. hydrophobic bonding). In addition, no actual bonding may be required and the storage medium/molecule may simply be contacted with the electrode surface. There also need not necessarily be any contact between the electrode and the storage medium/molecule where the electrode is sufficiently close to the storage medium/molecule to permit electron tunneling between the medium/molecule and the electrode.

As used herein and unless otherwise indicated, the term "electrochemical cell" consists minimally of a reference electrode, a working electrode, a redox-active medium (e.g. a storage medium), and, if necessary, some means (e.g., a dielectric) for providing electrical conductivity between the electrodes and/or between the electrodes and the medium. In some embodiments, the dielectric is a component of the storage medium.

As used herein and unless otherwise indicated, the term "electrode" refers to any medium capable of transporting charge (e.g., electrons) to and/or from a storage molecule. Preferred electrodes are metals or conductive organic molecules. The electrodes can be manufactured to virtually any 2-dimensional or 3-dimensional shape (e.g., discrete lines, pads, planes, spheres, cylinders, etc.).

As used herein and unless otherwise indicated, the term "fixed electrode" is intended to reflect the fact that the electrode is essentially stable and unmovable with respect to the storage medium. That is, the electrode and storage medium are arranged in an essentially fixed geometric relationship with each other. It is of course recognized that the relationship alters somewhat due to expansion and contraction of the medium with thermal changes or due to changes in conformation of the molecules comprising the electrode and/or the storage medium. Nevertheless, the overall spatial arrangement remains essentially invariant.

As used herein and unless otherwise indicated, the term "linker" is a molecule used to couple two different molecules, two subunits of a molecule, or a molecule to a substrate.

Many of the compounds described herein utilize substituents, generally depicted herein as "R." Suitable R groups include, but are not limited to, hydrogen, alkyl, alcohol, aryl, amino, amido, nitro, ethers, esters, aldehydes, sulfonyl, silicon moieties, halogens, cyano, acyl, sulfur containing moieties, phosphorus containing moieties, Sb, imido, carbamoyl, linkers, attachment moieties, ReAMs and other subunits. It should be noted that some positions may allow two substitution groups, R and R', in which case the R and R' groups may be either the same or different, and it is generally preferred that one of the substitution groups be hydrogen. In some embodiments, the R groups are as defined and depicted in the figures and the text from U.S A number of suitable proligands and complexes, as well as suitable substituents, are outlined in U.S. Pat. Nos. 6,212,093; 6,728,129; 6,451,942; 6,777,516; 6,381,169; 6,208,553; 6,657,884; 6,272,038; 6,484,394; and U.S. Ser. Nos. 10/040,059; 10/682,868; 10/445,977; 10/834,630; 10/135,220; 10/723,315; 10/456,321; 10/376,865; all of which are expressly incorporated by reference, in particular for the structures and descriptions thereof depicted therein, hereby expressly incorporated as substituent embodiments, both for the particular macrocycle the substituents are depicted within and for further substituted derivatives.

As used herein and unless otherwise indicated, the term "subunit" refers to a redox-active component of a molecule.

Phosphonium Ionic Liquids, Salts, and Compositions of the Invention

As described in detail herein, embodiments of novel phosphonium ionic liquids, salts, and compositions of the present invention exhibit desirable properties and in particular a combination of at least two or more of: high thermodynamic stability, low volatility, wide liquidus range, high ionic conductivity, and wide electrochemical stability window. The combination of up to, and in some embodiments, all of these properties at desirable levels in one composition was unexpected and not foreseen, and provides a significant advantage over known ionic compositions. Embodiments of phosphonium compositions of the present invention exhibiting such properties enable applications and devices not previously available.

In some embodiments, phosphonium ionic liquids of the present invention comprise phosphonium cations of selected molecular weights and substitution patterns, coupled with selected anion(s), to form ionic liquids with tunable combinations of thermodynamic stability, ionic conductivity, liquidus range, and low volatility properties.

In some embodiments, by "ionic liquid" herein is meant a salt that is in the liquid state at and below 100° C. "Room temperature" ionic liquid is further defined herein in that it is in the liquid state at and below room temperature.

In other embodiments, the term "electrolyte" "or "electrolyte solution" or "electrolyte composition" or "ionic electrolyte" or "ion conducting electrolyte" or "ion conducting composition" or "ionic composition" is used and is herein defined as any one or more of: (a) an ionic liquid, (b) a room temperature ionic liquid, (c) one or more salts dissolved in at least one solvent, and (d) one or more salts dissolved in at least one solvent together with at least one polymer to form a gel electrolyte. Additionally, the one or more salts are defined to include: (a) one or more salts that are a solid at a temperature of 100° C. and below, and (b) one or more salts that are a liquid at a temperature of 100° C. and below.

In some embodiments the present invention comprises phosphonium ionic liquids and phosphonium electrolytes that exhibit thermodynamic stability up to temperatures of approximately 400° C., and more usually up to temperatures of approximately 375° C. Exhibiting thermal stability up to a temperature this high is a significant development, and allows use of the phosphonium ionic liquids of the present invention in a wide range of applications. Embodiments of phosphonium ionic liquids and phosphonium electrolytes of the present invention further exhibit ionic conductivity of at least of at least 1 mS/cm, or at least 5 mS/cm, or at least 10 mS/cm, or at least 15 mS/cm, or at least 20 mS/cm, or at least 30 mS/cm, or at least 40 mS/cm, or at least 50 mS/cm, or at least 60 mS/cm at room temperature. Embodiments of phosphonium ionic liquids and phosphonium electrolytes of the present invention exhibit volatilities that are about 20% lower compared to their nitrogen-based analogs. This combination of high thermal stability, high ionic conductivity, wide liquidus range, and low volatility, is highly desirable and was unexpected. Generally, in the prior art it is found that thermal stability and ionic conductivity of ionic liquids exhibit an inverse relationship.

In some embodiments, phosphonium ionic liquids and phosphonium electrolytes are comprised of cations having molecular weight of up to 500 Daltons. In other embodiments, phosphonium ionic liquids and phosphonium electrolytes are comprised of cations having molecular weight in the range of 200 to 500 Daltons for ionic liquids at the lower thermal stability ranges.

Phosphonium ionic compositions of the present invention are comprised of phosphonium based cations of the general formula:

$$R^1R^2R^3R^4P \qquad (1)$$

wherein: $R^1$, $R^2$, $R^3$ and $R^4$ are each independently a substituent group. In some embodiments, wherein the cations are comprises of open chains.

In some embodiments $R^1$, $R^2$, $R^3$ and $R^4$ are each independently an alkyl group. In one embodiment, at least one of the alkyl groups is different from the other two. In one embodiment none of the alkyl groups are methyl. In some embodiments, an alkyl group is comprised of 2 to 7 carbon atoms, more usually 1 to 6 carbon atoms. In some embodiments $R^1$, $R^2$, $R^3$ and $R^4$ are each independently a different alkyl group comprised of 2 to 14 carbon atoms. In some embodiments, the alkyl groups contain no branching. In one embodiment $R^1=R^2$ in an aliphatic, heterocyclic moiety. Alternatively, $R^1=R^2$ in an aromatic, heterocyclic moiety.

In some embodiments, $R^1$ or $R^2$ are comprised of phenyl or substituted alkylphenyl. In some embodiments, $R^1$ and $R^2$ are the same and are comprised of tetramethylene (phospholane) or pentamethylene (phosphorinane). Alternatively, $R^1$ and $R^2$ are the same and are comprised of tetramethinyl (phosphole). In a further embodiment, $R^1$ and $R^2$ are the same and are comprised of phospholane or phosphorinane. Additionally, in another embodiment $R^2R^3$ and $R^4$ are the same and are comprised of phospholane, phosphorinane or phosphole.

In some embodiments at least one, more, of or all of $R^1$, $R^2$, $R^3$ and $R^4$ are selected such that each does not contain functional groups that would react with the redox active molecules (ReAMs) described below. In some embodiments, at least one, more, of or all of $R^1$, $R^2$, $R^3$ and $R^4$ do not contain halides, metals or O, N, P, or Sb.

In some embodiments, the alkyl group comprises from 1 to 7 carbon atoms. In other embodiments the total carbon atoms from all alkyl groups is 12 or less. In yet other embodiments, the alkyl groups are each independently comprised of 1 to 6 carbon atoms, more typically, from 1 to 5 carbon atoms.

In another embodiment, phosphonium ionic compositions are provided and are comprised of: one or more salts dissolved in a solvent, the one or more salts comprising one or more phosphonium based cations of the general formula:

$$R^1R^2R^3R^4P \qquad (1)$$

and one or more anions, and wherein: $R^1$, $R^2$, $R^3$ and $R^4$ are each independently a substituent group, such as but not limited to an alkyl group as described below. In some embodiments $R^1$, $R^2$, $R^3$ and $R^4$ are each independently an alkyl group comprised of 1 to 6 carbon atoms, more usually 1 to 4 carbon atoms. In some embodiments one or more of the hydrogen atoms in one or more of the R groups are substituted by fluorine. Any one or more of the salts may be liquid or solid at a temperature of 100° C. and below. In some embodiments, a salt is comprised of one cation and one anion. In other embodiments, a salt is comprised of one cation and multiple anions. In other embodiments, a salt is comprised of one anion and multiple cations. In further embodiments, a salt is comprised of multiple cations and multiple anions. Exemplary embodiments of suitable solvents include, but are not limited to, one or more of the following: acetonitrile, ethylene carbonate (EC), propylene carbonate (PC), butylene carbonate (BC), dimethyl carbonate (DMC), diethyl carbonate (DEC), ethylmethyl carbonate (EMC) or methyl ethyl carbonate (MEC), methyl propionate (MP), fluoroethylene carbonate (FEC), fluorobenzene (FB), vinylene carbonate (VC), vinyl ethylene carbonate (VEC), phenylethylene carbonate (PhEC), propylmethyl carbonate (PMC), diethoxyethane (DEE), dimethoxyethane (DME), tetrahydrofuran (THF), γ-butyrolactone (GBL), and γ-valerolactone (GVL).

In an exemplary embodiment, phosphonium cations are comprised of the following formula:

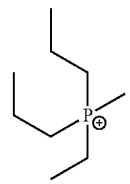

In another exemplary embodiment, phosphonium cations are comprised of the following formula:

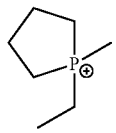

In yet another exemplary embodiment, phosphonium cations are comprised of the following formula:

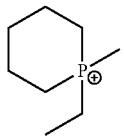

In an additional exemplary embodiment, phosphonium cations are comprised of the following formula:

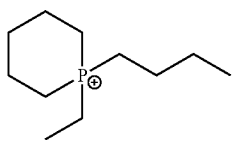

In a further exemplary embodiment, phosphonium cations are comprised of the following formula:

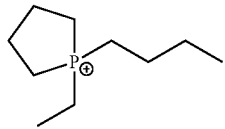

In an additional exemplary embodiment, phosphonium cations are comprised of the following formula:

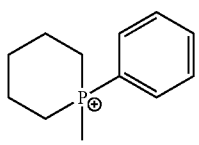

In an additional exemplary embodiment, phosphonium cations are comprised of the following formula:

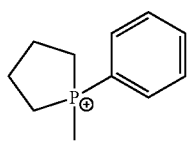

In another exemplary embodiment, phosphonium cations are comprised of the

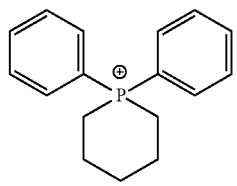 [SMILES: c1ccc([P+]2(c3ccccc3)CCCCC2)cc1]

In a further exemplary embodiment, phosphonium cations are comprised of the

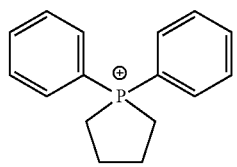 [SMILES: c1ccc([P+]2(c3ccccc3)CCCC2)cc1]

In yet another exemplary embodiment, phosphonium cations are comprised of the following formula:

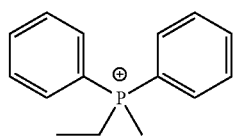 [SMILES: CC[P+](C)(c1ccccc1)c1ccccc1]

In still another exemplary embodiment, phosphonium cations are comprised of the

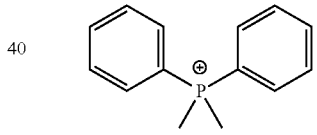

Another exemplary provides phosphonium cations comprised of the following

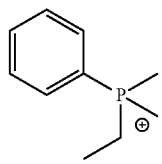

Further provided are phosphonium cations comprised of the following formula:

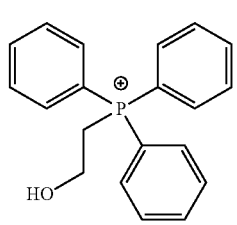 [SMILES: OCC[P+](c1ccccc1)(c1ccccc1)c1ccccc1]

In some embodiments examples of suitable phosphonium cations include but are not limited to: di-n-propyl ethyl phosphonium; n-butyl n-propyl ethyl phosphonium; n-hexyl n-butyl ethyl phosphonium; and the like.

In other embodiments, examples of suitable phosphonium cations include but are not limited to: ethyl phospholane; n-propyl phospholane; n-butyl phospholane; n-hexyl phopholane; and phenyl phospholane.

In further embodiments, examples of suitable phosphonium cations include but are not limited to: ethyl phosphole; n-propyl phosphole; n-butyl phosphole; n-hexyl phophole; and phenyl phosphole.

In yet another embodiment, examples of suitable-phosphonium cations include but are not limited to: 1-ethyl phosphacyclohexane; n-propyl phosphacyclohexane; n-butyl phosphacyclohexane; n-hexyl phophacyclohexane; and phenyl phosphacyclohexane.

Phosphonium ionic liquids or salts of the present invention are comprised of cations and anions. As will be appreciated by those of skill in the art, there are a large variety of possible cation and anion combinations. Phosphonium ionic liquids or salts of the present invention comprise cations as described above with anions that are generally selected from compounds that are easily ion exchanged with reagents or solvents of the general formula:

$$C^+A^-$$

Wherein $C^+$ is a cation and $A^+$ is an anion. In the instance of an organic solvent, $C^+$ is preferably $Li^+$, $K^+$, $Na^+$, $NH_4^+$ or $Ag^+$. In the instance of aqueous solvents, C+ is preferably $Ag^+$.

Many anions may be selected. In one preferred embodiment, the anion is bis-perfluoromethyl sulfonyl imide. Exemplary embodiments of suitable anions include, but are not limited to, any one or more of: $NO_3^-$, $O_3SCF_3^-$, $N(SO_2CF_3)_2^-$, $PF_6^-$, $O_3SC_6H_4CH_3^-$, $O_3SCF_2CF_2CF_3^-$, $O_3SCH_3^-$, $I^-$, $C(CN)_3^-$, $^-O_3SCF_3$, $N(SO_2)_2CF_3^-$, $CF_3BF_3^-$, $^-O_3SCF_2CF_2CF_3$, $SO_4^{2-}$, $^-O_2CCF_3$, $^-O_2CCF_2CF_2CF_3$, or $^-N(CN)_2$.

In some embodiments, phosphonium ionic liquids or salts of the present invention are comprised of a single cation-anion pair. Alternatively, two or more phosphonium ionic liquids or salts may be used to form common binaries, mixed binaries, common ternaries, mixed ternaries, and the like. Composition ranges for binaries, ternaries, etc. include from 1 ppm, up to 999,999 ppm for each component cation and each component anion. In another embodiment, phosphonium electrolytes are comprised of one or more salts dissolved in a solvent, and the salts may be liquid or solid at a temperature of 100° C. In some embodiments, a salt is comprised of a single cation-anion pair. In other embodiments, a salt is comprised of a one cation and multiple anions. In other embodiments, a salt is comprised of one anion and multiple cations. In still other embodiments, a salt is comprised of multiple cations and multiple anions.

Electrolyte compositions according to some embodiments of the present invention are further described in co-pending U.S. patent application Ser. No. _____(attorney docket no. 057472-058), filed concurrently herewith, the entire disclosure of which is hereby incorporated by reference.

In one preferred embodiment, phosphonium ionic liquid compositions are comprised of cation and anion combinations as shown in Tables 1A and 1B, below. In another preferred embodiment, phosphonium electrolytes are comprised of cation and anion combinations shown in Tables 1C, 1D, 1E, and 1F below. For clarity, signs of charge have been omitted in the formulas.

Table 1A illustrates examples of anion binaries with a common cation:

TABLE 1A

| Cation Structure | Examples of Anion Binaries |
|---|---|
| 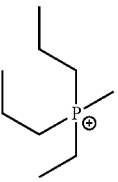 | $1NO_3^-/1O_3SCF_3^-$<br>$3NO_3^-/1O_3SCF_3^-$<br>$1NO_3^-/3O_3SCF_3^-$<br>$1NO_3^-/1N(SO_2CF_3)_2^-$<br>$1NO_3^-/1PF_6^-$<br>$1O_3SCF_3^-/1N(SO_2CF_3)_2^-$<br>$1O_3SCF_3^-/1O_3SC_6H_4CH_3^-$<br>$3O_3SCF_3^-/1O_3SC_6H_4CH_3^-$<br>$1O_3SCF_3^-/1O_3SCF_2CF_2CF_3^-$<br>$1O_3SC_6H_4CH_3^-/3O_3SCH_3^-$<br>$1O_3SC_6H_4CH_3^-/1O_3SCF_2CF_2CF_3^-$<br>$3O_3SC_6H_4CH_3^-/1O_3SCF_2CF_2CF_3^-$<br>$1O_3SC_6H_4CH_3^-/3O_3SCF_2CF_2CF_3^-$ |

Table 1B illustrates examples of cation and anion combinations:

TABLE 1B

| Cation Structure | Anions |
|---|---|
| 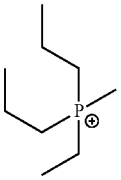 | $I^-$<br>$-N(SO_2)_2CF_3$<br>$-O_3SCF_3$<br>$-O_2CCF_3$<br>$-O_2CCF_2CF_2CF_3$<br>$-O_3SC_6H_4CH_3$<br>$CF_3BF_3^-$<br>$C(CN)_3^-$<br>$PF_6^-$<br>$NO_3^-$<br>$-O_3SCH_3$<br>$-O_3SC_6H_4CHCH_2$<br>$BF_4^-$<br>$-O_3SCF_2CF_2CF_3$<br>$-SC(O)CH_3$<br>$SO_4^{2-}$<br>$-O_2CCF_2CF_3$<br>$-O_2CH$<br>$-O_2CC_6H_5$<br>$-OCN$<br>$CO_3^{2-}$ |

In another embodiment, phosphonium electrolytes are comprised of salts having cations as shown in Tables 1C-1 to 1C-3 below:

TABLE 1C-1

| Cations | |
|---|---|
| Formula | Structure |
| $(CH_3)_4P$ | 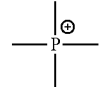 |
| $(CH_3CH_2)(CH_3)_3P$ |  |
| $(CH_3CH_2CH_2)(CH_3)_3P$ | 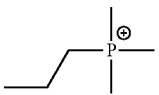 |

TABLE 1C-1-continued
| Cations | |
|---|---|
| Formula | Structure |
| (CH₃CH₂)₂(CH₃)₂P | 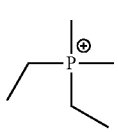 |
| (CH₃CH₂CH₂)₂(CH₃)₂P | 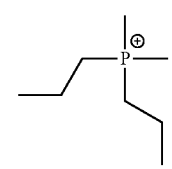 |
| (CH₃CH₂CH₂)(CH₃CH₂)(CH₃)₂P | 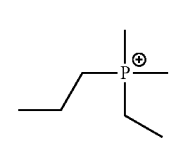 |
| (CH₃CH₂CH₂)(CH₃CH₂)₂(CH₃)P | 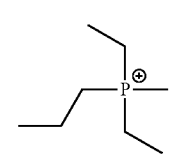 |
TABLE 1C-1-continued
| Cations | |
|---|---|
| Formula | Structure |
| (CH₃CH₂)₃(CH₃)P | 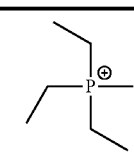 |
| (CH₃CH₂CH₂)(CH₃CH₂)₃P | 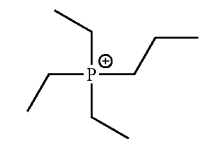 |
| (CH₃CH₂)₄P | 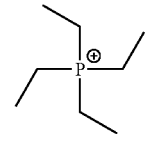 |
| (CH₃CH₂CH₂)₂(CH₃CH₂)₂P | 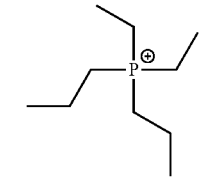 |
TABLE 1C-2
| Cations | |
|---|---|
| Formula | Structure |
| (CH₃CH₂CH₂)₃(CH₃)P | 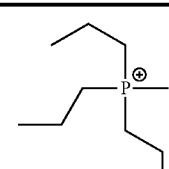 |
| (CH₃CH₂CH₂)₃(CH₃CH₂)P | 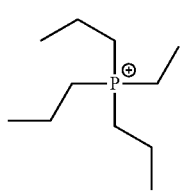 |
| (CH₃CH₂CH₂)₄P | 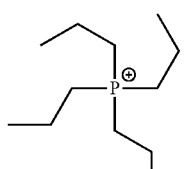 |
| (CF₃CH₂CH₂)(CH₃)₃P | 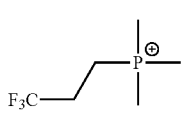 |

TABLE 1C-2-continued
| Cations | |
|---|---|
| Formula | Structure |
| (CF₃CH₂CH₂)(CH₃CH₂)₃P | 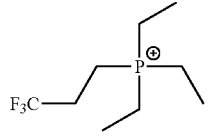 |
| (CF₃CH₂CH₂)₃(CH₃CH₂)P | 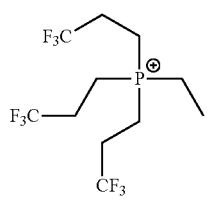 [SMILES: CC[P+](CCC(F)(F)F)(CCC(F)(F)F)CCC(F)(F)F] |
| (CF₃CH₂CH₂)₃(CH₃)P | 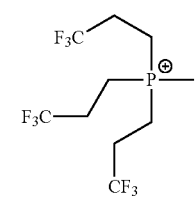 [SMILES: C[P+](CCC(F)(F)F)(CCC(F)(F)F)CCC(F)(F)F] |
| (CF₃CH₂CH₂)₄P | 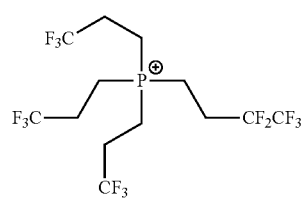 |
| (—CH₂CH₂CH₂CH₂—)(CH₃CH₂)(CH₃)P | 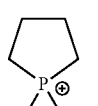 |
| (—CH₂CH₂CH₂CH₂—)(CH₃CH₂CH₂)(CH₃)P | 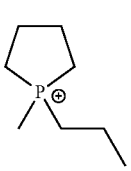 |
TABLE 1C-3
| Cations | |
|---|---|
| Formula | Structure |
| (—CH₂CH₂CH₂CH₂—)(CH₃CH₂CH₂CH₂)(CH₃)P | 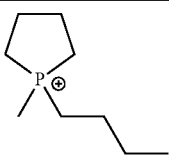 |
| (—CH₂CH₂CH₂CH₂—)(CH₃CH₂CH₂)(CH₃CH₂)P | 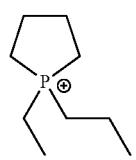 |

TABLE 1C-3-continued

| Cations | |
|---|---|
| Formula | Structure |
| (—CH₂CH₂CH₂CH₂—)(CH₃CH₂CH₂CH₂)(CH₃CH₂)P | 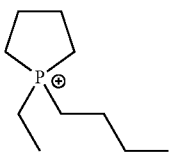 |
| (—CH₂CH₂CH₂CH₂CH₂—)(CH₃CH₂)(CH₃)P | 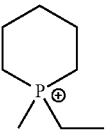 |
| (—CH₂CH₂CH₂CH₂CH₂—)(CH₃CH₂CH₂)(CH₃)P | 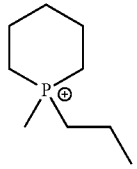 |
| (—CH₂CH₂CH₂CH₂CH₂—)(CH₃CH₂CH₂CH₂)(CH₃)P | 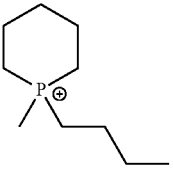 |
| (—CH₂CH₂CH₂CH₂CH₂—)(CH₃CH₂CH₂)(CH₃CH₂)P | 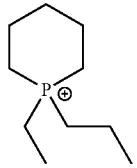 |
| (—CH₂CH₂CH₂CH₂CH₂—)(CH₃CH₂CH₂CH₂)(CH₃CH₂)P | 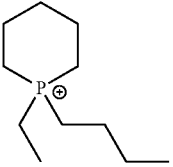 |

In another embodiment, phosphonium electrolytes are comprised of salts having anions as shown in Tables 1D-1 to 1D-4 below:

TABLE 1D-1

| Anions | |
|---|---|
| Formula | Structure |
| PF₆ | 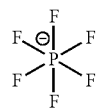 |
| (CF₃)₃PF₃ | 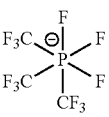 |

TABLE 1D-1-continued

| Anions | |
|---|---|
| Formula | Structure |
| (CF₃)₄PF₂ | 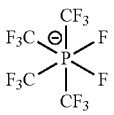 |
| (CF₃CF₂)₄PF₂ | 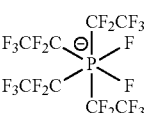 |

TABLE 1D-1-continued

| Anions | |
|---|---|
| Formula | Structure |
| (CF$_3$CF$_2$CF$_2$)$_4$PF$_2$ | 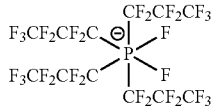 |
| (—OCOCOO—)PF$_4$ | 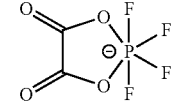 |
| (—OCOCOO—)(CF$_3$)$_3$PF | 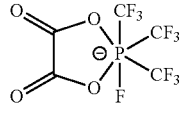 |
| (—OCOCOO—)$_3$P | 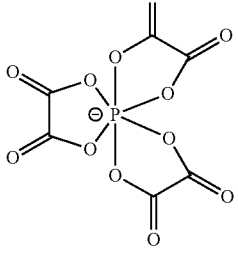 |
| BF$_4$ |  |
| CF$_3$BF$_3$ |  |
| (CF$_3$)$_2$BF$_2$ |  |

TABLE 1D-2

| Anions | |
|---|---|
| Formula | Structure |
| (CF$_3$)$_3$BF | 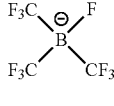 |
| (CF$_3$)$_4$B | 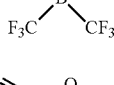 |
| (—OCOCOO—)BF$_2$ | 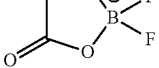 |

TABLE 1D-2-continued

| Anions | |
|---|---|
| Formula | Structure |
| (—OCOCOO—)BF(CF$_3$) | 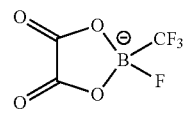 [SMILES: O=C1O[B-](F)(C(F)(F)F)OC1=O] |
| (—OCOCOO—)(CF$_3$)$_2$B | 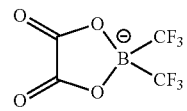 |
| (—OSOCH$_2$SOO—)BF$_2$ | 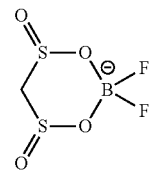 |
| (—OSOCF$_2$SOO—)BF$_2$ | 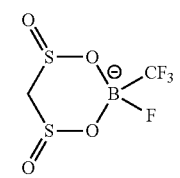 [SMILES: O=S1CS(=O)O[B-](F)(C(F)(F)F)O1] |
| (—OSOCH$_2$SOO—)BF(CF$_3$) | 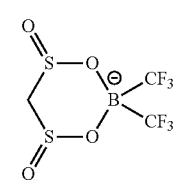 |
| (—OSOCF$_2$SOO—)BF(CF$_3$) | |
| (—OSOCH$_2$SOO—)B(CF$_3$)$_2$ | |

TABLE 1D-3

| Anions | |
|---|---|
| Formula | Structure |
| (—OSOCF$_2$SOO—)B(CF$_3$)$_2$ | 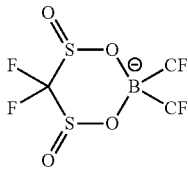 |

TABLE 1D-3-continued

| Anions | |
|---|---|
| Formula | Structure |
| $SO_3CF_3$ | $O=\overset{O}{\underset{O}{S}}{}^{\ominus}-CF_3$ |
| $(CF_3SO_2)_2N$ | $F_3C-\overset{O}{\underset{O}{S}}-\overset{\ominus}{N}-\overset{O}{\underset{O}{S}}-CF_3$ |
| $(-OCOCOO-)_2PF_2$ | (structure shown) |
| $(CF_3CF_2)_3PF_3$ | (structure shown) |
| $(CF_3CF_2CF_2)_3PF_3$ | (structure shown) |
| $(-OCOCOO-)_2B$ | (structure shown) |
| $(-OCO(CH_2)_nCOO-)BF(CF_3)$ | (structure shown) n = 1, 2 |
| $(-OCOCR_2COO-)BF(CF_3)$ | (structure shown) R = H, F |
| $(-OCOCR_2COO-)B(CF_3)_2$ | (structure shown) R = H, F |

TABLE 1D-4

| Anions | |
|---|---|
| Formula | Structure |
| $(-OCOCR_2COO-)_2B$ | (structure shown) R = H, F |
| $CF_3BF(-OOR)_2$ | (structure shown) R = $CH_3$, $-CH_2CH_3$, $-CH_2CH_2CH_3$ |
| $CF_3B(-OOR)3$ | (structure shown) R = $CH_3$, $-CH_2CH_3$, $-CH_2CH_2CH_3$ |
| $CF_3B(-OOR)F_2$ | (structure shown) R = $CH_3$, $-CH_2CH_3$, $-CH_2CH_2CH_3$ |
| $(-OCOCOCOO-)BF(CF_3)$ | (structure shown) |
| $(-OCOCOCOO-)B(CF_3)_2$ | (structure shown) |
| $(-OCOCOCOO-)_2B$ | (structure shown) |

TABLE 1D-4-continued

| Anions | |
|---|---|
| Formula | Structure |
| (—OCOCR$^1$R$^2$CR$^1$R$^2$COO—)BF(CF$_3$) | 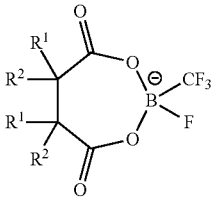 R$^1$, R$^2$ = H, F |
| (—OCOCR$^1$R$^2$CR$^1$R$^2$COO—)B(CF$_3$)$_2$ | 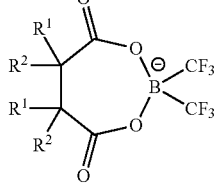 R$^1$, R$^2$ = H, F |

In further embodiments, phosphonium electrolyte compositions are comprised of salts having cation and anion combinations as shown in Tables 1E-1 to 1E-4 below:

TABLE 1E-1

| Cations | Anions | |
|---|---|---|
| Formula | Formula | Structure |
| 1:3:1 ratio (CH$_3$CH$_2$CH$_2$)(CH$_3$)$_3$P/ (CH$_3$CH$_2$CH$_2$)(CH$_3$CH$_2$)(CH$_3$)$_2$P/ (CH$_3$CH$_2$CH$_2$)(CH$_3$CH$_2$)$_2$(CH$_3$)P | PF$_6$ |  |
| | (CF$_3$)$_3$PF$_3$ | 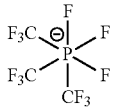 |
| | (CF$_3$)$_4$PF$_2$ | 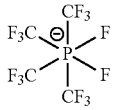 |
| | (CF$_3$CF$_2$)$_4$PF$_2$ | 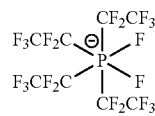 |
| | (CF$_3$CF$_2$CF$_2$)$_4$PF$_2$ | 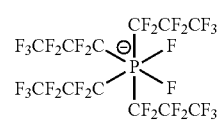 |
| | (—OCOCOO—)PF$_4$ | 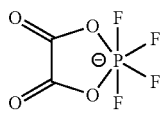 |
| | (—OCOCOO—)(CF$_3$)$_3$PF | 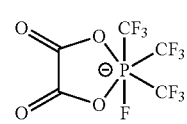 |

TABLE 1E-1-continued

| Cations | Anions | |
|---|---|---|
| Formula | Formula | Structure |
| | (—OCOCOO—)$_3$P | |
| | BF$_4$ | |
| | CF$_3$BF$_4$ | |
| | (CF$_3$)$_2$BF$_2$ | |

TABLE 1E-2

| Cations | Anions | |
|---|---|---|
| Formula | Formula | Structure |
| 1:3:1 ratio<br>(CH$_3$CH$_2$CH$_2$)(CH$_3$)$_3$P/(CH$_3$CH$_2$CH$_2$)(CH$_3$CH$_2$)(CH$_3$)$_2$P/<br>(CH$_3$CH$_2$CH$_2$)(CH$_3$CH$_2$)$_2$(CH$_3$)P | (CF$_3$)$_3$BF | |
| | (CF$_3$)$_4$B | |
| | (—OCOCOO—)BF$_2$ | |
| | (—OCOCOO—)BF(CF$_3$) | |
| | (—OCOCOO—)(CF$_3$)$_2$B | |
| | (—OSOCH$_2$SOO—)BF$_2$ | |

TABLE 1E-2-continued

| Cations | Anions | |
|---|---|---|
| Formula | Formula | Structure |
| | (—OSOCF$_2$SOO—)BF$_2$ | |
| | (—OSOCH$_2$SOO—)BF(CF$_3$) | |
| | (—OSOCF$_2$SOO—)CF(CF$_3$) | |
| | (—OSOCH$_2$SOO—)B(CF$_3$)$_2$ | |

TABLE 1E-2

| Cations | Anions | |
|---|---|---|
| Formula | Formula | Structure |
| 1:3:1 ratio (CH$_3$CH$_2$CH$_2$)(CH$_3$)$_3$P/(CH$_3$CH$_2$CH$_2$)(CH$_3$CH$_2$)(CH$_3$)$_2$P/ (CH$_3$CH$_2$CH$_2$)(CH$_3$CH$_2$)$_2$(CH$_3$)P | (—OSOCF$_2$SOO—)B(CF$_3$)$_2$ | |
| | SO$_3$CF$_3$ | |
| | (CF$_3$SO$_2$)$_2$N | |
| | (—OCOCOO—)$_2$PF$_2$ | |

TABLE 1E-2-continued

| Cations | Anions | |
|---|---|---|
| Formula | Formula | Structure |
| | $(CF_3CF_2)_3PF_3$ | |
| | $(CF_3CF_2CF_2)_3PF_3$ | |
| | $(—OCOCOO—)_2B$ | |
| | $(—OCO(CH_2)_nCOO—)BF(CF_3)$ | n = 1, 2 |
| | $(—OCOCR_2COO—)CF(CF_3)$ | R = H, F |
| | $(—OCOCR_2COO—)B(CF_3)_2$ | R = H, F |

TABLE 1E-4

| Cations | Anions | |
|---|---|---|
| Formula | Formula | Structure |
| 1:3:1 ratio $(CH_3CH_2CH_2)(CH_3)_3P/(CH_3CH_2CH_2)(CH_3CH_2)(CH_3)_2P/(CH_3CH_2CH_2)(CH_3CH_2)_2(CH_3)P$ | $(—OCOCR_2COO—)_2B$ | R = H, F |

TABLE 1E-4-continued
| Cations | Anions | |
|---|---|---|
| Formula | Formula | Structure |
| | $CF_3BF(\text{—}OOR)_2$ | 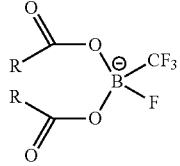<br>R = $CH_3$, —$CH_2CH_3$, —$CH_2CH_2CH_3$ |
| | $CF_3B(\text{—}OOR)_3$ | 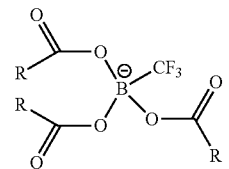<br>R = $CH_3$, —$CH_2CH_3$, —$CH_2CH_2CH_3$ |
| | $CF_3B(\text{—}OOR)F_2$ | 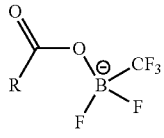<br>R = $CH_3$, —$CH_2CH_3$, —$CH_2CH_2CH_3$ |
| | (—OCOCOCOO—)BF($CF_3$) | 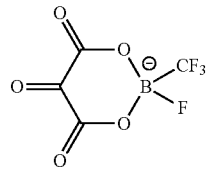 [SMILES: O=C1O[B-](F)(C(F)(F)F)OC(=O)C1=O] |
| | (—OCOCOCOO—)B($CF_3$)$_2$ | 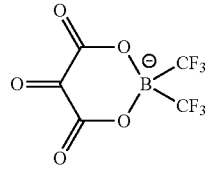 [SMILES: O=C1O[B-](C(F)(F)F)(C(F)(F)F)OC(=O)C1=O] |
| | (—OCOCOCOO—)$_2$B | 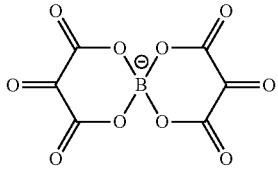 [SMILES: O=C1O[B-]2(OC(=O)C1=O)OC(=O)C(=O)C(=O)O2] |
| | (—OCOCR$^1$R$^2$CR$^1$R$^2$COO—)BF($CF_3$) | 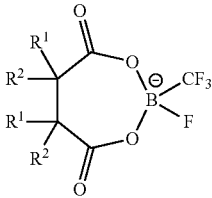<br>R$^1$, R$^2$ = H, F |

TABLE 1E-4-continued

| Cations | Anions | |
|---|---|---|
| Formula | Formula | Structure |
| | (—OCOCR$^1$R$^2$CR$^1$R$^2$COO—)B(CF$_3$)$_2$ | (cyclic structure with R$^1$, R$^2$ groups on a ring containing B with two CF$_3$ groups and two C=O groups; R$^1$, R$^2$ = H, F) |

In some embodiments, the phosphonium electrolyte is comprised of a salt dissolved in a solvent, where the salt is comprised of: one or more cations of the formula:

P(CH$_3$CH$_2$CH$_2$)$_y$(CH$_3$CH$_2$)$_x$(CH$_3$)$_{4-x-y}$
($x,y$=0 to 4; $x+y\leq 4$)

P(CF$_3$CH$_2$CH$_2$)$_y$(CH$_3$CH$_2$)$_x$(CH$_3$)$_{4-x-y}$
($x,y$=0 to 4; $x+y\leq 4$)

P(—CH$_2$CH$_2$CH$_2$CH$_2$—)(CH$_3$CH$_2$CH$_2$)$_y$(CH$_3$CH$_2$)$_x$
(CH$_3$)$_{2-x-y}$ ($x,y$=0 to 2; $x+y\leq 2$)

P(—CH$_2$CH$_2$CH$_2$CH$_2$CH$_2$—)(CH$_3$CH$_2$CH$_2$)$_y$
(CH$_3$CH$_2$)$_x$(CH$_3$)$_{2-x-y}$ ($x,y$=0 to 2; $x+y\leq 2$)

and one or more anions of the formula:

(CF$_3$)$_x$BF$_{4-x}$ ($x$=0 to 4)

(CF$_3$(CF$_2$)$_n$)$_x$PF$_{6-x}$ ($n$=0 to 2; $x$=0 to 4)

(—OCO(CH$_2$)$_n$COO—)(CF$_3$)$_x$BF$_{2-x}$ ($n$=0 to 2; $x$=0 to 2)

(—OCO(CF$_2$)$_n$COO—)(CF$_3$)$_x$BF$_{2-x}$ ($n$=0 to 2; $x$=0 to 2)

(—OCO(CH$_2$)$_n$COO—)$_2$B ($n$=0 to 2)

(—OCO(CF$_2$)$_n$COO—)$_2$B ($n$=0 to 2)

(—OOR)$_x$(CF$_3$)BF$_{3-x}$ ($x$=0 to 3)

(—OCOCOCOO—)(CF$_3$)$_x$BF$_{2-x}$ ($x$=0 to 2)

(—OCOCOCOO—)$_2$B (—OSOCH$_2$SOO—)(CF$_3$)$_x$BF$_{2-x}$ ($x$=0 to 2)

(—OSOCF$_2$SOO—)(CF$_3$)$_x$BF$_{2-x}$ ($x$=0 to 2)

(—OCOCOO—)$_x$(CF$_3$)$_y$PF$_{6-2x-y}$ ($x$=1 to 3; $y$=0 to 4; $2x+y\leq 6$)

In another embodiment, the phosphonium electrolyte is comprised of a salt dissolved in a solvent, wherein the salt is comprised of: one or more cations of the formula:

P(CH$_3$CH$_2$CH$_2$)$_y$(CH$_3$CH$_2$)$_x$(CH$_3$)$_{4-x-y}$ (where $x,y$=0 to 4; $x+y\leq 4$)

and;
one or more anions of the formula:

(CF$_3$)$_x$BF$_{4-x}$ (where $x$=0 to 4)

(CF$_3$(CF$_2$)$_n$)$_x$PF$_{6-x}$ (where $n$=0 to 2; $x$=0 to 4)

(—OCO(CH$_2$)$_n$COO—)(CF$_3$)$_x$BF$_2$, (where $n$=0 to 2; $x$=0 to 2)

(—OCO(CH$_2$)$_n$COO—)$_2$B (where $n$=0 to 2)

(—OSOCH$_2$SOO—)(CF$_3$)$_x$BF$_{2-x}$ (where $x$=0 to 2)

(—OCOCOO—)$_x$(CF$_3$)$_y$PF$_{6-2x-y}$ ($x$=1 to 3; $y$=0 to 4; $2x+y\leq 6$)

In another embodiment, the phosphonium electrolyte is comprised of a salt dissolved in a solvent, wherein the salt is comprised of: one or more cations of the formula:

P(—CH$_2$CH$_2$CH$_2$CH$_2$—)(CH$_3$CH$_2$CH$_2$)$_y$(CH$_3$CH$_2$)$_x$
(CH$_3$)$_{2-x-y}$ (where $x,y$=0 to 2; $x+y\leq 2$)

P(—CH$_2$CH$_2$CH$_2$CH$_2$CH$_2$—)(CH$_3$CH$_2$CH$_2$)$_y$
(CH$_3$CH$_2$)$_x$(CH$_3$)$_{2-x-y}$ (where $x,y$=0 to 2; $x+y\leq 2$)

and;
one or more anions of the formula:

(CF$_3$)$_x$BF$_{4-x}$ (where $x$=0 to 4)

(CF$_3$(CF$_2$)$_n$)$_x$PF$_{6-x}$ (where $n$=0 to 2; $x$=0 to 4)

(—OCO(CH$_2$)$_n$COO—)(CF$_3$)$_x$BF$_2$, (where $n$=0 to 2; $x$=0 to 2)

(—OCO(CH$_2$)$_n$COO—)$_2$B (where $n$=0 to 2)

(—OSOCH$_2$SOO—)(CF$_3$)$_x$BF$_{2-x}$ (where $x$=0 to 2)

(—OCOCOO—)$_x$(CF$_3$)$_y$PF$_{6-2x-y}$ ($x$=1 to 3; $y$=0 to 4; $2x+y\leq 6$)

In one embodiment, the phosphonium electrolyte is comprised of a salt dissolved in a solvent, where the salt is comprised of one or more anions selected from the group consisting of: PF$_6$, (CF$_3$)$_3$PF$_3$, (CF$_3$)$_4$PF$_2$, (CF$_3$CF$_2$)$_4$PF$_2$, (CF$_3$CF$_2$CF$_2$)$_4$PF$_2$, (—OCOCOO—)PF$_4$, (—OCOCOO—)(CF$_3$)$_3$PF, (—OCOCOO—)$_3$P, BF$_4^-$, CF$_3$BF$_3$, (CF$_3$)$_2$BF$_2$, (CF$_3$)$_3$BF, (CF$_3$)$_4$B, (—OCOCOO—)BF$_2$, (—OCOCOO—)BF(CF$_3$), (—OCOCOO—)(CF$_3$)$_2$B, (—OSOCH$_2$SOO—)BF$_2$, (—OSOCF$_2$SOO—)BF$_2$, (—OSOCH$_2$SOO—)BF(CF$_3$), (—OSOCF$_2$SOO—)BF(CF$_3$), (—OSOCH$_2$SOO—)B(CF$_3$)$_2$, (—OSOCF$_2$SOO—)B(CF$_3$)$_2$, CF$_3$SO$_3$, (CF$_3$SO$_2$)$_2$N, (—OCOCOO—)$_2$PF$_2$, (CF$_3$CF$_2$)$_3$PF$_3$, (CF$_3$CF$_2$CF$_2$)$_3$PF$_3$, (—OCOCOO—)$_2$B, (—OCO(CH$_2$)$_1$COO—)BF(CF$_3$), (—OCOCR$_2$COO—)BF(CF$_3$), (—OCOCR$_2$COO—)B(CF$_3$)$_2$, (—OCOCR$_2$COO—)$_2$B, CF$_3$BF(—OOR)$_2$, CF$_3$B(—OOR)$_3$, CF$_3$B(—OOR)F$_2$, (—OCOCOCOO—)BF(CF$_3$), (—OCOCOCOO—)B(CF$_3$)$_2$, (—OCOCOCOO—)$_2$B, (—OCOCR$^1$R$^2$CR$^1$R$^2$COO—)BF(CF$_3$), and (—OCOCR$^1$R$^2$CR$^1$R$^2$COO—)B(CF$_3$)$_2$; and where R, R$^1$, and R$^2$ are each independently H or F.

In one embodiment, the phosphonium electrolyte is comprised of a salt dissolved in a solvent, where the salt is comprised of: a cation of the formula: (CH$_3$CH$_2$CH$_2$)(CH$_3$CH$_2$)(CH$_3$)$_2$P$^+$ and an anion of any one or more of the formula: BF$_4^-$, PF$_6^-$, CF$_3$BF$_3^-$, (—OCOCOO—)BF$_2^-$, (—OCOCOO—)(CF$_3$)$_2$B$^-$, (—OCOCOO—)$_2$B$^-$, CF$_3$SO$_3^-$, C(CN)$_3^-$, (CF$_3$SO$_2$)$_2$N$^-$ or combinations thereof.

In another embodiment, the phosphonium electrolyte is comprised of a salt dissolved in a solvent, where the salt is comprised of: a cation of the formula (CH$_3$)(CH$_3$CH$_2$)$_3$P$^+$ and an anion of any one or more of the formula BF$_4^-$, PF$_6^-$, CF$_3$BF$_3^-$, (—OCOCOO—)BF$_2^-$, (—OCOCOO—)(CF$_3$)$_2$B$^-$, (—OCOCOO—)$_2$B$^-$, CF$_3$SO$_3^-$, C(CN)$_3^-$, (CF$_3$SO$_2$)$_2$N$^-$ or combinations thereof.

In another embodiment, the phosphonium electrolyte is comprised of a salt dissolved in a solvent, where the salt is comprised of: a cation of the formula (CH$_3$CH$_2$CH$_2$)(CH$_3$CH$_2$)$_3$P$^+$ and an anion of any one or more of the formula BF$_4^-$, PF$_6^-$, CF$_3$BF$_3^-$, (—OCOCOO—)BF$_2^-$, (—OCOCOO—)(CF$_3$)$_2$B$^-$, (—OCOCOO—)$_2$B$^-$, CF$_3$SO$_3^-$, C(CN)$_3^-$, (CF$_3$SO$_2$)$_2$N$^-$ or combinations thereof.

In another embodiment, the phosphonium electrolyte is comprised of a salt dissolved in a solvent, where the salt is comprised of: a cation of the formula (CH$_3$CH$_2$CH$_2$)$_3$(CH$_3$)P$^+$ and an anion of any one or more of the formula BF$_4^-$, PF$_6^-$, CF$_3$BF$_3^-$, (—OCOCOO—)BF$_2^-$, (—OCOCOO—)(CF$_3$)$_2$B$^-$, (—OCOCOO—)$_2$B$^-$, CF$_3$SO$_3^-$, C(CN)$_3^-$, (CF$_3$SO$_2$)$_2$N$^-$ or combinations thereof.

In another embodiment, the phosphonium electrolyte is comprised of a salt dissolved in a solvent, where the salt is comprised of: a cation of the formula (CH$_3$CH$_2$CH$_2$)$_3$(CH$_3$CH$_2$)P$^+$ and an anion of any one or more of the formula BF$_4^-$, PF$_6^-$, CF$_3$BF$_3^-$, (—OCOCOO—)BF$_2^-$, (—OCOCOO—)(CF$_3$)$_2$B$^-$, (—OCOCOO—)$_2$B$^-$, CF$_3$SO$_3^-$, C(CN)$_3^-$, (CF$_3$SO$_2$)$_2$N$^-$ or combinations thereof.

In another embodiment, the phosphonium electrolyte is comprised of a salt dissolved in a solvent, where the salt is comprised of: a cation of the formula (CH$_3$CH$_2$CH$_2$)$_2$(CH$_3$CH$_2$)(CH$_3$)P$^+$ and an anion of any one or more of the formula BF$_4^-$, PF$_6^-$, CF$_3$BF$_3^-$, (—OCOCOO—)BF$_2^-$, (—OCOCOO—)(CF$_3$)$_2$B$^-$, (—OCOCOO—)$_2$B$^-$, CF$_3$SO$_3^-$, C(CN)$_3^-$, (CF$_3$SO$_2$)$_2$N$^-$ or combinations thereof.

In another embodiment, the phosphonium electrolyte is comprised of a salt dissolved in a solvent, where the salt is comprised of: a cation of the formula (CH$_3$CH$_2$)$_4$P$^+$ and an anion of any one or more of the formula BF$_4^-$, PF$_6^-$, CF$_3$BF$_3^-$, (—OCOCOO—)BF$_2^-$, (—OCOCOO—)(CF$_3$)$_2$B$^-$, (—OCOCOO—)$_2$B$^-$, CF$_3$SO$_3^-$, C(CN)$_3^-$, (CF$_3$SO$_2$)$_2$N$^-$ or combinations thereof.

In a further embodiment, the phosphonium electrolyte is comprised of a salt dissolved in a solvent, where the salt is comprised of: a cation of the formula 1:3:1 mole ratio of (CH$_3$CH$_2$CH$_2$)(CH$_3$)$_3$P/(CH$_3$CH$_2$CH$_2$)(CH$_3$CH$_2$)(CH$_3$)$_2$P/(CH$_3$CH$_2$CH$_2$)(CH$_3$CH$_2$)$_2$(CH$_3$)P and an anion of any one or more of the formula BF$_4^-$, PF$_6^-$, CF$_3$BF$_3^-$, (—OCOCOO—)BF$_2^-$, (—OCOCOO—)(CF$_3$)$_2$B$^-$, (—OCOCOO—)$_2$B$^-$, CF$_3$SO$_3^-$, C(CN)$_3^-$, (CF$_3$SO$_2$)$_2$N$^-$ or combinations thereof.

In some embodiments, the anions are comprised of a mixture of BF$_4^-$ and CF$_3$BF$_3^-$ at a concentration of [BF$_4^-$]:[CF$_3$BF$_3^-$] mole ratio in the range of 100/1 to 1/1. In other embodiments, the anions are comprised of a mixture of PF$_6^-$ and CF$_3$BF$_3^-$ at a concentration of [PF$_6^-$]:[CF$_3$BF$_3^-$] mole ratio in the range of 100/1 to 1/1. In even further embodiments, the anions are comprised of a mixture of PF$_6^-$ and BF$_4^-$ at a concentration of [PF$_6^-$]:[BF$_4^-$] mole ratio in the range of 100/1 to 1/1.

In another preferred embodiment, phosphonium ionic liquid compositions are comprised of cation and anion combinations as shown in Table 2 below:

TABLE 2

| Cation Structure | Anions |
|---|---|
| (pyrrolidinium-type phosphonium cation with methyl and ethyl substituents) | I$^-$<br>—O$_3$SCF$_3$<br>—N(SO$_2$)$_2$CF$_3$<br>NO$_3^-$<br>CF$_3$BF$_3^-$<br>—O$_3$SCF$_2$CF$_2$CF$_3$<br>SO$_4^{2-}$<br>—N(CN)$_2$ |

In another preferred embodiment, phosphonium ionic liquid compositions are comprised of cation and anion combinations as shown in Table 3 below:

TABLE 3

| Cation Structure | Anions |
|---|---|
| (phosphorinanium cation with methyl and ethyl substituents) | I$^-$<br>—N(SO$_2$)$_2$CF$_3$<br>C(CN)$_3^-$<br>—O$_3$SCF$_2$CF$_2$CF$_3$<br>NO$_3^-$<br>—O$_2$CCF$_3$<br>—O$_2$CCF$_2$CF$_2$CF$_3$ |

In a further preferred embodiment, phosphonium ionic liquid compositions are comprised of the cation and anion combinations as shown in Table 4 below:

TABLE 4

| Cation Structure | Anions |
|---|---|
| (phosphorinanium cation with ethyl and butyl substituents) | I$^-$<br>—N(SO$_2$)$_2$CF$_3$<br>—O$_3$SC$_6$H$_4$CH$_3$<br>—O$_3$SCF$_2$CF$_2$CF$_3$<br>—O$_3$SCF$_3$ |

In yet a further preferred embodiment, phosphonium ionic liquid compositions are comprised of the cation and anion combinations as shown in Table 5 below:

TABLE 5

| Cation Structure | Anions |
|---|---|
| (pyrrolidinium-type phosphonium cation with butyl substituent) | I$^-$<br>—N(SO$_2$)$_2$CF$_3$<br>—O$_3$SCF$_3$<br>—O$_3$SCF$_2$CF$_2$CF$_3$ |

In another preferred embodiment, phosphonium ionic liquid compositions are comprised of the cation and anion combinations as shown in Table 6 below:

TABLE 6

| Cation Structure | Anions |
|---|---|
| (cyclohexyl-methyl-phenyl phosphonium) | I⁻<br>—N(SO₂)₂CF₃<br>—O₃SCF₃<br>NO₃⁻<br>C(CN)₃⁻<br>PF₆⁻ |

In another preferred embodiment, phosphonium ionic liquid compositions are comprised of cation and anion combinations as shown in Table 7 below:

TABLE 7

| Cation Structure | Anions |
|---|---|
| (methyl-phenyl-phospholanium) | I⁻<br>NO₃⁻<br>—N(SO₂)₂CF₃ |

In another preferred embodiment, phosphonium ionic liquid compositions are comprised of cation and anion combinations as shown in Table 8 below:

TABLE 8

| Cation Structure | Anions |
|---|---|
| (diphenyl phosphorinanium) | I⁻<br>—N(SO₂)₂CF₃ |

In another preferred embodiment, phosphonium ionic liquid compositions are comprised of cation and anion combinations as shown in Table 9 below:

TABLE 9

| Cation Structure | Anions |
|---|---|
| (diphenyl phospholanium) | I⁻<br>—N(SO₂)₂CF₃ |

In another preferred embodiment, phosphonium ionic liquid compositions are comprised of cation and anion combinations as shown in Table 10 below:

TABLE 10

| Cation Structure | Anions |
|---|---|
| (diphenyl ethyl methyl phosphonium) | I⁻<br>NO₃⁻<br>—N(SO₂)₂CF₃ |

Additional preferred embodiments include phosphonium ionic liquid compositions are comprised of cation and anion combinations as shown in Table 11 below:

TABLE 11

| Cation Structure | Anions |
|---|---|
| (diphenyl dimethyl phosphonium) | I⁻<br>NO₃⁻<br>—N(SO₂)₂CF₃ |

Provided are further preferred embodiments of phosphonium ionic liquid compositions comprised of cation and anion combinations as shown in Table 12 below:

TABLE 12

| Cation Structure | Anions |
|---|---|
| (phenyl diethyl methyl phosphonium) | I⁻<br>NO₃⁻<br>—N(SO₂)₂CF₃ |

Another preferred exemplary embodiment includes phosphonium ionic liquid compositions comprised of cation and anion combinations as shown in Table 13 below:

TABLE 13

| Cation Structure | Anions |
|---|---|
| (hydroxyethyl triphenyl phosphonium) | Br—<br>—N(SO₂)₂CF₃<br>—O₃SCF₃<br>PF₆⁻<br>NO₃⁻ |

In some embodiments further examples of suitable phosphonium ionic liquid compositions include but are not limited to: di-n-propyl ethyl methyl phosphonium bis-(trifluoromethyl sulfonyl)imide; n-butyl n-propyl ethyl methyl phosphonium bis-(trifluoromethyl sulfonyl)imide; n-hexly n-butyl ethyl methyl phosphonium bis-(trifluoromethyl sulfonyl)imide; and the like.

Illustrative examples of suitable phosphonium ionic liquid compositions further include but are not limited to: 1-ethyl- 1-methyl phospholanium bis-(trifluoromethyl sulfonyl) imide; n-propyl methyl phospholanium bis-(trifluoromethyl sulfonyl)imide; n-butyl methyl phospholanium bis-(trifluoromethyl sulfonyl)imide; n-hexyl methyl phopholanium bis-(trifluoromethyl sulfonyl)imide; and phenyl methyl phospholanium bis-(trifluoromethyl sulfonyl)imide.

In another embodiment, examples of suitable phosphonium ionic liquid compositions include but are not limited to: 1-ethyl-1-methyl phospholanium bis-(trifluoromethyl sulfonyl) imide; n-propyl methyl phospholanium bis-(trifluoromethyl sulfonyl)imide; n-butyl methyl phospholanium bis-(trifluoromethyl sulfonyl imide; n-hexyl methyl phopholanium bis-(trifluoromethyl sulfonyl)imide; and phenyl methyl phospholanium bis-(trifluoromethyl sulfonyl)imide.

Further exemplary embodiments of suitable phosphonium ionic liquid compositions include but are not limited to: 1-ethyl-1-methyl phosphacyclohexane bis-(trifluoromethyl sulfonyl)imide; n-propyl methyl phosphacyclohexane bis-(trifluoromethyl sulfonyl)imide; n-butyl methyl phosphacyclohexane bis-(trifluoromethyl sulfonyl)imide; n-hexyl methyl phosphacyclohexane bis-(trifluoromethyl sulfonyl) imide; and phenyl methyl phosphacyclohexane bis-(trifluoromethyl sulfonyl)imide.

Phosphonium ionic liquids of the present invention may also form a eutectic from one or more solids, or from a solid and a liquid, according to some embodiments. In this instance, the term "ionic liquid" is further defined to include ionic liquid that are eutectics from ionic solids, or from an ionic liquid and an ionic solid, such as binaries, ternaries, and the like.

Redox-Active Molecules

Phosphonium ionic liquids of the present invention described herein can be employed to synthesize a wide range of hybrid components and/or devices, such as for example memory devices and elements. In an exemplary embodiment, phosphonium ionic liquids herein are used to form molecular memory devices where information is stored in a redox-active information storage molecule.

The term "redox-active molecule (ReAM)" herein is meant to refer to a molecule or component of a molecule that is capable of being oxidized or reduced, e.g., by the application of a suitable voltage. As described below, ReAMs can include, but are not limited to macrocycles including porphyrin and porphyrin derivatives, as well as non-macrocyclic compounds, and includes sandwich compounds, e.g. as described herein. In certain embodiments, ReAMs can comprise multiple subunits, for example, in the case of dyads or triads. ReAMs can include ferrocenes, Bipys, PAHs, viologens, and the like. In general, as described below, there are several types of ReAMs useful in the present invention, all based on polydentate proligands, including macrocyclic and non-macrocyclic moieties. A number of suitable proligands and complexes, as well as suitable substituents, are outlined in U.S. Pat. Nos. 6,212,093; 6,728,129; 6,451,942; 6,777, 516; 6,381,169; 6,208,553; 6,657,884; 6,272,038; 6,484,394; and U.S. Ser. Nos. 10/040,059; 10/682,868; 10/445,977; 10/834,630; 10/135,220; 10/723,315; 10/456,321; 10/376, 865; all of which are expressly incorporated by reference, in particular for the structures and descriptions thereof depicted therein.

Suitable proligands fall into two categories: ligands which use nitrogen, oxygen, sulfur, carbon or phosphorus atoms (depending on the metal ion) as the coordination atoms (generally referred to in the literature as sigma ($\sigma$) donors) and organometallic ligands such as metallocene ligands (generally referred to in the literature as pi ($\pi$) donors, and depicted herein as Lm).

In addition, a single ReAM may have two or more redox active. For example, FIG. 13A of U.S. Publication No. 2007/ 0108438 shows two redox active subunits, a porphyrin (shown in the absence of a metal), and ferrocene. Similarly, sandwich coordination compounds are considered a single ReAM. This is to be distinguished from the case where these ReAMs are polymerized as monomers. In addition, the metal ions/complexes of the invention may be associated with a counterion, not generally depicted herein.

Macrocyclic Ligands

In one embodiment, the ReAM is a macrocyclic ligand, which includes both macrocyclic proligands and macrocyclic complexes. By "macrocyclic proligand" herein is meant a cyclic compound which contain donor atoms (sometimes referred to herein as "coordination atoms") oriented so that they can bind to a metal ion and which are large enough to encircle the metal atom. In general, the donor atoms are heteroatoms including, but not limited to, nitrogen, oxygen and sulfur, with the former being especially preferred. However, as will be appreciated by those in the art, different metal ions bind preferentially to different heteroatoms, and thus the heteroatoms used can depend on the desired metal ion. In addition, in some embodiments, a single macrocycle can contain heteroatoms of different types.

A "macrocyclic complex" is a macrocyclic proligand with at least one metal ion; in some embodiments the macrocyclic complex comprises a single metal ion, although as described below, polynucleate complexes, including polynucleate macrocyclic complexes, are also contemplated.

A wide variety of macrocyclic ligands find use in the present invention, including those that are electronically conjugated and those that may not be; however, the macrocyclic ligands of the invention preferably have at least one, and preferably two or more oxidation states, with 4, 6 and 8 oxidation states being of particular significance.

Figure 11A:
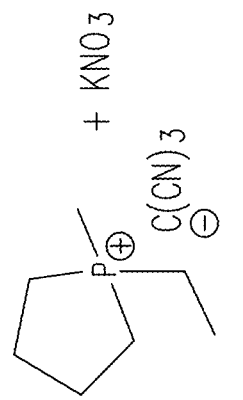
FIG. 11A is a reaction scheme.
Figure 11A:
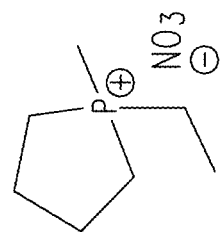

A broad schematic of suitable macrocyclic ligands are shown and described in FIGS. 11 and 14 of U.S. Publication No. 2007/0108438, all of which is incorporated by reference herein in addition to FIGS. 11 and 14. In this embodiment, roughly based on porphyrins, a 16 member ring (when the —X-moiety contains a single atom, either carbon or a heteroatom), 17 membered rings (where one of the —X-moieties contains two skeletal atoms), 18 membered rings (where two of the —X-moieties contains two skeletal atoms), 19 membered rings (where three of the —X-moieties contains two skeletal atoms) or 20 membered rings (where all four of the —X-moieties contains two skeletal atoms), are all contemplated. Each —X-group is independently selected. The -Q-moiety, together with the skeletal —C-heteroatom —C (with either single or double bonds independently connecting the carbons and heteroatom) for 5 or 6 membered rings that are optionally substituted with 1 or 2 (in the case of 5 membered rings) or 1, 2, or 3 (in the case of 6 membered rings) with independently selected R2 groups. In some embodiments, the rings, bonds and substituents are chosen to result in the compound being electronically conjugated, and at a minimum to have at least two oxidation states.

In some embodiments, the macrocyclic ligands of the invention are selected from the group consisting of porphyrins (particularly porphyrin derivatives as defined below), and cyclen derivatives.

Porphyrins

A particularly preferred subset of macrocycles suitable in the invention are porphyrins, including porphyrin derivatives. Such derivatives include porphyrins with extra rings ortho-fused, or ortho-perifused, to the porphyrin nucleus, porphyrins having a replacement of one or more carbon atoms of the porphyrin ring by an atom of another element (skeletal replacement), derivatives having a replacement of a nitrogen atom of the porphyrin ring by an atom of another element (skeletal replacement of nitrogen), derivatives having substituents other than hydrogen located at the peripheral (meso-, (3- or core atoms of the porphyrin, derivatives with saturation of one or more bonds of the porphyrin (hydroporphyrins, e.g., chlorins, bacteriochlorins, isobacteriochlorins, decahydroporphyrins, corphins, pyrrocorphins, etc.), derivatives having one or more atoms, including pyrrolic and pyrromethenyl units, inserted in the porphyrin ring (expanded porphyrins), derivatives having one or more groups removed from the porphyrin ring (contracted porphyrins, e.g., corrin, corrole) and combinations of the foregoing derivatives (e.g. phthalocyanines, sub-phthalocyanines, and porphyrin isomers). Additional suitable porphyrin derivatives include, but are not limited to the chlorophyll group, including etiophyllin, pyrroporphyrin, rhodoporphyrin, phylloporphyrin, phylloerythrin, chlorophyll a and b, as well as the hemoglobin group, including deuteroporphyrin, deuterohemin, hemin, hematin, protoporphyrin, mesohemin, hematoporphyrin mesoporphyrin, coproporphyrin, uruporphyrin and turacin, and the series of tetraarylazadipyrromethines.

As is true for the compounds outlined herein, and as will be appreciated by those in the art, each unsaturated position, whether carbon or heteroatom, can include one or more substitution groups as defined herein, depending on the desired valency of the system.

In one preferred embodiment, the redox-active molecule may be a metallocene, which can be substituted at any appropriate position, using R groups independently selected herein. A metallocene which finds particular use in the invention includes ferrocene and its derivatives. In this embodiment, preferred substituents include, but are not limited to, 4-chlorophenyl, 3-acetamidophenyl, 2,4-dichloro-4-trifluoromethyl. Preferred substituents provide a redox potential range of less than about 2 volts.

It will be appreciated that the oxidation potentials of the members of the series can be routinely altered by changing the metal (M) or the substituents.

Another example of a redox-active molecule comprised of a porphyrin is shown in FIG. 12H of U.S. Publication No. 2007/018438 where F is a redox-active subunit (such as ferrocene, a substituted ferrocene, a metalloporphyrin, or a metallochlorin, and the like), J1 is a linker, M is a metal (such as Zn, Mg, Cd, Hg, Cu, Ag, Au, Ni, Pd, Pt, Co, Rh, Ir, Mn, B, Al, Ga, Pb and Sn) S1 and S2 are independently selected from the group of aryl, phenyl, cyclalkyl, alkyl, halogen, alkoxy, alkylhio, perfluoroalkyl, perfluoroaryl, pyridyl, cyano, thiocyanato, nitro, amino, alkylamino, acyl, sulfoxyl, sulfonyl, imido, amido, and carbamoyl wherein said substituents provide a redox potential range of less than about 2 volts, K1, K2, K3 and K4 are independently selected from the group of N, O, S, Se, Te and CH; L is a linker, X is selected from the group of a substrate, a couple to a substrate, and a reactive site that can ionically couple to a substrate. In preferred embodiments, X or L-X may be an alcohol or a thiol. In some embodiments, L-X can be eliminated and replaced with a substituent independently selected from the same group as S1 or S2.

Control over the hole-storage and hole-hopping properties of the redox-active units of the redox-active molecules used in the memory devices of the present invention allows fine control over the architecture of the memory device.

Such control is exercised through synthetic design. The hole-storage properties depend on the oxidation potential of the redox-active units or subunits that are themselves or are that are used to assemble the storage media used in the devices of this invention. The hole-storage properties and redox potential can be tuned with precision by choice of base molecule(s), associated metals and peripheral substituents (Yang et al. (1999) J. Porphyrins Phthalocyanines, 3: 117-147), the disclosure of which is herein incorporated by this reference.

For example, in the case of porphyrins, Mg porphyrins are more easily oxidized than Zn porphyrins, and electron withdrawing or electron releasing aryl groups can modulate the oxidation properties in predictable ways. Hole-hopping occurs among isoenergetic porphyrins in a nanostructure and is mediated via the covalent linker joining the porphyrins (Seth et al. (1994) J. Am. Chem. Soc., 116: 10578-10592, Seth et al (1996) J. Am. Chem. Soc., 118: 11194-11207, Strachan et al. (1997) J. Am. Chem. Soc., 119: 11191-11201; Li et al. (1997) J. Mater. Chem., 7: 1245-1262, Strachan et al. (1998) Inorg. Chem., 37: 1191-1201, Yang et al. (1999) J. Am. Chem. Soc., 121: 4008-4018), the disclosures of which are herein specifically incorporated by this reference in their entirety.

The design of compounds with predicted redox potentials is well known to those of ordinary skill in the art. In general, the oxidation potentials of redox-active units or subunits are well known to those of skill in the art and can be looked up (see, e.g., Handbook of Electrochemistry of the Elements). Moreover, in general, the effects of various substituents on the redox potentials of a molecule are generally additive. Thus, a theoretical oxidation potential can be readily predicted for any potential data storage molecule. The actual oxidation potential, particularly the oxidation potential of the information storage molecule(s) or the information storage medium can be measured according to standard methods. Typically the oxidation potential is predicted by comparison of the experimentally determined oxidation potential of a base molecule and that of a base molecule bearing one substituent in order to determine the shift in potential due to that particular substituent. The sum of such substituent-dependent potential shifts for the respective substituents then gives the predicted oxidation potential.

The suitability of particular redox-active molecules for use in the methods of this invention can readily be determined. The molecule(s) of interest are simply polymerized and coupled to a surface (e.g., a hydrogen passivated surface) according to the methods of this invention. Then sinusoidal voltammetry can be performed (e.g., as described herein or in U.S. Pat. Nos. 6,272,038; 6,212,093; and 6,208,553, PCT Publication WO 01/03126, or by (Roth et al. (2000) Vac. Sci. Technol. B 18:2359-2364; Roth et al. (2003) J. Am. Chem. Soc. 125:505-517) to evaluate 1) whether or not the molecule(s) coupled to the surface, 2) the degree of coverage (coupling); 3) whether or not the molecule(s) are degraded during the coupling procedure, and 4) the stability of the molecule(s) to multiple read/write operations.

In addition, included within the definition of "porphyrin" are porphyrin complexes, which comprise the porphyrin proligand and at least one metal ion. Suitable metals for the porphyrin compounds will depend on the heteroatoms used as coordination atoms, but in general are selected from transition metal ions. The term "transition metals" as used herein typically refers to the 38 elements in groups 3 through 12 of the periodic table. Typically transition metals are characterized by the fact that their valence electrons, or the electrons they use to combine with other elements, are present in more than one shell and consequently often exhibit several common oxidation states. In certain embodiments, the transition metals of this invention include, but are not limited to one or more of scandium, titanium, vanadium, chromium, manganese, iron, cobalt, nickel, copper, zinc, yttrium, zirconium, niobium, molybdenum, technetium, ruthenium, rhodium, palladium, silver, cadmium, hafnium, tantalum, tungsten, rhenium, osmium, iridium, platinum, gold, mercury, rutherfordium, and/or oxides, and/or nitrides, and/or alloys, and/or mixtures thereof.

Other Macrocycles

There are a number of macrocycles based on cyclen derivatives. FIGS. 17 and 13C of U.S. Publication No. 2007/0108438 shows a number of macrocyclic proligands loosely based on cyclen/cyclam derivatives, which can include skeletal expansion by the inclusion of independently selected carbons or heteroatoms. In some embodiments, at least one R group is a redox active subunit, preferably electronically conjugated to the metal. In some embodiments, including when at least one R group is a redox active subunit, two or more neighboring R2 groups form cycle or an aryl group.

Furthermore, in some embodiments, macrocyclic complexes relying organometallic ligands are used. In addition to purely organic compounds for use as redox moieties, and various transition metal coordination complexes with δ-bonded organic ligand with donor atoms as heterocyclic or exocyclic substituents, there is available a wide variety of transition metal organometallic compounds with π-bonded organic ligands (see Advanced Inorganic Chemistry, 5th Ed., Cotton & Wilkinson, John Wiley & Sons, 1988, chapter 26; Organometallics, A Concise Introduction, Elschenbroich et al., 2nd Ed., 1992, VCH; and Comprehensive Organometallic Chemistry II, A Review of the Literature 1982-1994, Abel et al. Ed., Vol. 7, chapters 7, 8, 10 & 11, Pergamon Press, hereby expressly incorporated by reference). Such organometallic ligands include cyclic aromatic compounds such as the cyclopentadienide ion [C5H5(−1)] and various ring substituted and ring fused derivatives, such as the indenylide (−1) ion, that yield a class of bis(cyclopentadieyl)metal compounds, (i.e. the metallocenes); see for example Robins et al., J. Am. Chem. Soc. 104:1882-1893 (1982); and Gassman et al., J. Am. Chem. Soc. 108:4228-4229 (1986), incorporated by reference. Of these, ferrocene [(C5H5)2Fe] and its derivatives are prototypical examples which have been used in a wide variety of chemical (Connelly et al., Chem. Rev. 96:877-910 (1996), incorporated by reference) and electrochemical (Geiger et al., Advances in Organometallic Chemistry 23:1-93; and Geiger et al., Advances in Organometallic Chemistry 24:87, incorporated by reference) electron transfer or "redox" reactions. Metallocene derivatives of a variety of the first, second and third row transition metals are useful as redox moieties (and redox subunits). Other potentially suitable organometallic ligands include cyclic arenes such as benzene, to yield bis(arene)metal compounds and their ring substituted and ring fused derivatives, of which bis(benzene)chromium is a prototypical example, Other acyclic n-bonded ligands such as the allyl(−1) ion, or butadiene yield potentially suitable organometallic compounds, and all such ligands, in conjunction with other n-bonded and δ-bonded ligands constitute the general class of organometallic compounds in which there is a metal to carbon bond. Electrochemical studies of various dimers and oligomers of such compounds with bridging organic ligands, and additional non-bridging ligands, as well as with and without metal-metal bonds are all useful.

When one or more of the co-ligands is an organometallic ligand, the ligand is generally attached via one of the carbon atoms of the organometallic ligand, although attachment may be via other atoms for heterocyclic ligands. Preferred organometallic ligands include metallocene ligands, including substituted derivatives and the metalloceneophanes (see page 1174 of Cotton and Wilkenson, supra). For example, derivatives of metallocene ligands such as methylcyclopentadienyl, with multiple methyl groups being preferred, such as pentamethylcyclopentadienyl, can be used to increase the stability of the metallocene. In some embodiments, the metallocene is derivatized with one or more substituents as outlined herein, particularly to alter the redox potential of the subunit or moiety.

As described herein, any combination of ligands may be used. Preferred combinations include: a) all ligands are nitrogen donating ligands; b) all ligands are organometallic ligands.

Sandwich Coordination Complexes

In some embodiments, the ReAMs are sandwich coordination complexes. The terms "sandwich coordination compound" or "sandwich coordination complex" refer to a compound of the formula L-Mn-L, where each L is a heterocyclic ligand (as described below), each M is a metal, n is 2 or more, most preferably 2 or 3, and each metal is positioned between a pair of ligands and bonded to one or more hetero atom (and typically a plurality of hetero atoms, e.g., 2, 3, 4, 5) in each ligand (depending upon the oxidation state of the metal). Thus sandwich coordination compounds are not organometallic compounds such as ferrocene, in which the metal is bonded to carbon atoms. The ligands in the sandwich coordination compound are generally arranged in a stacked orientation (i.e., are generally cofacially oriented and axially aligned with one another, although they may or may not be rotated about that axis with respect to one another) (see, e.g., Ng and Jiang (1997) Chemical Society Reviews 26: 433-442) incorporated by reference. Sandwich coordination complexes include, but are not limited to "double-decker sandwich coordination compound" and "triple-decker sandwich coordination compounds". The synthesis and use of sandwich coordination compounds is described in detail in U.S. Pat. Nos. 6,212,093; 6,451,942; 6,777,516; and polymerization of these molecules is described in U.S. Publication No. 2007/0123618, all of which are included herein, particularly the individual substituent groups that find use in both sandwich complexes and the "single" macrocycle" complexes.

The term "double-decker sandwich coordination compound" refers to a sandwich coordination compound as described above where n is 2, thus having the formula L'-M'-LZ, wherein each of L1 and LZ may be the same or different (see, e.g., Jiang et al. (1999) J. Porphyrins Phthalocyanines 3: 322-328) and U.S. Pat. Nos. 6,212,093; 6,451,942; 6,777,516; and polymerization of these molecules is described in U.S. Publication No. 2007/0123618, hereby incorporated by reference in its entirety.

The term "triple-decker sandwich coordination compound" refers to a sandwich coordination compound as described above where n is 3, thus having the formula L'-M' LZ-MZ-L3, wherein each of L1, LZ and L3 may be the same or different, and M1 and MZ may be the same or different (see, e.g., Arnold et al. (1999) Chemistry Letters 483-484), and U.S. Pat. Nos. 6,212,093; 6,451,942; 6,777,516; and polymerization of these molecules is described in U.S. Publication No. 2007/0123618, hereby incorporated by reference in their entirety.

In addition, polymers of these sandwich compounds are also of use; this includes "dyads" and "triads" as described in U.S. Pat. Nos. 6,212,093; 6,451,942; 6,777,516; and polymerization of these molecules is described in U.S. Publication No. 2007/0123618, incorporated by reference.

Non-Macrocyclic Proligands and Complexes

As a general rule, ReAMs comprising non-macrocyclic chelators are bound to metal ions to form non-macrocyclic chelate compounds, since the presence of the metal allows for multiple proligands to bind together to give multiple oxidation states.

In some embodiments, nitrogen donating proligands are used. Suitable nitrogen donating proligands are well known in the art and include, but are not limited to, NH2; NHR; NRR'; pyridine; pyrazine; isonicotinamide; imidazole; bipyridine and substituted derivatives of bipyridine; terpyridine and substituted derivatives; phenanthrolines, particularly 1,10-phenanthroline (abbreviated phen) and substituted derivatives of phenanthrolines such as 4,7-dimethylphenanthroline and dipyridol[3,2-a:2',3'-c]phenazine (abbreviated dppz); dipyridophenazine; 1,4,5,8,9,12-hexaazatriphenylene (abbreviated hat); 9,10-phenanthrenequinone diimine (abbreviated phi); 1,4,5,8-tetraazaphenanthrene (abbreviated tap); 1,4,8,11-tetra-azacyclotetradecane (abbreviated cyclam) and isocyanide. Substituted derivatives, including fused derivatives, may also be used. It should be noted that macrocylic ligands that do not coordinatively saturate the metal ion, and which require the addition of another proligand, are considered non-macrocyclic for this purpose. As will be appreciated by those in the art, it is possible to covalent attach a number of "non-macrocyclic" ligands to form a coordinatively saturated compound, but that is lacking a cyclic skeleton.

Suitable sigma donating ligands using carbon, oxygen, sulfur and phosphorus are known in the art. For example, suitable sigma carbon donors are found in Cotton and Wilkenson, Advanced Organic Chemistry, 5th Edition, John Wiley & Sons, 1988, hereby incorporated by reference; see page 38, for example. Similarly, suitable oxygen ligands include crown ethers, water and others known in the art. Phosphines and substituted phosphines are also suitable; see page 38 of Cotton and Wilkenson.

The oxygen, sulfur, phosphorus and nitrogen-donating ligands are attached in such a manner as to allow the heteroatoms to serve as coordination atoms.

Polynucleating Proligands and Complexes

In addition, some embodiments utilize polydentate ligands that are polynucleating ligands, e.g. they are capable of binding more than one metal ion. These may be macrocyclic or non-macrocyclic.

A number of suitable proligands and complexes, as well as suitable substituents, are outlined in U.S. Pat. Nos. 6,212,093; 6,728,129; 6,451,942; 6,777,516; 6,381,169; 6,208,553; 6,657,884; 6,272,038; 6,484,394; and U.S. patent application Ser. Nos. 10/040,059; 10/682,868; 10/445,977; 10/834,630; 10/135,220; 10/723,315; 10/456,321; 10/376,865; all of which are expressly incorporated by reference, in particular for the structures and descriptions thereof depicted therein.

Applications and Uses of the Phosphonium Ionic Liquids or Salts

As used herein and unless otherwise indicated, the term "memory element," "memory cell," or "storage cell" refer to an electrochemical cell that can be used for the storage of information. Preferred "storage cells" are discrete regions of storage medium addressed by at least one and preferably by two electrodes (e.g., a working electrode and a reference electrode). The storage cells can be individually addressed (e.g., a unique electrode is associated with each memory element) or, particularly where the oxidation states of different memory elements are distinguishable, multiple memory elements can be addressed by a single electrode. The memory element can optionally include a dielectric (e.g., a dielectric impregnated with counter ions).

As used herein the term "electrode" refers to any medium capable of transporting charge (e.g., electrons) to and/or from a storage molecule. Preferred electrodes are metals and conductive organic molecules, including, but not limited to, Group III elements (including doped and oxidized Group III elements), Group IV elements (including doped and oxidized Group IV elements), Group V elements (including doped and oxidized Group V elements) and transition metals (including transition metal oxides and transition metal nitrides). The electrodes can be manufactured to virtually and 2-dimensional or 3-dimensional shape (e.g., discrete lines, pads, planes, spheres, cylinders).

As used herein and unless otherwise indicated, the term "multiple oxidation states" means more than one oxidation state. In preferred embodiments, the oxidation states may reflect the gain of electrons (reduction) or the loss of electrons (oxidation).

As used herein and unless otherwise indicated, the term "multiporphyrin array" refers to a discrete number of two or more covalently-linked porphyrinic macrocycles. The multiporphyrin arrays can be linear, cyclic, or branched.

As used herein and unless otherwise indicated, the term "output of an integrated circuit" refers to a voltage or signal produced by one or more integrated circuit(s) and/or one or more components of an integrated circuit.

As used herein and unless otherwise indicated, the term "present on a single plane," when used in reference to a memory device of this invention refers to the fact that the component(s) (e.g. storage medium, electrode(s), etc.) in question are present on the same physical plane in the device (e.g. are present on a single lamina). Components that are on the same plane can typically be fabricated at the same time, e.g., in a single operation. Thus, for example, all of the electrodes on a single plane can typically be applied in a single (e.g., sputtering) step (assuming they are all of the same material).

As used herein and unless otherwise indicated, a potentiometric device is a device capable of measuring potential across an interface that results from a difference in the equilibrium concentrations of redox molecules in an electrochemical cell.

As used herein and unless otherwise indicated, the term "oxidation" refers to the loss of one or more electrons in an element, compound, or chemical substituent/subunit. In an oxidation reaction, electrons are lost by atoms of the element(s) involved in the reaction. The charge on these atoms must then become more positive. The electrons are lost from the species undergoing oxidation and so electrons appear as products in an oxidation reaction. An oxidation taking place in the reaction $Fe^{2+}(aq) \rightarrow Fe^{3+}(aq) + e^-$ because electrons are lost from the species being oxidized, $Fe^{2+}(aq)$, despite the apparent production of electrons as "free" entities in oxidation reactions. Conversely the term reduction refers to the gain of one or more electrons by an element, compound, or chemical substituent/subunit.

As used herein and unless otherwise indicated, the term "oxidation state" refers to the electrically neutral state or to the state produced by the gain or loss of electrons to an element, compound, or chemical substituent/subunit. In a preferred embodiment, the term "oxidation state" refers to states including the neutral state and any state other than a neutral state caused by the gain or loss of electrons (reduction or oxidation).

As used herein and unless otherwise indicated, the term "read" or "interrogate" refer to the determination of the oxidation state(s) of one or more molecules (e.g. molecules comprising a storage medium).

As used herein and unless otherwise indicated, the term "redox-active unit" or "redox-active subunit" refers to a molecule or component of a molecule that is capable of being oxidized or reduced by the application of a suitable voltage.

As used herein and unless otherwise indicated, the term "refresh" when used in reference to a storage molecule or to a storage medium refers to the application of a voltage to the storage molecule or storage medium to re-set the oxidation state of that storage molecule or storage medium to a predetermined state (e.g., the oxidation state the storage molecule or storage medium was in immediately prior to a read).

As used herein and unless otherwise indicated, the term "reference electrode" is used to refer to one or more electrodes that provide a reference (e.g., a particular reference voltage) for measurements recorded from the working electrode. In preferred embodiments, the reference electrodes in a memory device of this invention are at the same potential although in some embodiments this need not be the case.

As used herein and unless otherwise indicated, a "sinusoidal voltammeter" is a voltammetric device capable of determining the frequency domain properties of an electrochemical cell.

As used herein and unless otherwise indicated, the term "storage density" refers to the number of bits per volume and/or bits per molecule that can be stored. When the storage medium is said to have a storage density greater than one bit per molecule, this refers to the fact that a storage medium preferably comprises molecules wherein a single molecule is capable of storing at least one bit of information.

As used herein and unless otherwise indicated, the term "storage location" refers to a discrete domain or area in which a storage medium is disposed. When addressed with one or more electrodes, the storage location may form a storage cell. However if two storage locations contain the same storage media so that they have essentially the same oxidation states, and both storage locations are commonly addressed, they may form one functional storage cell.

As used herein and unless otherwise indicated, the term "storage medium" refers to a composition comprising a storage molecule of the invention, preferably bonded to a substrate.

A substrate is a, preferably solid, material suitable for the attachment of one or more molecules. Substrates can be formed of materials including, but not limited to glass, plastic, silicon, minerals (e.g., quartz), semiconducting materials, ceramics, metals, etc.

As used herein and unless otherwise indicated, the term "voltammetric device" is a device capable of measuring the current produced in an electrochemical cell as a result of the application of a voltage or change in voltage.

As used herein and unless otherwise indicated, a voltage source is any source (e.g. molecule, device, circuit, etc.) capable of applying a voltage to a target (e.g., an electrode).

As used herein and unless otherwise indicated, the term "working electrode" is used to refer to one or more electrodes that are used to set or read the state of a storage medium and/or storage molecule.

Devices

Some embodiments of the phosphonium ionic liquid compositions of the present invention are useful in forming a variety of hybrid electrical devices. For example, in one embodiment a device is provided, comprising a first electrode, a second electrode; and an electrolyte comprised of an ionic liquid composition, the ionic liquid composition comprising: one or more phosphonium based cations of the general formula:

$$R^1R^2R^3R^4P$$

where $R^1$, $R^2$, $R^3$ and $R^4$ are each independently a substituent group; and one or more anions, and wherein said electrolyte is electrically coupled to at least one of said first and second electrodes. In some embodiment the first electrode is comprised redox active molecules (ReAMs) as described in detail above.

In another embodiment a molecular storage device is provided, comprising a working electrode and a counter electrode configured to afford electrical capacitance; and an ion conducting composition comprising: one or more phosphonium based cations of the general formula above and wherein the ion conducting composition is electrically coupled to at least the working and counter electrodes.

In another embodiment the invention encompasses a molecular memory element that includes a switching device, a bit line and a word line coupled to the switching device and a molecular storage device accessible through the switching device. The molecular storage device is capable of being placed in two or more discrete states, wherein the molecular storage device is placed in one of the discrete states by signals applied to the bit and word line. The molecular storage device comprises a first electrode, a second electrode and an electrolyte of phosphonium based cations and suitable anions between the first and second electrode. Another embodiment encompasses molecular memory arrays comprising a plurality of molecular storage elements where each molecular storage element is capable of being placed in two or more discrete states. A plurality of bit lines and word lines are coupled to the plurality of molecular storage elements such that each molecular storage element is coupled to and addressable by at least one bit line and at least one word line.

The molecular memory device may include an addressable array of molecular storage elements. An address decoder receives a coded address and generates word line signals corresponding to the coded address. A word line driver is coupled to the address decoder and produces amplified word line signals. The amplified word line signals control switches that selectively couple members of the array of molecular storage elements to bit lines. Read/write logic coupled to the bit lines determines whether the molecular memory device is in a read mode or a write mode. In a read mode, sense amplifiers coupled to each bit line detect an electronic state of the selectively coupled molecular storage elements and produce a data signal on the bit line indicative of the electronic state of the selectively coupled molecular storage elements. In a write mode, the read/write logic drives a data signal onto the bit lines and the selectively coupled molecular storage elements.

Another embodiment encompasses devices including logic integrated with embedded molecular memory devices such as application specific integrated circuit (ASIC) and system on chip (SOC) devices and the like. Such implementations comprise one or more functional components formed monolithically with and interconnected to molecular memory devices. The functional components may comprise solid state electronic devices and/or molecular electronic devices.

In particular embodiments, the molecular storage device is implemented as a stacked structure formed subsequent to and above a semiconductor substrate having active devices formed therein. In other embodiments, the molecular storage device is implemented as a micron or nanometer sized hole in a semiconductor substrate having active devices formed therein. The molecular storage device is fabricated using processing techniques that are compatible with the semiconductor substrate and previously formed active devices in the semiconductor substrate. The molecular storage device comprises, for example, an electrochemical cell having two or more electrode surfaces separated by an electrolyte (e.g., a ceramic or solid electrolyte). Storage molecules (e.g., molecules having one or more oxidation states that can be used for storing information) are coupled to an electrode surface within the electrochemical cells.

Other embodiments of the invention include the use of components independently selected from transistor switching devices including field effect transistor; a row decoder coupled to the word line; a column decoder coupled to the bit line; a current preamplifier connected to the bit line; a sense amplifier connected to the bit line, an address decoder that receives a coded address and generates word line signals corresponding to the coded address, a line driver coupled to the address decoder wherein the line driver produces amplified word line signals (optionally wherein the amplified word line signals control switches that selectively couple members of the array of molecular storage elements to bit lines), read/write logic coupled to the bit lines, wherein the read/write logic determines whether the molecular memory devices is in a read mode or a write mode, sense amplifiers coupled to each bit line, wherein when the device is in a read mode, sense amplifiers coupled to each bit line detect an electronic state of the selectively coupled molecular storage elements and produce a data signal on the bit line indicative of the electronic state of the selectively coupled molecular storage elements (such that when the device is in a write mode, the read/write logic drives a data signal onto the bit lines and the selectively coupled molecular storage elements) electrolyte layers; and combinations thereof.

Further embodiments encompass the second electrode being coupled to ground, and the bit and word lines being either perpendicular or parallel.

Additional embodiments have the memory arrays of the invention comprising volatile memory such as DRAM or SRAM, or non-volatile memory such as Flash or ferroelectric memory.

A further embodiment provides arrays wherein the molecular storage device comprises an attachment layer formed on the first electrode, wherein the attachment layer comprises an opening and wherein the molecular material is in the opening and electronically coupled to the second electrode layer and an electrolyte layer formed on the attachment layer.

Another embodiment encompasses a monolithically integrated device comprising logic devices configured to perform a particular function and embedded molecular memory devices of the invention coupled to the logic devices. The device may optionally comprise an application specific integrated circuit (ASIC), a system on chip (SOC), a solid state electronic devices or molecular electronic devices.

The memory devices of this invention can be fabricated using standard methods well known to those of skill in the art. In a preferred embodiment, the electrode layer(s) are applied to a suitable substrate (e.g., silica, glass, plastic, ceramic, etc.) according to standard well known methods (see, e.g., Rai-Choudhury (1997) The Handbook of Microlithography, Micromachining, and Microfabrication, SPIE Optical Engineering Press; Bard & Faulkner (1997) Fundamentals of Microfabrication). A variety of techniques are described below and also in U.S. Pat. Nos. 6,212,093; 6,728,129; 6,451,942; 6,777,516; 6,381,169; 6,208,553; 6,657,884; 6,272,038; 6,484,394; and U.S. Ser. Nos. 10/040,059; 10/682,868; 10/445,977; 10/834,630; 10/135,220; 10/723,315; 10/456,321; 10/376,865; and U.S. Publication No. 20070123618, all of which are expressly incorporated by reference, in particular for the fabrication techniques outlined therein.

There are a wide variety of device and systems architectures that benefit from the use of molecular memory.

Memory devices are operated by receiving an N-bit row address into row address decoder and an M-bit column address into column address decoder. The row address decoder generates a signal on one word line. Word lines may include word line driver circuitry that drives a high current signal onto word lines. Because word lines tend to be long, thin conductors that stretch across much of the chip surface, it requires significant current and large power switches to drive a word lines signal. As a result, line driver circuits are often provided with power supply in addition to power supply circuits (not shown) that provide operating power for the other logic. Word line drivers, therefore, tend to involve large components and the high speed switching of large currents tends to create noise, stress the limits of power supplies and power regulators, and stress isolation structures.

In a conventional memory array there are more columns (bit lines) than rows (word lines) because during refresh operations, each word line is activated to refresh all of storage elements coupled to that word line. Accordingly, the fewer the number of rows, the less time it takes to refresh all of the rows. One feature of the present invention is that the molecular memory elements can be configured to exhibit significantly longer data retention than typical capacitors, in the order of tens, hundreds, thousands or effectively, unlimited seconds. Hence, the refresh cycle can be performed orders of magnitude less frequently or omitted altogether. Accordingly, refresh considerations that actually affect the physical layout of a memory array can be relaxed and arrays of various geometry can be implemented. For example, memory array can readily be manufactured with a larger number of word lines, which will make each word line shorter. As a result, word line driver circuits can be made smaller or eliminated because less current is required to drive each word line at a high speed. Alternatively or in addition, shorter word lines can be driven faster to improve read/write access times. As yet another alternative, each row of memory locations can be provided with multiple word lines to provide a mechanism for storing multiple states of information in each memory location.

Sense amplifiers are coupled to each bit line and operate to detect signals on bit lines 109 that indicate the state of a memory element coupled to that bit line, and amplify that state to an appropriate logic level signal. In one embodiment, sense amplifiers may be implemented with substantially conventional designs as such conventional designs will operate to detect and amplify signals from a molecular memory element. Alternatively, unlike conventional capacitors, some molecular storage elements provide very distinct signals indicating their state. These distinct signals may reduce the need for conventional sense amplifier logic as the state signal from a molecular storage device can be more readily and reliably latched into buffers of read/write logic than can signals stored in conventional capacitors. That is, the present invention can provide devices which are sufficiently large as to obviate the need for a sense amplifier.

Read/write logic includes circuitry for placing the memory device in a read or write state. In a read state, data from molecular array is placed on bit lines (with or without the operation of sense amplifiers), and captured by buffers/latches in read/write logic. Column address decoder will select which bit lines are active in a particular read operation. In a write operation, read/write logic drives data signals onto the selected bit lines such that when a word line is activated, that data overwrites any data already stored in the addressed memory element(s).

A refresh operation is substantially similar to a read operation; however, the word lines are driven by refresh circuitry (not shown) rather than by externally applied addresses. In a refresh operation, sense amplifiers, if used, drive the bit lines to signal levels indicating the current state of the memory elements and that value is automatically written back to the memory elements. Unlike a read operation, the state of bit lines is not coupled to read/write logic during a refresh. This operation is only required if the charge retention time of the molecules used is less than the operational life of the device used, for example, on the order of 10 years for Flash memory.

In an exemplary embedded system that comprises a central processing unit and molecular memory, a memory bus couples a CPU and molecular memory device to exchange address, data, and control signals. Optionally, embedded system may also contain conventional memory coupled to memory bus. Conventional memory may include random access memory (e.g., DRAM, SRAM, SDRAM and the like), or read only memory (e.g., ROM, EPROM, EEPROM and the like). These other types of memory may be useful for caching data molecular memory device, storing operating system or BIOS files, and the like. Embedded system may include one or more input/output (I/O) interfaces that enable CPU to communicate with external devices and systems. I/O interface may be implemented by serial ports, parallel ports, radio frequency ports, optical ports, infrared ports and the like. Further, interface may be configured to communicate using any available protocol including packet-based protocols.

Batteries

Phosphonium ionic liquids, salts, and compositions according to embodiments of the present invention are well suited as electrolytes in battery applications. In one embodiment, a battery is provided comprising: a positive electrode, a negative electrode, a separator between said positive and negative electrode; and an electrolyte. The electrolyte is comprised of an ionic liquid composition or one or more ionic liquids or salts dissolved in a solvent, comprising: one or more phosphonium based cations of the general formula:

wherein: $R^1$, $R^2$, $R^3$ and $R^4$ are each independently a substituent group; and one or more anions. In one embodiment, the electrolyte is comprised of an ionic liquid having one or more phosphonium based cations, and one or more anions, wherein the ionic liquid composition exhibits thermodynamic stability up to 375° C., a liquidus range greater than 400° C., and ionic conductivity of at least 1 mS/cm, or at least 5 mS/cm, or at least 10 mS/cm at room temperature. In another embodiment, the electrolyte is comprised of one or more salts having one or more phosphonium based cations, and one or more anions dissolved in a solvent, wherein the electrolyte composition exhibits ionic conductivity of at least at least 5 mS/cm, or at least 10 mS/cm, or at least 15 mS/cm, or at least 20 mS/cm, or at least 30 mS/cm, or at least 40 mS/cm, or at least 50 mS/cm, or at least 60 mS/cm at room temperature.

A battery comprising electrolyte compositions according to embodiments of the present invention are further described in co-pending U.S. patent application Ser. No. _____ (attorney docket no. 057472-060), filed concurrently herewith, the entire disclosure of which is hereby incorporated by reference.

In some embodiments, the electrolyte composition is comprised of, but not limited to one or more of the following solvents: acetonitrile, ethylene carbonate (EC), propylene carbonate (PC), butylene carbonate (BC), dimethyl carbonate (DMC), diethyl carbonate (DEC), ethylmethyl carbonate (EMC) or methyl ethyl carbonate (MEC), methyl propionate (MP), fluoroethylene carbonate (FEC), fluorobenzene (FB), vinylene carbonate (VC), vinyl ethylene carbonate (VEC), phenylethylene carbonate (PhEC), propylmethyl carbonate (PMC), diethoxyethane (DEE), dimethoxyethane (DME), tetrahydrofuran (THF), γ-butyrolactone (GBL), and γ-valerolactone (GVL).

In some embodiments, the electrolyte composition is comprised of one or more lithium salts having one or more anions selected from the group consisting of: $PF_6^-$, $(CF_3)_3PF_3$, $(CF_3)_4PF_2$, $(CF_3CF_2)_4PF_2$, $(CF_3CF_2CF_2)_4PF_2$, $(-OCOCOO-)PF_4$, $(-OCOCOO-)(CF_3)_3PF$, $(-OCOCOO-)_3P$, $BF_4^-$, $CF_3BF_3$, $(CF_3)_2BF_2$, $(CF_3)_3BF$, $(CF_3)_4B$, $(-OCOCOO-)BF_2$, $(-OCOCOO-)BF(CF_3)$, $(-OCOCOO-)(CF_3)_2B$, $(-OSOCH_2SOO-)BF_2$, $(-OSOCF_2SOO-)BF_2$, $(-OSOCH_2SOO-)BF(CF_3)$, $(-OSOCF_2SOO-)BF(CF_3)$, $(-OSOCH_2SOO-)B(CF_3)_2$, $(-OSOCF_2SOO-)B(CF_3)_2$, $CF_3SO_3$, $(CF_3SO_2)_2N$, $(-OCOCOO-)_2PF_2$, $(CF_3CF_2)_3PF_3$, $(CF_3CF_2CF_2)_3PF_3$, $(-OCOCOO-)_2B$, $(-OCO(CH_2)_nCOO-)BF(CF_3)$, $(-OCOCR_2COO-)BF(CF_3)$, $(-OCOCR_2COO-)B(CF_3)_2$, $(-OCOCR_2COO-)_2B$, $CF_3BF(-OOR)_2$, $CF_3B(-OOR)_3$, $CF_3B(-OOR)F_2$, $(-OCOCOCOO-)BF(CF_3)$, $(-OCOCOCOO-)B(CF_3)_2$, $(-OCOCOCOO-)_2B$, $(-OCOCR^1R^2CR^1R^2COO-)BF(CF_3)$, and $(-OCOCR^1R^2CR^1R^2COO-)B(CF_3)_2$; and where R, $R^1$, and $R^2$ are each independently H or F.

In further embodiments, the electrolyte composition is comprised of, but not limited to one or more of the following lithium salts: lithium hexafluorophosphate ($LiPF_6$), lithium tetrafluoroborate ($LiBF_4$), lithium perchlorate ($LiClO_4$), lithium hexafluoroarsenate ($LiAsF_6$), lithium trifluoromethanesulfonate or lithium triflate ($LiCF_3SO_3$), lithium bis(trifluoromethanesulfonyl)imide ($Li(CF_3SO_2)_2N$ or LiIm), and lithium bis(pentafluoromethanesulfonyl)imide ($Li(CF_3CF_2SO_2)_2N$ or LiBETI).

In a further aspect, the phosphonium electrolyte has reduced flammability and thus improves the safety of battery operation. In an additional aspect, the phosphonium ionic liquid or salt can be used as an additive to facilitate the formation of solid electrolyte interphase (SEI) layer or electrode protective layer. The SEI layer helps widen the electrochemical stability window, suppress battery degradation or decomposition reactions and hence improve battery cycle life.

Phosphonium ionic liquids, salts, and compositions according to embodiments of the present invention are well suited as electrolytes in a variety of batteries such as lithium primary batteries and lithium secondary batteries including lithium-ion batteries and rechargeable lithium metal batteries (sometimes collectively referred to herein as "lithium batteries"). Examples of lithium primary batteries include, but are not limited to: lithium/manganese dioxide ($Li/MnO_2$), lithium/carbon monofluoride (Li/CFx), lithium/silver vanadium oxide ($Li/Ag_2V_4O_{11}$), $Li-(CF)_x$, lithium iron disulfide ($Li/FeS_2$), and lithium/copper oxide (Li/CuO). Examples of lithium-ion batteries (LIBs) include, but are not limited to: an anode of carbon, graphite, graphene, silicon(Si), tin (Sn), Si/Co doped carbon, and metal oxide such as lithium titanate oxide (LTO) and a cathode of lithium cobalt oxide (LCO) ($LiCoO_2$), lithium manganese oxide (LMO) ($LiMn_2O_4$), lithium iron phosphate (LFP) ($LiFePO_4$), lithium nickel manganese cobalt oxide (NMC) ($Li(NiMnCo)O_2$), lithium nickel cobalt aluminum oxide (NCA) ($Li(NiCoAl)O_2$), lithium nickel manganese oxide (LNMO) ($Li_2NiMn_3O_8$), and lithium vanadium oxide (LVO). Examples of rechargeable lithium metal batteries include, but are not limited to: a lithium metal anode with a cathode of lithium cobalt oxide (LCO) ($LiCoO_2$), lithium manganese oxide (LMO) ($Li/Mn_2O_4$), lithium iron phosphate (LFP) ($LiFePO_4$), lithium nickel manganese cobalt (NMC) ($Li(NiMnCo)O_2$), lithium nickel cobalt aluminum (NCA) (Li(NiCoAl)O$_2$), lithium nickel manganese oxide (LNMO) (Li$_2$NiMn$_3$O$_8$), a lithium/sulfur battery, and a lithium/air battery.

In a further embodiment, the above approaches to energy storage may be combined with electrochemical double layer capacitors (EDLCs) to form a hybrid energy storage system comprising an array of batteries and EDLCs.

Electrochemical Double Layer Capacitors

Phosphonium ionic liquids, salts, and compositions according to embodiments of the present invention are well suited as electrolytes in electrochemical double layer capacitor (EDLCs), also called electrochemical capacitors or supercapacitors or ultracapacitors. EDLCs are energy storage devices which can store more energy than traditional capacitors and discharge this energy at higher rates than rechargeable batteries. In addition, the cycle life of electrochemical capacitors should far exceed that of a battery system. EDLCs are attractive for potential applications in emerging technology areas that require electric power in the form of pulses. Examples of such applications include digital communication devices that require power pulses in the millisecond range, and traction power systems in an electric vehicle where the high power demand can last from seconds up to minutes. Battery performance and cycle life deteriorate severely with increasing power demand. A capacitor-battery combination has been proposed where the capacitor handles the peak power and the battery provides the sustained load between pulses. Such a hybrid power system can improve the overall power performance and extend battery cycle life without increase in size or weight of the system.

An EDLC is basically the same as a battery in terms of general design, the difference being that the nature of charge storage in the electrode active material is capacitive; i.e., the charge and discharge processes involve only the movement of electronic charge through the solid electronic phase and ionic movement through the electrolyte solution phase. Compared to batteries, higher power densities and longer cycle life can be achieved because no rate-determining and life-limiting phase transformations take place at the electrode/electrolyte interface in an EDLC device.

The dominant EDLC technology has been based on double-layer type charging at high surface area carbon electrodes, where a capacitor is formed at the carbon/electrolyte interface by electronic charging of the carbon surface with counter-ions in the solution phase migrating to the carbon surface in order to counterbalance that charge. Another technology is based on pseudocapacitance type charging at electrodes of conducting polymers and certain metal oxides. Conducting polymers have been investigated for use in EDLCs. Higher energy densities can be achieved because charging occurs through the volume of the active polymer material rather than just at the outer surface. Metal oxides also have been investigated for use in EDLCs. Charging in such active material has been reported to take place through the volume of the material and, as a result, the charge and energy densities observed are comparable with, or even higher than, those obtained for conducting polymers.

In one embodiment of the present invention, an EDLC device comprises a single cell. Referring to FIG. 1, there is shown a schematic cross-sectional view of a single-cell EDLC 10, which includes a pair of electrodes 12,12' bonded to current collector plates 14,14', a separator film or membrane 16 sandwiched between the two electrodes, and an electrolyte solution 18 (not shown) which permeates and fills the pores of the separator and one or more of the electrodes.

Figure 2B:
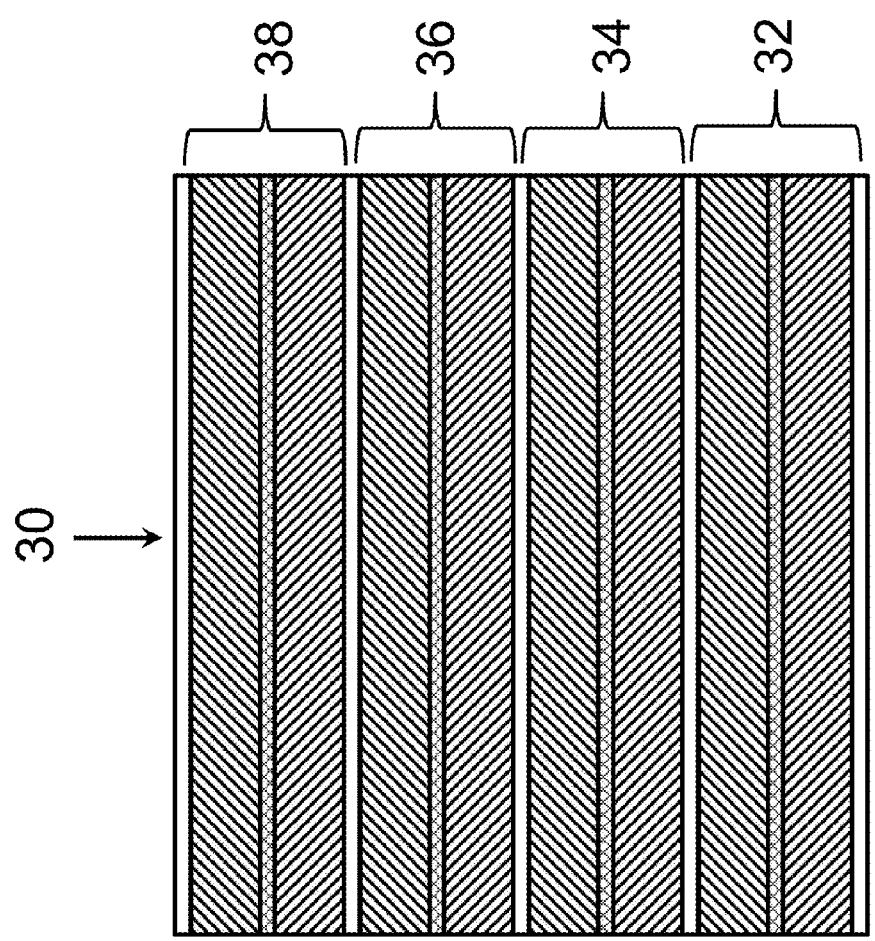
Figure 3:
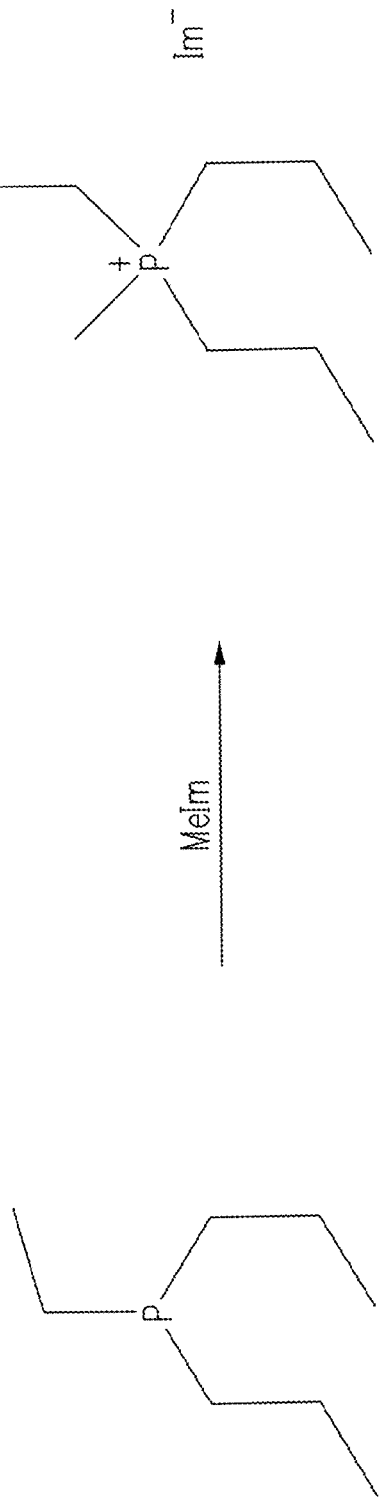
FIG. 3 depicts one reaction scheme to form a phosphonium ionic liquid according to some embodiments of the present invention.
Figure 4:
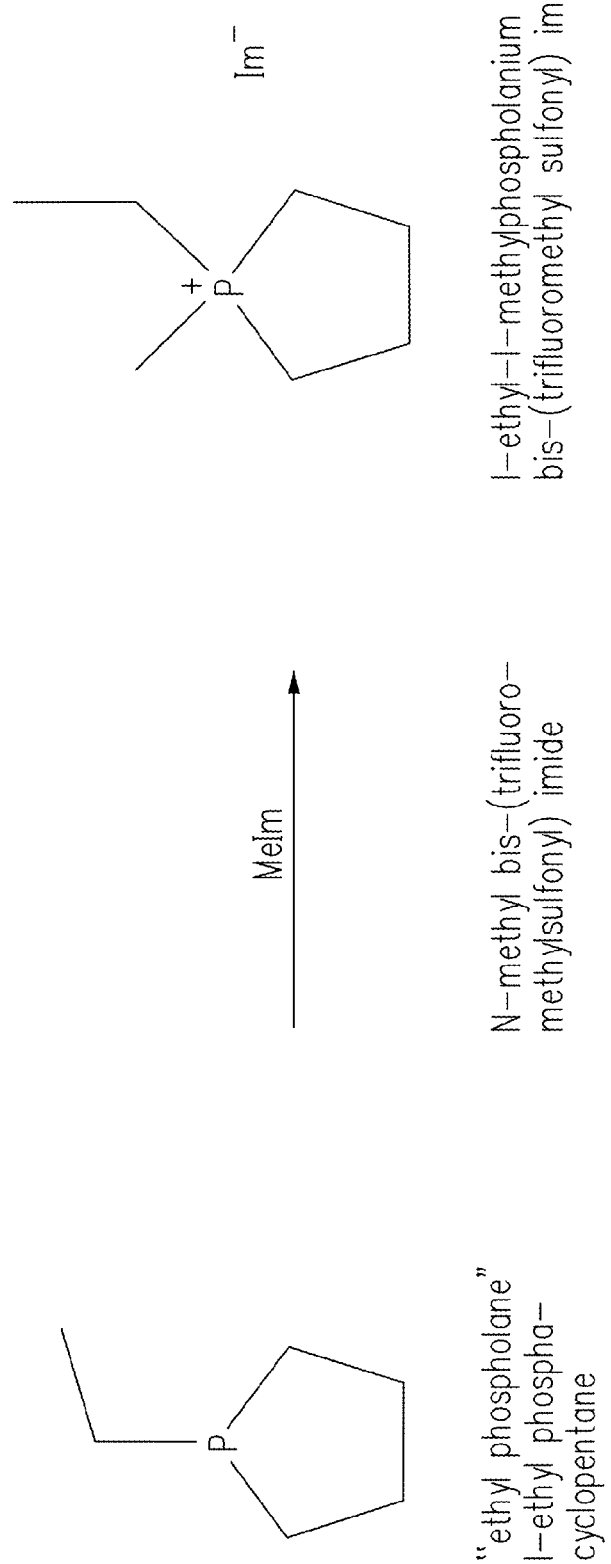
FIG. 4 depicts another reaction scheme to form other embodiments of a phosphonium ionic liquid of the present invention.
Figure 5:
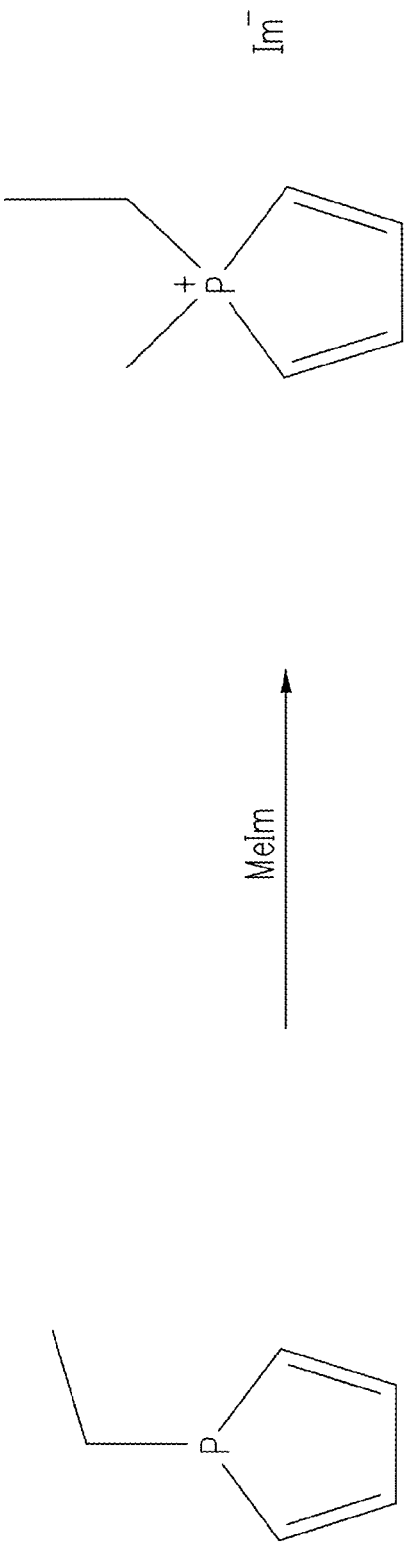
FIG. 5 depicts another reaction scheme to form a phosphonium ionic liquid according to other embodiments of the present invention.
Figure 6:
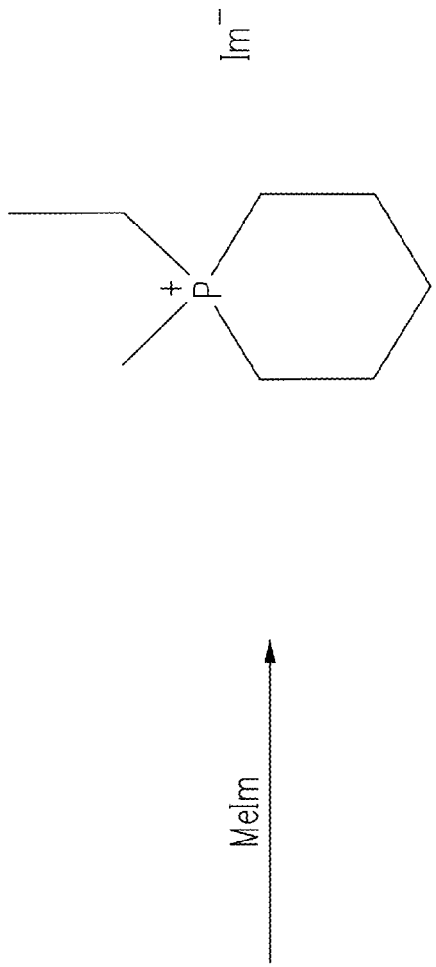
FIG. 6 depicts another reaction scheme to form a phosphonium ionic liquid according to further embodiments of the present invention.

In another embodiment of the present invention, referring to FIGS. 2A and 2B, the capacitor electrode can be fabricated into a bipolar arrangement 20 where two electrodes 22, 24 are attached on both sides of a "bipolar" current collector 26. Multi-cell EDLCs can be fabricated by arranging a number of single cells into a bipolar stack in order to provide needed higher voltage (and power). An exemplary multi-cell EDLC 30 is shown in FIG. 2B where the bipolar stack consists of four unit cells from 32 to 38. Each cell has a structure the same as that of the single cell 10 in FIG. 1. In the bipolar stack, each cell is separated from its neighboring cell with a single current collector plate that also acts as an ionic barrier between cells. Such a design optimizes the current path through the cell, reduces ohmic losses between cells, and minimizes the weight of packaging due to current collection. The result is an efficient capacitor with higher energy and power densities.

In some embodiments, the EDLCs are formed with electrode/separator/electrode assembly in planar or flat structures. In other embodiments, the EDLCs are formed with electrode/separator/electrode assembly in wound spiral structures such as cylindrical and prismatic structures.

In some embodiments, the electrodes are made from high surface area micro- or nano-particles of active materials, which are held together by a binder material to form a porous structure. In addition to the compressed powders with binder, the active materials can be fabricated in other forms such as fibers, woven fibers, felts, foams, cloth, arogels, and mesobeads. Examples of the active materials include but are not limited to: carbons such as carbon blacks, graphite, graphene; carbon-metal composites; conducting polymers such as polyaniline, polypyrrole, polythiophene; oxides, chlorides, bromides, sulfates, nitrates, sulfides, hydrides, nitrides, phosphides, or selenides of lithium, ruthenium, tantalum, rhodium, iridium, cobalt, nickel, molybdenum, tungsten or vanadium, and combinations thereof.

In some embodiments, the electrode binder materials are selected from but not limited to one or more of the following: polyvinylidene fluoride (PVdF), polytetrafluoroethylene (PTFE), styrene-butadiene rubber (SBR), polyacrylonitrile (PAN), polyacrylate, acrylate-type copolymer (ACM), carboxymethyl cellulose (CMC), polyacrylic acid (PAA), polyamide, polyimide, polyurethane, polyvinyl ether (PVE), or combinations thereof.

In some embodiments, the separator materials are selected from but not limited to one or more of the following: films or membranes of micro porous polyolefin such as polyethylene (PE) and polypropylene (PP), polyvinylidene fluoride (PVdF), PVdF coated polyolefin, polytetrafluoroethylene (PTFE), polyvinyl chloride, resorcinol formaldehyde polymer, cellulose paper, non-woven polystyrene cloth, acrylic resin fibers, non-woven polyester film, polycarbonate membrane, and fiberglass paper, or combinations thereof.

In one embodiment, the electrolyte is comprised of an ionic liquid composition or one or more ionic liquids or salts dissolved in a solvent, comprising: one or more phosphonium based cations of the general formula:

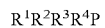

$$R^1R^2R^3R^4P$$

and one or more anions, and wherein: $R^1$, $R^2$, $R^3$ and $R^4$ are each independently a substituent group, such as but not limited to an alkyl group as described below. In some embodiments $R^1$, $R^2$, $R^3$ and $R^4$ are each independently an alkyl group comprised of 1 to 6 carbon atoms, more usually 1 to 4 carbon atoms. Any one or more of the salts may be liquid or solid at a temperature of 100° C. and below. In some embodiments, a salt is comprised of one cation and one anion pair. In other embodiments, a salt is comprised of one cation and multiple anions. In other embodiments, a salt is comprised of one anion and multiple cations. In further embodiments, a salt is comprised of multiple cations and multiple anions.

In one embodiment, the electrolyte is comprised of an ionic liquid having one or more phosphonium based cations, and one or more anions, wherein the ionic liquid composition exhibits thermodynamic stability up to 375° C., a liquidus range greater than 400° C., and ionic conductivity of at least 1 mS/cm, or at least 5 mS/cm, or at least 10 mS/cm at room temperature. In another embodiment, the electrolyte is comprised of one or more salts having one or more phosphonium based cations, and one or more anions dissolved in a solvent, wherein the electrolyte composition exhibits ionic conductivity of at least at least 5 mS/cm, or at least 10 mS/cm, or at least 15 mS/cm, or at least 20 mS/cm, or at least 30 mS/cm, or at least 40 mS/cm, or at least 50 mS/cm, or at least 60 mS/cm at room temperature.

In another embodiment, the electrolyte composition further comprises one or more conventional, non-phosphonium salts. In some embodiments the electrolyte composition may be comprised of conventional salts, and wherein the phosphonium based ionic liquids or salts disclosed herein are additives. In some embodiments electrolyte composition is comprised of phosphonium based ionic liquids or salts and one or more conventional salts, present at a mole (or molar) ratio in the range of 1:100 to 1:1, phosphonium based ionic liquid or salt: conventional salt. Examples of the conventional salts include but are not limited to salts which are comprised of one or more cations selected from the group consisting of: tetraalkylammonium such as $(CH_3CH_2)_4N^+$, $(CH_3CH_2)_3(CH_3)N^+$, $(CH_3CH_2)_2(CH_3)_2N^+$, $(CH_3CH_2)(CH_3)_3N^+$, $(CH_3)_4N^+$, imidazolium, pyrazolium, pyridinium, pyrazinium, pyrimidnium, pyridazinium, pyrrolidinium and one or more anions selected from the group consisting of: $ClO_4^-$, $BF_4^-$, $CF_3SO_3^-$, $PF_6^-$, $AsF_6^-$, $SbF_6^-$, $(CF_3SO_2)_2N^-$, $(CF_3CF_2SO_2)_2N^-$, $(CF_3SO_2)_3C^-$. In some embodiments, the one or more conventional salts include but not limited to: tetraethylammonium tetrafluorborate ($TEABF_4$), triethylmethylammonium tetrafluoroborate ($TEMABF_4$), 1-ethyl-3-methylimidazolium tetrafluoroborate ($EMIBF_4$), 1-ethyl-1-methylpyrrolidinium tetrafluoroborate ($EMPBF_4$), 1-ethyl-3-methylimidazolium bis(trifluoromethanesulfonyl)imide (EMIIm), 1-ethyl-3-methylimidazolium hexafluorophosphate ($EMIPF_6$). In some embodiments, the one or more conventional salts are lithium based salts including but not limited to: lithium hexafluorophosphate ($LiPF_6$), lithium tetrafluoroborate ($LiBF_4$), lithium perchlorate ($LiClO_4$), lithium hexafluoroarsenate ($LiAsF_6$), lithium trifluoromethanesulfonate or lithium triflate ($LiCF_3SO_3$), lithium bis(trifluoromethanesulfonyl)imide ($Li(CF_3SO_2)_2N$ or LiIm), and lithium bis(pentafluoromethanesulfonyl)imide ($Li(CF_3CF_2SO_2)_2N$ or LiBETI).

In some embodiments, the electrolyte composition is further comprised of, but not limited to one or more of the following solvents: acetonitrile, ethylene carbonate (EC), propylene carbonate (PC), butylene carbonate (BC), dimethyl carbonate (DMC), diethyl carbonate (DEC), ethylmethyl carbonate (EMC) or methyl ethyl carbonate (MEC), methyl propionate (MP), fluoroethylene carbonate (FEC), fluorobenzene (FB), vinylene carbonate (VC), vinyl ethylene carbonate (VEC), phenylethylene carbonate (PhEC), propylmethyl carbonate (PMC), diethoxyethane (DEE), dimethoxyethane (DME), tetrahydrofuran (THF), γ-butyrolactone (GBL), and γ-valerolactone (GVL).

In one embodiment, the phosphonium electrolyte composition disclosed herein may be applied onto the porous electrodes and separator prior to the cell assembly by any suitable means, such as by soaking, spray, screen printing, and the like. In another embodiment, the phosphonium electrolyte composition disclosed herein may be applied onto the porous electrodes and separator after the cell assembly by any suitable means, such as by using a vacuum injection apparatus. In another embodiment, the phosphonium electrolyte composition disclosed herein may be formed into a polymer gel electrolyte film or membrane. Alternatively, the polymer gel electrolyte may be applied onto the electrodes directly. Both of such free-standing gel electrolyte films or gel electrolyte coated electrodes are particularly suitable for high volume and high throughput manufacturing process, such as roll-to-roll winding process. Another advantage of such electrolyte film can function not only as the electrolyte but also as a separator. Such electrolyte films may also be used as an electrolyte delivery vehicle to precisely control the amount and distribution of the electrolyte solution thus improving cell assembly consistency and increasing product yield. In some embodiments, the electrolyte film is comprised of a membrane as described in co-pending patent application Ser. No. 12/027,924 filed on Feb. 7, 2008, the entire disclosure of which is hereby incorporated by reference.

In some embodiments, the current collectors are selected from but not limited to one or more of the following: plates or foils or films of aluminum, carbon coated aluminum, stainless steel, carbon coated stainless steel, gold, platinum, silver, highly conductive metal or carbon doped plastics, or combinations thereof.

In one embodiment, both electrodes 12, 12' of a single-cell EDLC 10 can be fabricated with the same type of active material, to provide a symmetric electrode configuration. Alternatively, an EDLC may have an asymmetric electrode configuration, in which each electrode is formed of a different type of active material. A symmetric EDLC, the preferred embodiment, is easier to fabricate than an asymmetric EDLC. The symmetric EDLC also allows the polarity of the two electrodes to be reversed, a possible advantage for continuous high performance during long-term charge cycling. However, an asymmetric EDLC may be selected where the choice of electrode material is determined by cost and performance.

In an exemplary embodiment, an EDLC device comprises a pair of porous electrodes made of activated carbon bonded to aluminum current collectors, a NKK cellulose separator sandwiched between the two electrodes, and a phosphonium electrolyte disclosed herein which permeates and fills the pores of the separator and the electrodes.

In another exemplary embodiment, an EDLC is made as a stack of cell components. Electrode active materials of activated carbon particles and binders are adhered to one side of a current collector to form a single-side electrode or on both sides of a "bipolar" current collector to form a bipolar or double-sided electrode as illustrated in FIGS. 2A and 2B. A multi-cell stack is made by positioning a first NKK cellulose separator on top of the a first single-sided electrode, a first bipolar electrode on top of the first separator, a second separator on top of the first bipolar electrode, a second bipolar electrode on top of the second separator, a third separator on top of the second bipolar electrode, a third bipolar electrode on top of the third separator, a fourth separator on top of the third bipolar electrode, and a second single-sided electrode on top of the fourth separator to form a 4-cell stack. An EDLC that includes many more cells can be made first forming muti-cell modules as described above. The modules are then stacked one on top of another until a desired number of modules has been reached. The electrode/separator/electrode assembly is sealed partially around the edges. A sufficient amount of a phosphonium electrolyte disclosed herein is added to the assembly to fill the pores of the separator and the electrodes before the edges are sealed completely.

In another exemplary embodiment, a spiral-wound EDLC is formed. Electrode active materials of activated carbon particles and binders are adhered to both sides of a current collector to form a double-sided electrode similar to the structure as illustrated in FIGS. 2A and 2B. An electrode/separator stack or assembly is made by positioning a first electrode on top of a first Celgard® polypropylene/polyethylene separator, a second separator on top of the first electrode, and a second electrode on top of the second separator. The stack is wound into a tight cell core of either a round spiral to form a cylindrical structure or a flattened spiral to form a prismatic structure. The stack is then either partially sealed at the edges or placed into a can. A sufficient amount of any of the electrolytes described herein is added to the pores of the separator and the electrodes of the stack before final sealing.

In another exemplary embodiment, an EDLC device may be built using the phosphonium electrolyte composition disclosed herein and a conducting polymer as the electrode active material on one or both electrodes, in order to increase the total storage density of the device. The conducting polymer may be chosen from any of the classes of conducting organic materials, including polyanilines, polypyrroles, and polythiophenes. Of particular interest are polythiophenes such as poly(3-(4-fluorophenyl)thiophene) (PFPT), which are known to have good stability to electrochemical cycling, and can be processed readily.

In a further exemplary embodiment, an EDLC device may be built using the phosphonium electrolyte composition disclosed herein, a cathode (positive electrode) made of high surface area activated carbon and an anode (negative electrode) made of lithium ion intercalated graphite. The EDLC formed is an asymmetric hybrid capacitor, called lithium ion capacitor (LIC).

A key requirement for enhanced energy cycle efficiency and delivery of maximum power is a low cell equivalent series resistance (ESR). Hence, it is useful for EDLC electrolytes to have high conductivity to ion movement. Surprisingly, when a phosphonium electrolyte composition disclosed herein, as described above, replaces a conventional electrolyte or when a phosphonium salt is used as an additive with a conventional electrolyte, the ionic conductivity is significantly increased; and the performance stability of the EDLC device is greatly improved, as can be seen in the Examples below.

In one exemplary embodiment, a neat phosphonium ionic liquid $(CH_3CH_2CH_2)(CH_3CH_2)(CH_3)_2PC(CN)_3$ without a solvent exhibits an ionic conductivity of 15.2 mS/cm.

In another exemplary embodiment, the phosphonium ionic liquid (CH3CH2CH2)(CH3CH2)(CH3)2PC(CN)3 when mixed in a solvent of acetonitrile (ACN) exhibits an ionic conductivity of 75 mS/cm at ACN/ionic liquid volume ratio between 1.5 and 2.0.

In another exemplary embodiment, the phosphonium ionic liquid (CH3CH2CH2)(CH3CH2)(CH3)2PC(CN)3 when mixed in a solvent of propylene carbonate (PC) exhibits an ionic conductivity of 22 mS/cm at PC/ionic liquid volume ratio between 0.75 and 1.25).

In other exemplary embodiments, various phosphonium salts are dissolved in acetonitrile (ACN) solvent at 1.0 M concentration. The resulting electrolytes exhibit ionic conductivity at room temperature greater than about 28 mS/cm, or greater than about 34 mS/cm, or greater than about 41 mS/cm, or greater than about 55 mS/cm, or greater than about 61 mS/cm.

In another exemplary embodiment, to a conventional electrolyte solution of 1.0 M $LiPF_6$ in a mixed solvent of EC (ethylene carbonate) and DEC (diethyl carbonate) at 1:1 weight ratio, noted as EC:DEC=1:1, a phosphonium salt $(CH_3CH_2CH_2)(CH_3CH_2)(CH_3)_2PC(CN)_3$ is added at 10 w %. The ionic conductivity of the electrolyte is increased by 109% at −30° C., and about 25% at +20° C. and +60° C. with the addition of the phosphonium additive. In general, ionic conductivity of the conventional electrolyte solution increased by at least 25% as a result of the phosphonium additive.

In a further exemplary embodiment, to a conventional electrolyte solution of 1.0 M $LiPF_6$ in a mixed solvent of EC (ethylene carbonate), DEC (diethyl carbonate) and EMC (ethylmethyl carbonate) at 1:1:1 weight ratio, noted as EC:DEC:EMC 1:1:1, a phosphonium salt $(CH_3CH_2CH_2)(CH_3CH_2)(CH_3)_2PCF_3BF_3$ is added at 10 w %. The ionic conductivity of the electrolyte is increased by 36% at 20° C., 26% at 60° C., and 38% at 90° C. with the addition of the phosphonium additive. In general, ionic conductivity of the conventional electrolyte solution is increased by at least 25% as a result of the phosphonium additive.

It is found that the separator is the largest single source of cell ESR. Therefore a suitable separator needs to have high ionic conductivity when soaked with electrolyte and has minimum thickness. In one embodiment, the separator is less than about 100 µm thick. In another embodiment, the separator is less than about 50 µm thick. In another embodiment, the separator is less than about 30 µm thick. In yet another embodiment, the separator is less than about 10 µm thick.

Another important advantage of the novel phosphonium electrolyte compositions, either as replacements or using phosphonium salts as additives in conventional electrolytes, disclosed herein is that they exhibit wider electrochemical voltage stability window compared to the conventional electrolytes.

In some exemplary embodiments, various phosphonium salts are dissolved in acetonitrile (ACN) solvent to form electrolyte solutions at 1.0 M concentration. The electrochemical voltage window is determined in cells with a Pt working electrode and a Pt counter electrode and an Ag/Ag+ reference electrode. In one arrangement, the stable voltage window is between about −3.0 V and +2.4 V. In another arrangement, the voltage window is between about −3.2 V and +2.4 V. In another arrangement, the voltage window is between about −2.4 V and +2.5 V. In another arrangement, the voltage window is between about −1.9 V and +3.0 V.

In additional exemplary embodiments, single-cell EDLCs are comprised of two carbon electrodes, a cellulose separator sandwiched between the two electrodes, and an electrolyte solution of various phosphonium salts dissolved in a solvent of propylene carbonate (PC) at 1.0 M concentration. In one arrangement, the EDLC can be charged and discharged from 0 V to 3.9 V. In another arrangement, the EDLC can be charged and discharged from 0 V to 3.6 V. In another arrangement, the EDLC can be charged and discharged from 0 V to 3.3 V. In further arrangements of EDLCs configured in symmetric structures, the EDLC can be operated between −3.9 V and +3.9 V, or between −3.6 V and +3.6 V, or between −3.3 V to +3.3 V.

Another important advantage of using phosphonium electrolyte compositions disclosed herein, either as replacements or using phosphonium salts as additives in a conventional electrolyte of an EDLC is that they exhibit reduced vapor pressure and therefore flammability as compared to conventional electrolytes, and thus improve the safety of EDLC operation. In one aspect of the invention, when phosphonium salts are used as additives with conventional electrolytes (which contain conventional, non-phosphonium salts), the phosphonium salt and the conventional salt are present in the electrolyte at a mole ratio in the range of 1/100 to 1/1, phosphonium salt/conventional salt. Examples of conventional salts include, but are not limited to: tetraethylammonium tetrafluorborate (TEABF$_4$), triethylmethylammonium tetrafluoroborate (TEMABF$_4$), 1-ethyl-3-methylimidazolium tetrafluoroborate (EMIBF$_4$), 1-ethyl-3-methylimidazolium bis(trifluoromethanesulfonyl)imide (EMIIm), 1-ethyl-3-methylimidazolium hexafluorophosphate (EMIPF$_6$).

In one exemplary embodiment, an electrolyte was formed by dissolving phosphonium salt —(CH$_3$CH$_2$CH$_2$)(CH$_3$CH$_2$)(CH$_3$)$_2$PCF$_3$BF$_3$ in a solvent of acetonitrile (ACN) to 1.0 M concentration. The vapor pressure of ACN was lowered by about 39% at 25° C., and by 38% at 105° C. The significant suppression in vapor pressure by phosphonium salt is an advantage in reducing the flammability of the electrolyte solution, thus improving the safety of device operation.

In another exemplary embodiment, a conventional electrolyte solution of 1.0 M LiPF$_6$ in a mixed solvent of EC (ethylene carbonate) and DEC (diethyl carbonate) at 1:1 weight ratio, noted as EC:DEC=1:1, was provided by Novolyte Technologies (part of BASF Group). The phosphonium salt (CH$_3$CH$_2$CH$_2$)(CH$_3$CH$_2$)(CH$_3$)$_2$PC(CN)$_3$ was added to the standard electrolyte solution at 20 w %. The fire self-extinguishing time was reduced by 53% with the addition of the phosphonium additive to the conventional electrolyte. This is an indication that the safety and reliability of energy storage devices can be substantially improved by using the phosphonium salt as an additive in the conventional electrolytes.

A further important advantage of the EDLCs formed according to the present invention compared to the prior art is their wide temperature range. As can be seen in the Examples below, the EDLCs made with the novel phosphonium electrolytes disclosed herein can be operated in a temperature range between about −50° C. and +120° C., or between about −40° C. and +105° C., or between −20° C. and +85° C., or between −10° C. and +65° C. Thus, with the materials and structures disclosed herein, it is now possible to make EDLCs that can function in extended temperature ranges. This makes it possible to implement these devices into broad applications that experience a wide temperature range during fabrication and/or operation.

In some preferred embodiments, the EDLCs are designed to operate at different voltage and temperature combinations. In one arrangement, the EDLC can be operated at 2.5 V and 120° C. In another arrangement, the EDLC can be operated or at 2.7 V and 105° C. In another arrangement, the EDLC can be operated or at 2.8 V and 85° C. In another arrangement, the EDLC can be operated at 3.0 V and 70° C. In a further arrangement, the EDLC can be operated at 3.5 V at 60° C., In a further embodiment, the above approaches to energy storage may be combined with batteries to form a capacitor-battery hybrid energy storage system comprising an array of batteries and EDLCs.

Electrolytic Capacitors

Phosphonium ionic liquids, salts, and compositions according to embodiments of the present invention are well suited as electrolytes in electrolytic capacitors. In one embodiment, an electrolytic capacitor provided comprising: a positive electrode, a negative electrode, a separator between said positive and negative electrode; and an electrolyte. The electrolyte is comprised of an ionic liquid composition or one or more ionic liquids or salts dissolved in a solvent, comprising: one or more phosphonium based cations of the general formula:

$R^1R^2R^3R^4P$ wherein: $R^1$, $R^2$, $R^3$ and $R^4$ are each independently a substituent group; and one or more anions. In one embodiment, the electrolyte is comprised of an ionic liquid having one or more phosphonium based cations, and one or more anions, wherein the ionic liquid composition exhibits thermodynamic stability up to 375° C., a liquidus range greater than 400° C., and ionic conductivity of at least 1 mS/cm, or at least 5 mS/cm, or at least 10 mS/cm at room temperature. In another embodiment, the electrolyte is comprised of one or more salts having one or more phosphonium based cations, and one or more anions dissolved in a solvent, wherein the electrolyte composition exhibits ionic conductivity of at least at least 5 mS/cm, or at least 10 mS/cm, or at least 15 mS/cm, or at least 20 mS/cm, or at least 30 mS/cm, or at least 40 mS/cm, or at least 50 mS/cm, or at least 60 mS/cm at room temperature. In some embodiments, the electrolyte composition is comprised of, but not limited to one or more of the following solvents: acetonitrile, ethylene carbonate (EC), propylene carbonate (PC), butylene carbonate (BC), dimethyl carbonate (DMC), diethyl carbonate (DEC), ethylmethyl carbonate (EMC) or methyl ethyl carbonate (MEC), methyl propionate (MP), fluoroethylene carbonate (FEC), fluorobenzene (FB), vinylene carbonate (VC), vinyl ethylene carbonate (VEC), phenylethylene carbonate (PhEC), propylmethyl carbonate (PMC), diethoxyethane (DEE), dimethoxyethane (DME), tetrahydrofuran (THF), γ-butyrolactone (GBL), and γ-valerolactone (GVL. In one embodiment, the positive electrode—the anode is typically an aluminum foil with thin oxide film formed by electrolytic oxidation or anodization. While aluminum is the preferred metal for the anode, other metals such as tantalum, magnesium, titanium, niobium, zirconium and zinc may be used. The negative electrode—the cathode is usually an etched an etched aluminum foil. In a further aspect, the phosphonium electrolyte exhibits reduced flammability as compared to conventional electrolytes, and thus improves the safety of the electrolytic capacitor operation.

Dye Sensitized Solar Cells

Phosphonium ionic liquids, salts, and compositions according to embodiments of the present invention are well suited as electrolytes in dye sensitized solar cells (DSSCs). In one embodiment, a DSSC is provided comprising: a dye molecule attached anode, an electrolyte containing a redox system, and a cathode. The electrolyte is comprised of an ionic liquid composition or one or more ionic liquids or salts dissolved in a solvent, comprising: one or more phosphonium based cations of the general formula:

$R^1R^2R^3R^4P$ wherein: $R^1$, $R^2$, $R^3$ and $R^4$ are each independently a substituent group; and one or more anions. In another embodiment, the electrolyte is characterized as having one or more phosphonium based cations, and one or more anions, wherein the electrolyte composition exhibits least two or more of: thermodynamic stability, low volatility, wide liquidus range, ionic conductivity, chemical stability, and electrochemical stability. In another embodiment, the electrolyte is characterized as having one or more phosphonium based cations, and one or more anions, wherein the electrolyte composition exhibits thermodynamic stability up to a temperature of approximately 375° C. or greater, and ionic conductivity of at least 5 mS/cm, or at least 10 mS/cm, or at least 15 mS/cm.

Electrolytic Films

Phosphonium ionic liquids, salts, and compositions according to embodiments of the present invention are well suited as electrolytic or electrolyte films. In one embodiment, an electrolytic film is provided comprising: a phosphonium ionic liquid composition applied to a substrate. In another embodiment, an electrolytic film is provided comprising: one or more phosphonium ionic liquids or salts dissolved in a solvent applied to a substrate. In one example, one or more phosphonium ionic liquids or salts are dissolved in a solvent to form a coating solution. The solution is applied to a substrate by any suitable means, such as by spray, spin coating, and the like. The substrate is then heated to partially or completely remove the solvent, forming the electrolyte or ion-conducting film. In other embodiments, solutions of ionic liquids, salts, and polymers, dissolved in suitable solvents, are coated onto substrates, such as by spray or spin coating, and then the solvents-are partially or completely evaporated. This results in the formation of ion-conducting polymer gels/films. Such films are particularly suitable as electrolytes for batteries, EDLCs, and DSSCs, and as fuel cell membranes.

Heat Transfer Medium

The desirable properties of high thermodynamic stability, low volatility and wide liquidus range of the phosphonium ionic liquids of the present invention are well suited as heat transfer medium. Some embodiments of the present invention provide a heat transfer medium, comprising an ionic liquid composition or one or more salts dissolved in a solvent comprising: one or more phosphonium based cations, and one or more anions, wherein the heat transfer medium exhibits thermodynamic stability up to a temperature of approximately 375° C., a liquidus range of greater than 400° C. In some embodiments, the heat transfer medium of the invention is a high temperature reaction media. In another embodiment, the heat transfer medium of the invention is a heat extraction media.

Other Applications

The phosphonium ionic liquids of the present invention find use in additional applications. In one exemplary embodiment, an embedded capacitor is proved. In one embodiment the embedded capacitor is comprised of a dielectric disposed between two electrodes, where the dielectric is comprised of an electrolytic film of a phosphonium ionic composition as described above. The embedded capacitor of the present invention may be embedded in an integrated circuit package. Further embodiments include "on-board" capacitor arrangements.

The above descriptions are meant to be illustrative, but not limit the applications of these phosphonium ionic liquid electrolyte compositions to the listed applications or processes.

EXAMPLES

Embodiments of the present invention are now described in further detail with reference to specific Examples. The Examples provided below are intended for illustration purposes only and in no way limit the scope and/or teaching of the invention.

In general, phosphonium ionic liquids were prepared by either metathesis reactions of the appropriately substituted phosphonium salt with the appropriately substituted metal salt, or by reaction of appropriately substituted phosphine precursors with an appropriately substituted anion precursor. FIGS. 3 to 6 illustrate reaction schemes to make four exemplary embodiments of phosphonium ionic liquids of the present invention.

Example 1

Figure 7:
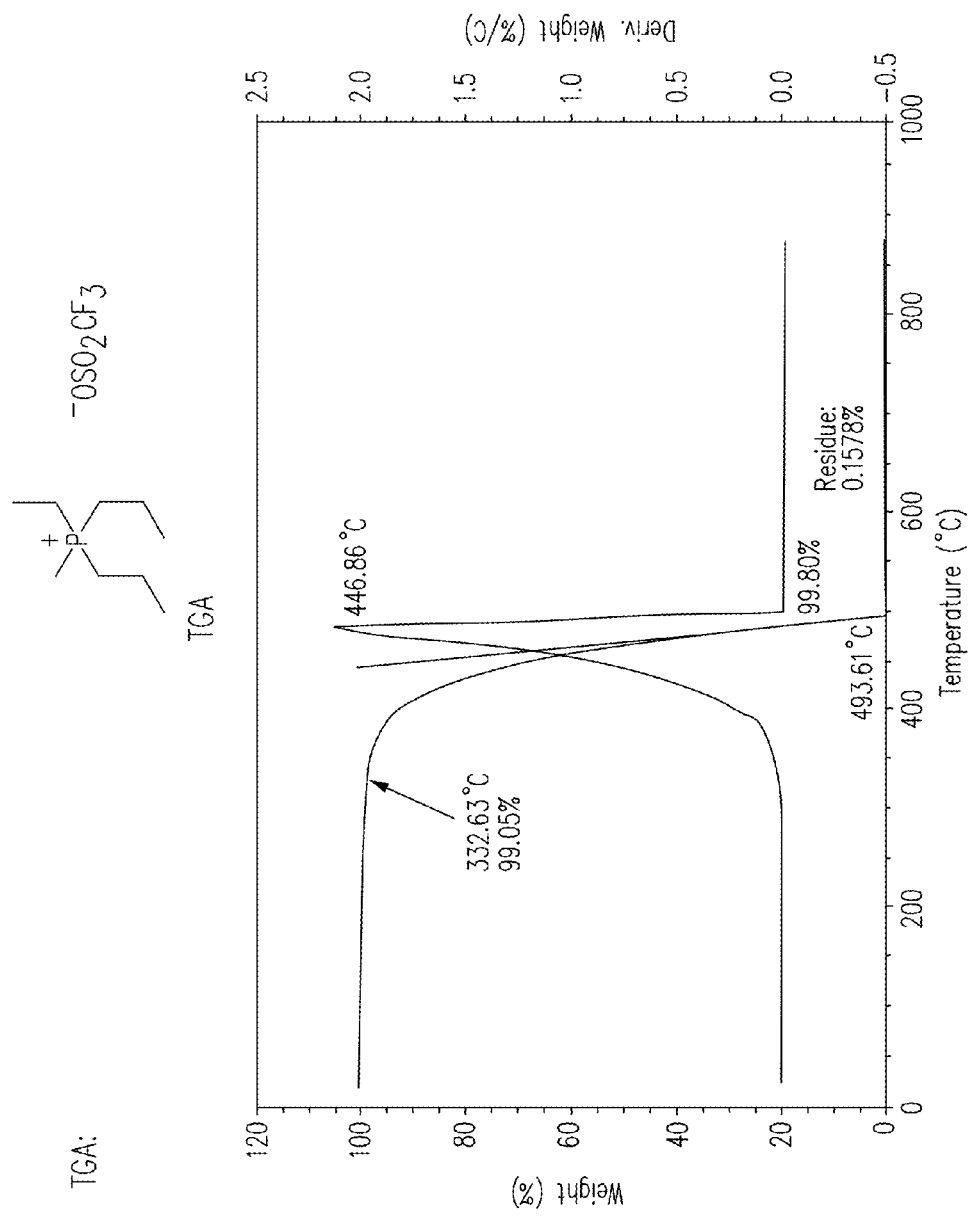
FIG. 7 is a thermogravimetric analysis (TGA) graph performed on exemplary embodiments of phosphonium ionic liquids prepared according to Example 1.

Phosphonium ionic liquids were prepared. $AgSO_3CF_3$ was charged into a 50 ml round bottom (Rb) flask and assembled to a 3 cm swivel frit. The flask was evacuated and brought into a glove box. In the glove box, di-n-proply ethyl methyl phosphonium iodide was added and the flask re-assembled, brought to the vacuum line, evacuated, and ahydrous THF was vacuum transferred in. The flask was allowed to warm to room temperature and was then heated to 40° C. for 2 hours. This resulted in the formation of a light green bead-like solid. This solid was removed by filtration. This yielded a pearly, opalescent solution. Volatile materials were removed under high vacuum with heating using a 30° C. hot water bath. This resulted in a white crystalline material with a yield of 0.470 g. Thermogravimetric Analysis (TGA) was performed on the material and the results are shown in FIG. 7.

Example 2

Figure 8A:
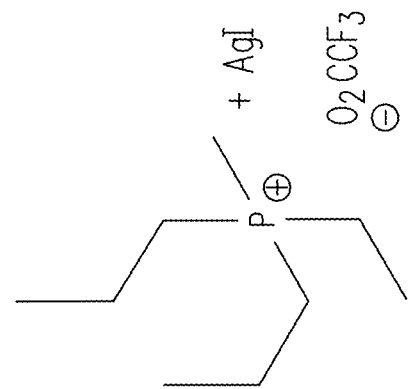
FIG. 8A depicts a reaction scheme.
Figure 8A:
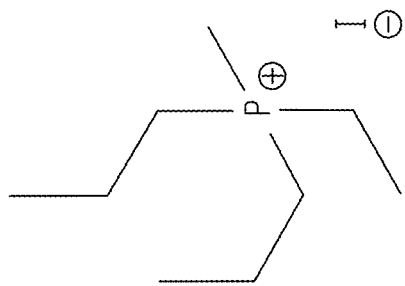
Figure 8B:
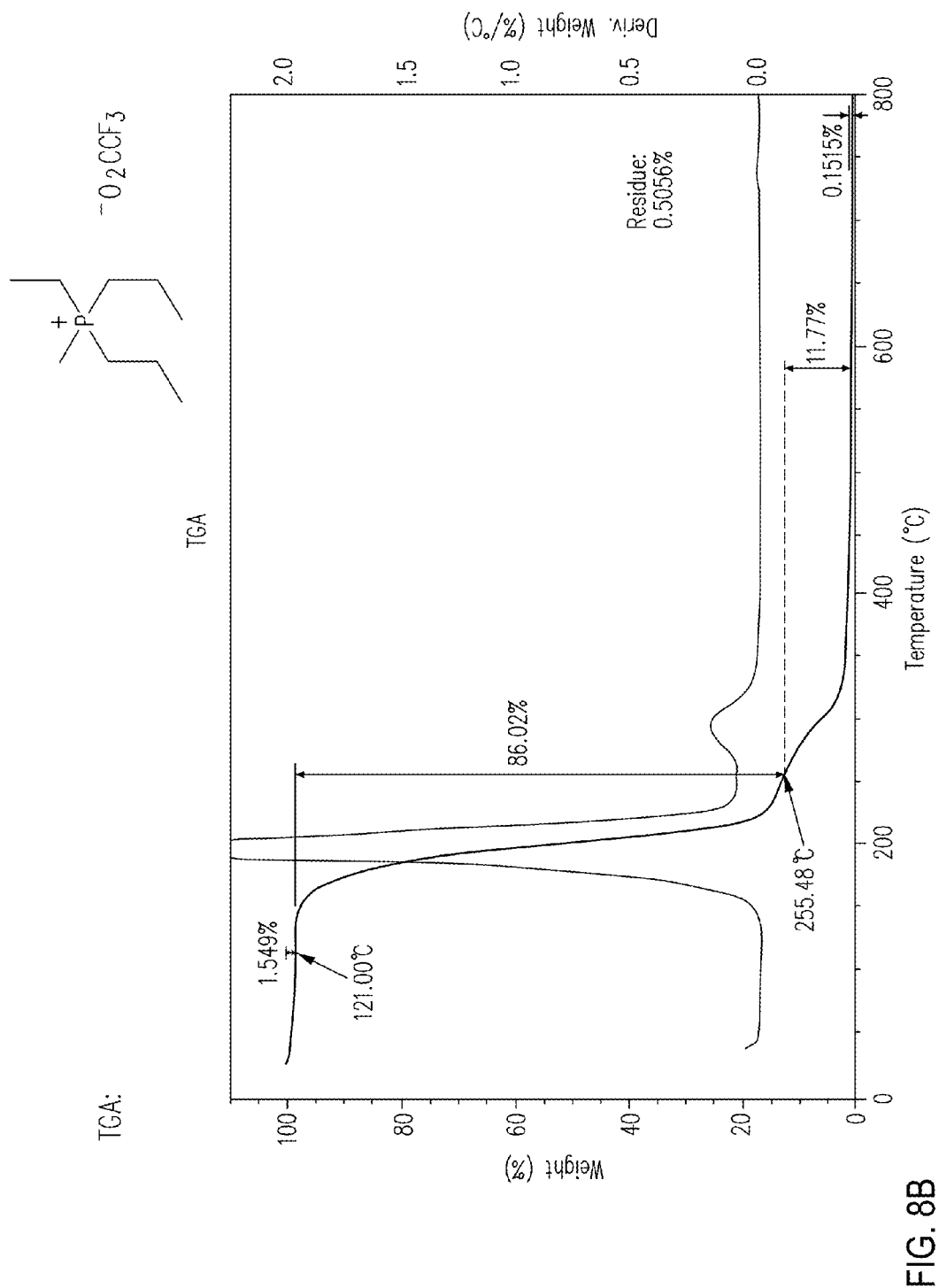
FIGS. 8B and 8C illustrate thermogravimetric analysis (TGA) and evolved gas analysis (EGA) graphs, respectively, for exemplary embodiments of phosphonium ionic liquids prepared according to Example 2.
Figure 8C:
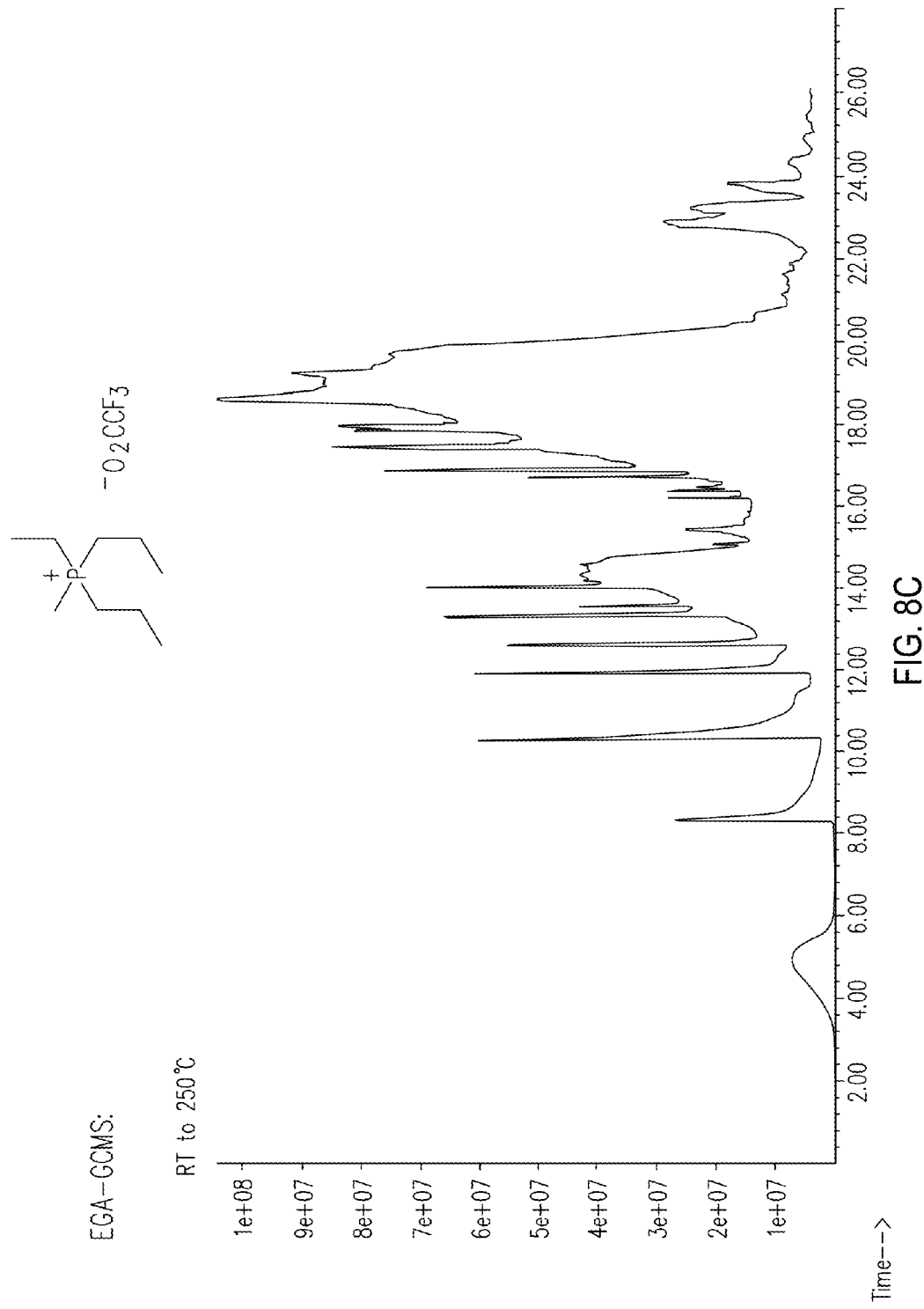

Further phosphonium ionic liquids were prepared. Di-n-propyl ethyl methyl phosphonium iodide was added to a 100 ml Rb flask in a glove box, then removed and dissolved in 50 ml of DI $H_2O$. To this solution, $AgO_2CCF_3$ was added, immediately yielding a yellow, bead-like precipitate. After stirring for 2 hours, AgI was removed by filtration and the cake was washed 3 times with 5 ml each of DI $H_2O$. The bulk water was removed on the rotary evaporator. This yielded a clear, low viscosity liquid which was then dried under high vacuum with heating and stirring. This resulted in solidification of the material. Gentle warming of the white solid in a warm water bath resulted in a liquid which appeared to melt just above room temperature. This experiment yielded 0.410 g of material. The reaction scheme is depicted in FIG. 8A. Thermogravimetric Analysis (TGA) and evolved gas analysis (EGA) tests were performed on the material and the results are shown in FIG. 8B and FIG. 8C, respectively.

Example 3

Figure 9A:
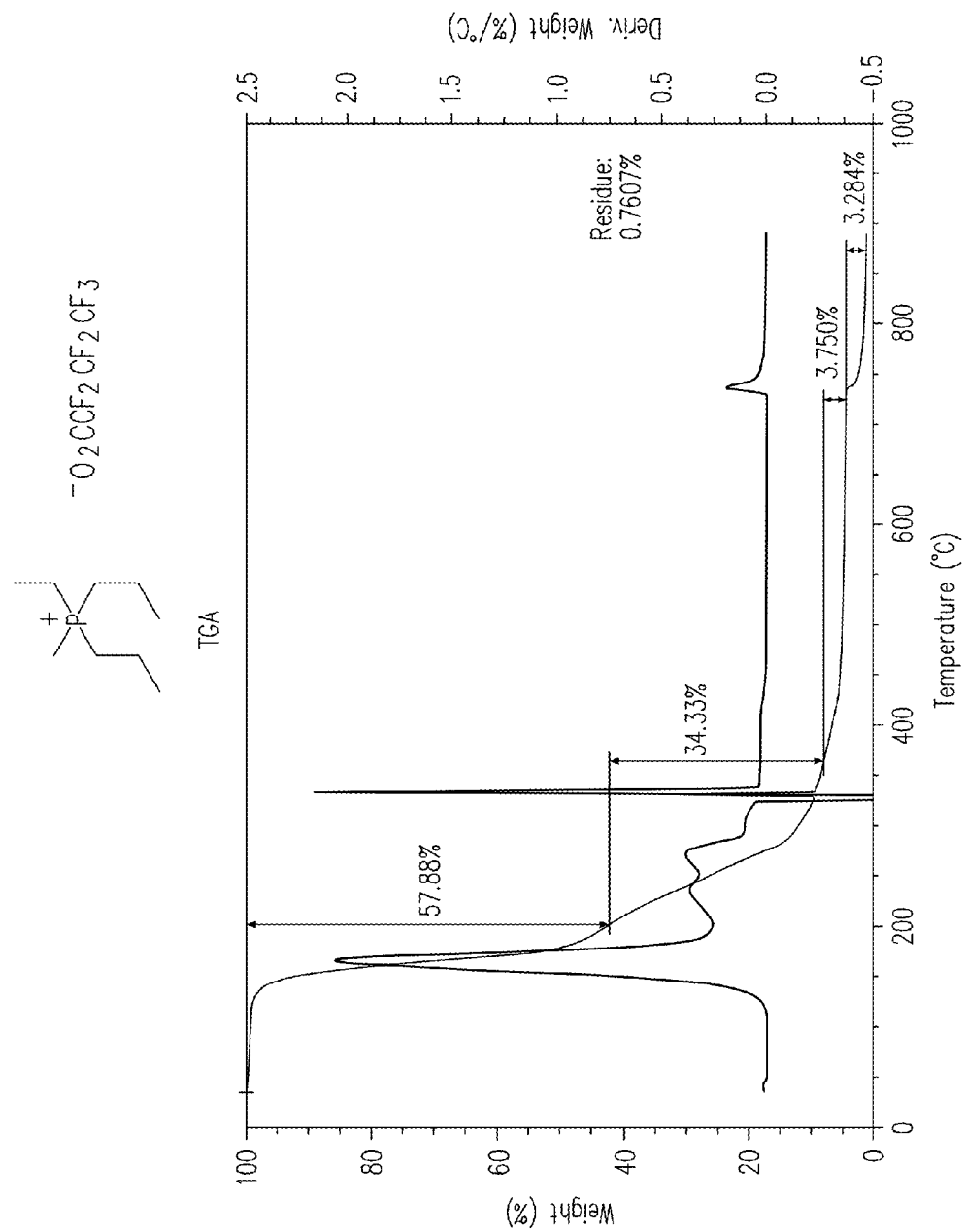
FIGS. 9A and 9B are graphs illustrating thermogravimetric analysis (TGA) and evolved gas analysis (EGA), respectively, for exemplary embodiments of phosphonium ionic liquids prepared according to Example 3.
Figure 9B:
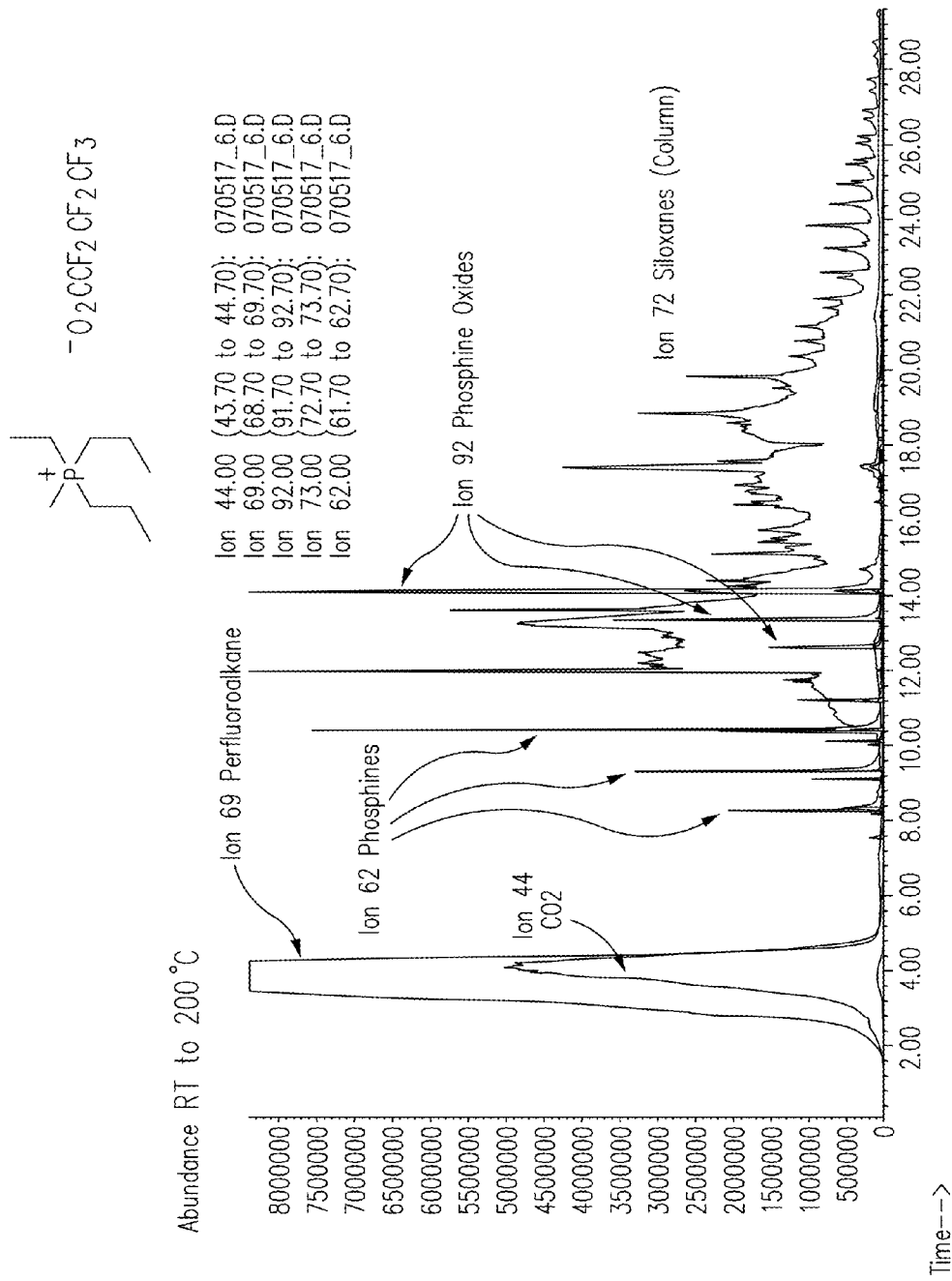

In this example, di-n-propyl ethyl methyl phosphonium iodide was added to a 100 ml Rb flask in a glove box, and then brought out of the fume hood and dissolved in 70 ml MeOH. Next, $AgO_2CCF_2CF_2CF_3$ was added, immediately giving a yellow colored slurry. After stirring for 3 hours the solids were moved by filtration, the bulk MeOH removed by rotary evaporation and the remaining residue dried under high vacuum. This gave a yellow, gel-like slushy material. "Liquid" type crystals were observed forming on the sides of the Rb flask, when then "melted" away upon scraping of the flask. This experiment yielded 0.618 g of material. Thermogravimetric Analysis (TGA) was performed on the material and the results are shown in FIG. 9A. Evolved Gas Analysis (EGA) was also performed and the results are shown in FIG. 9B.

Example 4

Figure 10A:
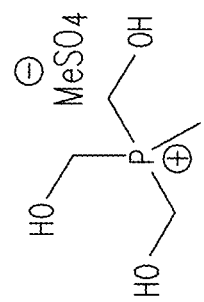
FIG. 10A depicts a reaction scheme.
Figure 10A:
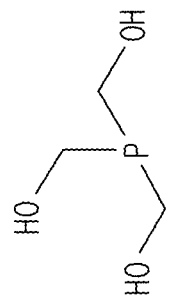

A pressure flask was brought into the glove box and charged with 0.100 g of $P(CH_2OH)_3$ followed by 5 mL of THF-d8. Once the solid was dissolved the $Me_2SO_4$ was added. The flask was then sealed and brought out of the glove box. It was heated in a 110° C. oil bath for 10 minutes and then cooled, brought back into the glove box, and a 1 mL aliquot removed for $^1H$ NMR. The reaction scheme is illustrated in FIG. 10A. The $^1H$ NMR spectrum is shown in FIG. 10B.

Example 5

Figure 11B:
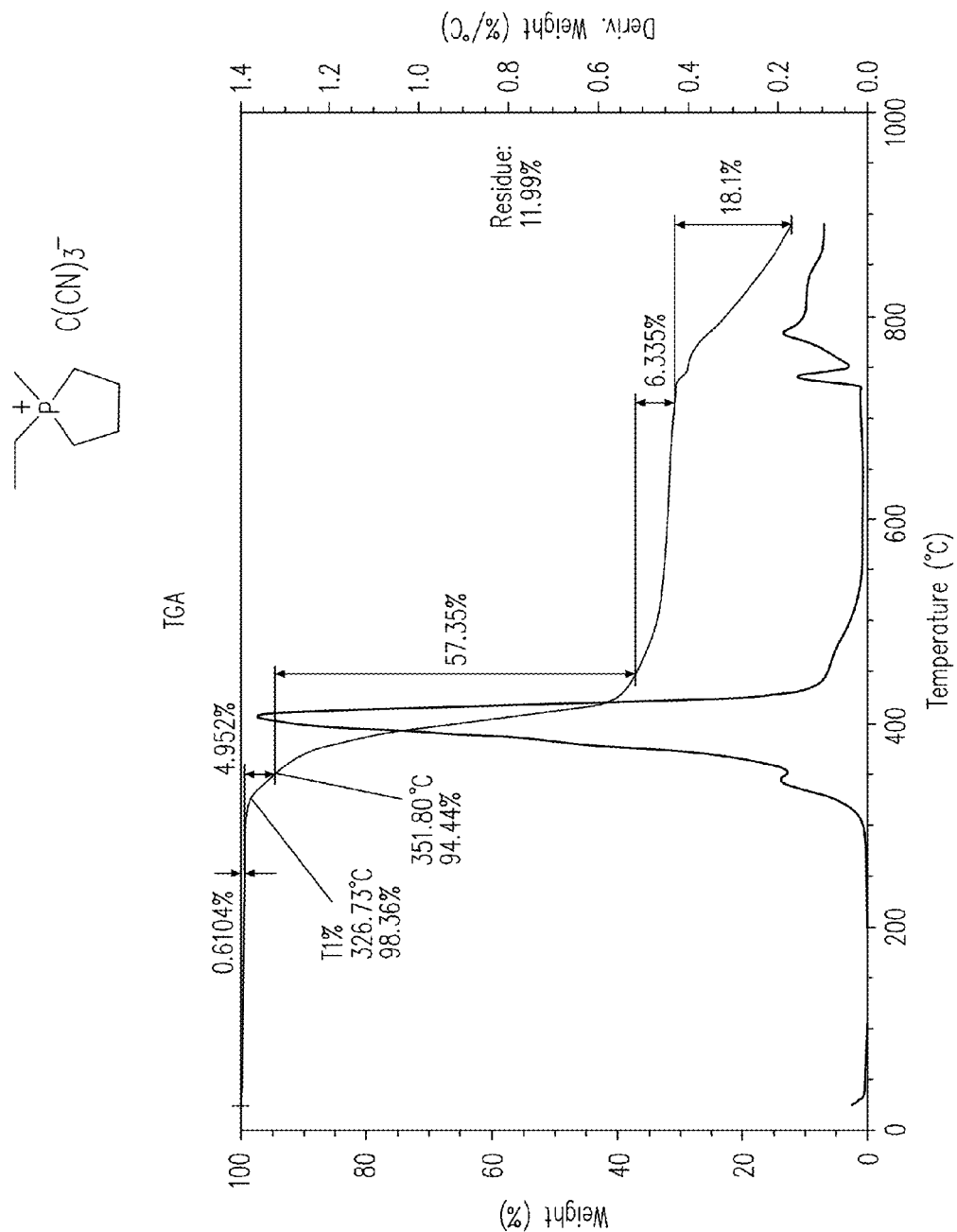
FIG. 11B is a graph showing thermogravimetric analysis (TGA) results for exemplary embodiments of phosphonium ionic liquids prepared according to Example 5.

In this experiment, 1-ethyl-1-methyl phospholanium nitrate was added to a 100 ml 14/20 Rb flask in a glove box. To this $KC(CN)_3$ was added and then the Rb was assembled to a 3 cm swivel frit. The frit was brought out to the line and $CHCl_3$ was vacuum transferred in. The flask was allowed to stir for 12 hours. A gooey brown material was observed on the bottom of the flask. The solution was filtered giving a pearly, opalescent filtrate from which brown oil separated out. The brown material was washed 2 times with recycled $CHCl_3$ causing it to become whiter and more granular. All volatile components were removed under high vacuum, giving a low viscosity brown oil. This experiment yielded 1.52 g of material. The reaction scheme is shown in FIG. 11A. Thermogravimetric Analysis (TGA) was performed on the material and the results are shown in FIG. 11B.

Example 6

Figure 12:
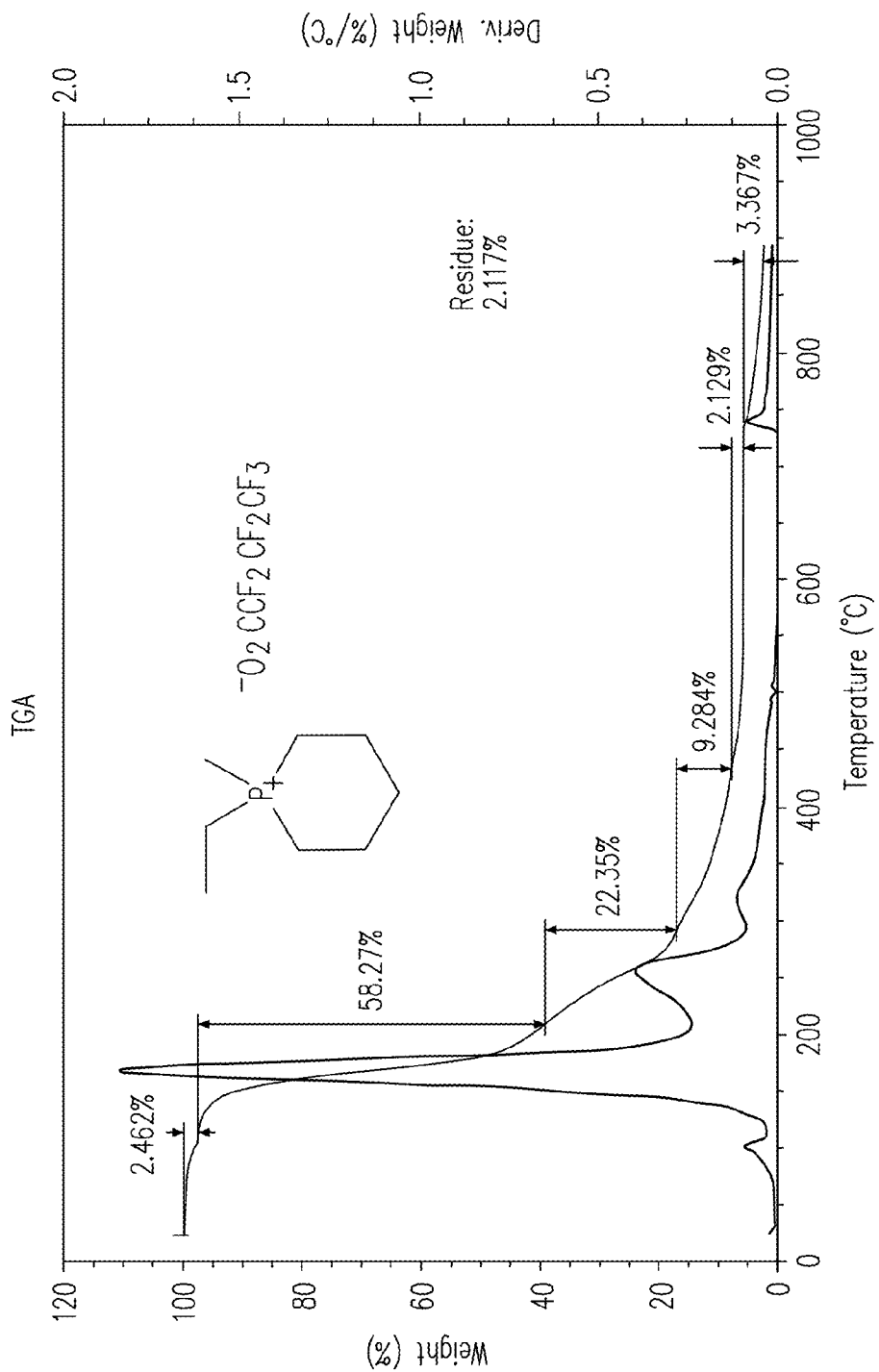
FIG. 12 is a graph showing thermogravimetric analysis (TGA) results for exemplary embodiments of phosphonium ionic liquids prepared according to Example 6.

In this experiment 1-ethyl-1-methyl phosphorinanium iodide was added to a 100 ml Rb flask in a glove box and then brought out to a fume hood where it was dissolved in 70 ml MeOH. Next, $AgO_2CCF_2CF_2CF_3$ was added, immediately giving a yellow precipitate. The flask was stirred for 18 hours and then the solids removed by filtration. Bulk MeOH was removed by rotary evaporation and the residual dried under high vacuum. This procedure gave off-white, yellow-tinted solid. This experiment yielded 0.620 g of material. Thermogravimetric Analysis (TGA) was performed on the material and the results are shown in FIG. 12.

Example 7

Figure 13:
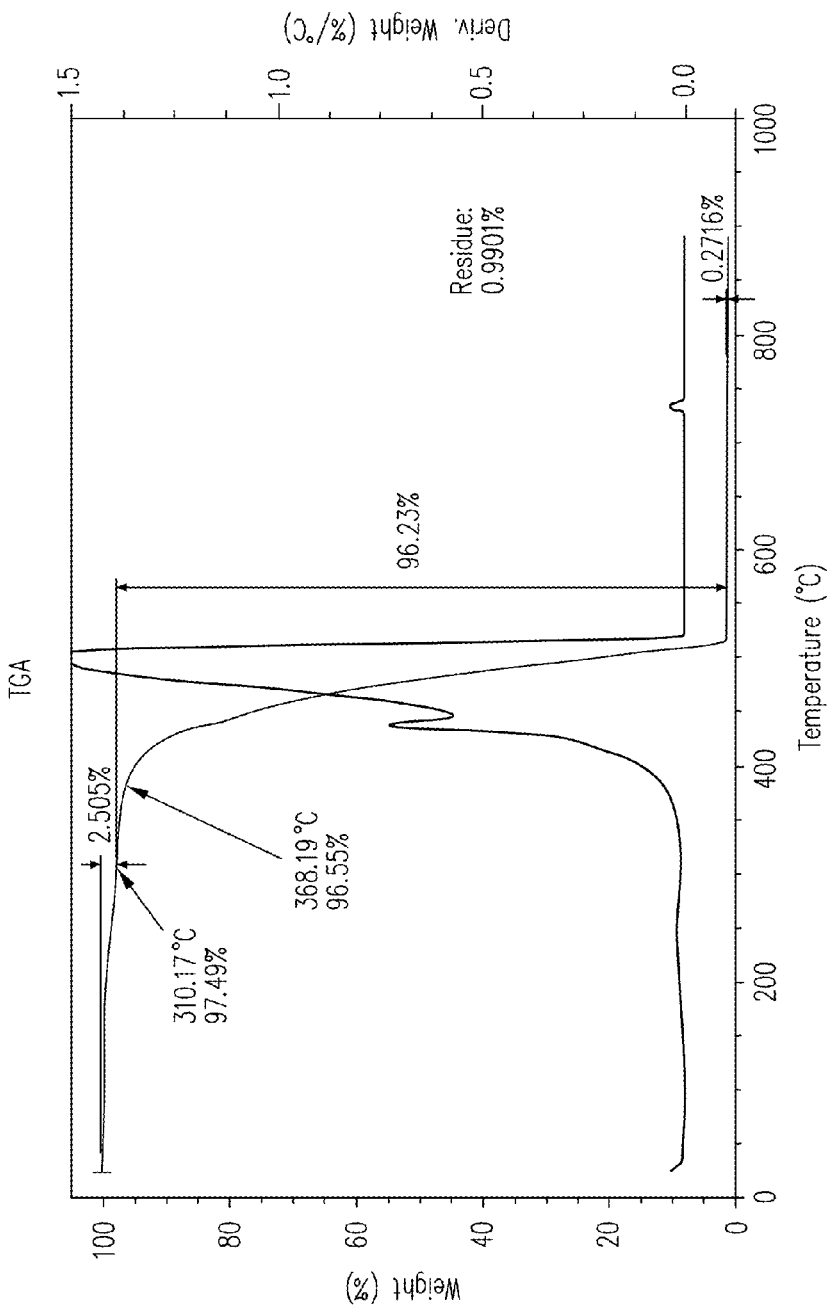
FIG. 13 is a graph showing thermogravimetric analysis (TGA) results for exemplary embodiments of phosphonium ionic liquids prepared according to Example 7.

In another experiment, 1-butyl-1-ethyl phospholanium iodide was added to a Rb flask in a fume hood, and then dissolved in water and stirred. $AgO_3SCF_3$ was added and a yellow precipitate formed immediately. The flask was stirred for 2 hours and then vacuum filtered. The solution foamed during filtration, and a milky substance was observed after filtration. The material was rotary evaporated and the residue dried under vacuum on an oil bath which melted the solid. This experiment yielded 0.490 g of material. Thermogravimetric Analysis (TGA) was performed on the material and the results are shown in FIG. 13.

Example 8

Figure 14A:
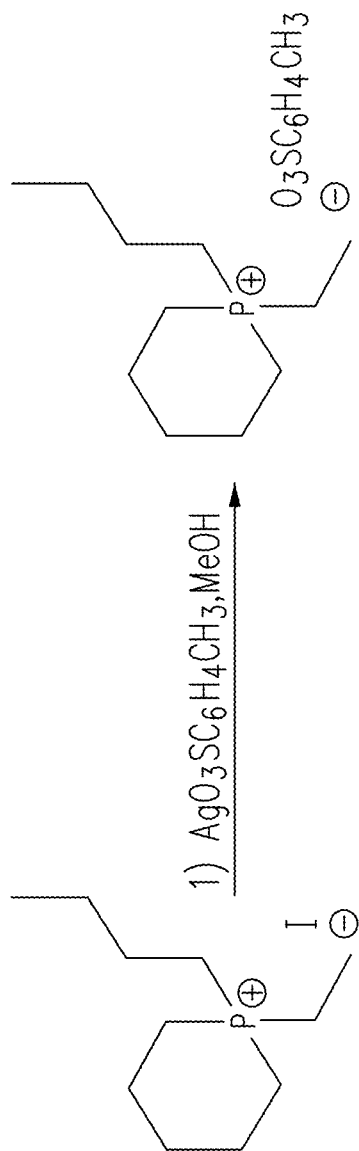
FIG. 14A depicts a reaction scheme.
Figure 14B:
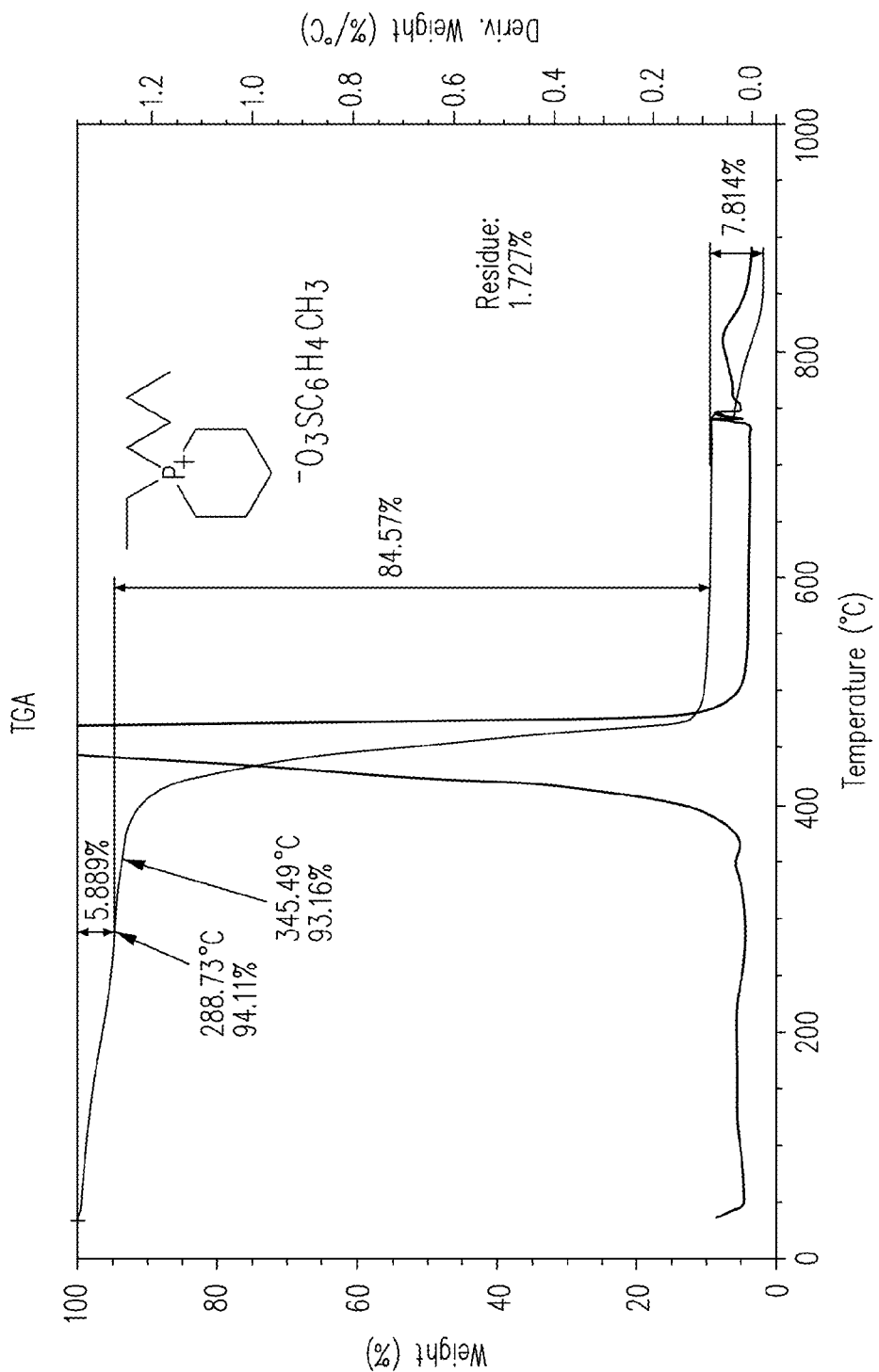
FIG. 14B is a graph showing thermogravimetric analysis (TGA) results for exemplary embodiments of phosphonium ionic liquids prepared according to Example 8.

In a further experiment, 1-butyl-1-ethyl phosphorinanium iodide was added to a flask in a fume hood. MeOH was added and then the flask was stirred for 15 minutes. Silver p-toluene sulfonate was added. The flask was stirred for 4 hours. A yellow precipitate formed. The material was gravity filtered and then rotary evaporated. The material was dried under vacuum, resulting in a liquid. This experiment yielded 0.253 g of material. The reaction scheme is shown in FIG. 14A. Thermogravimetric Analysis (TGA) was performed on the material and the results are shown in FIG. 14B.

Example 9

Figure 15A:
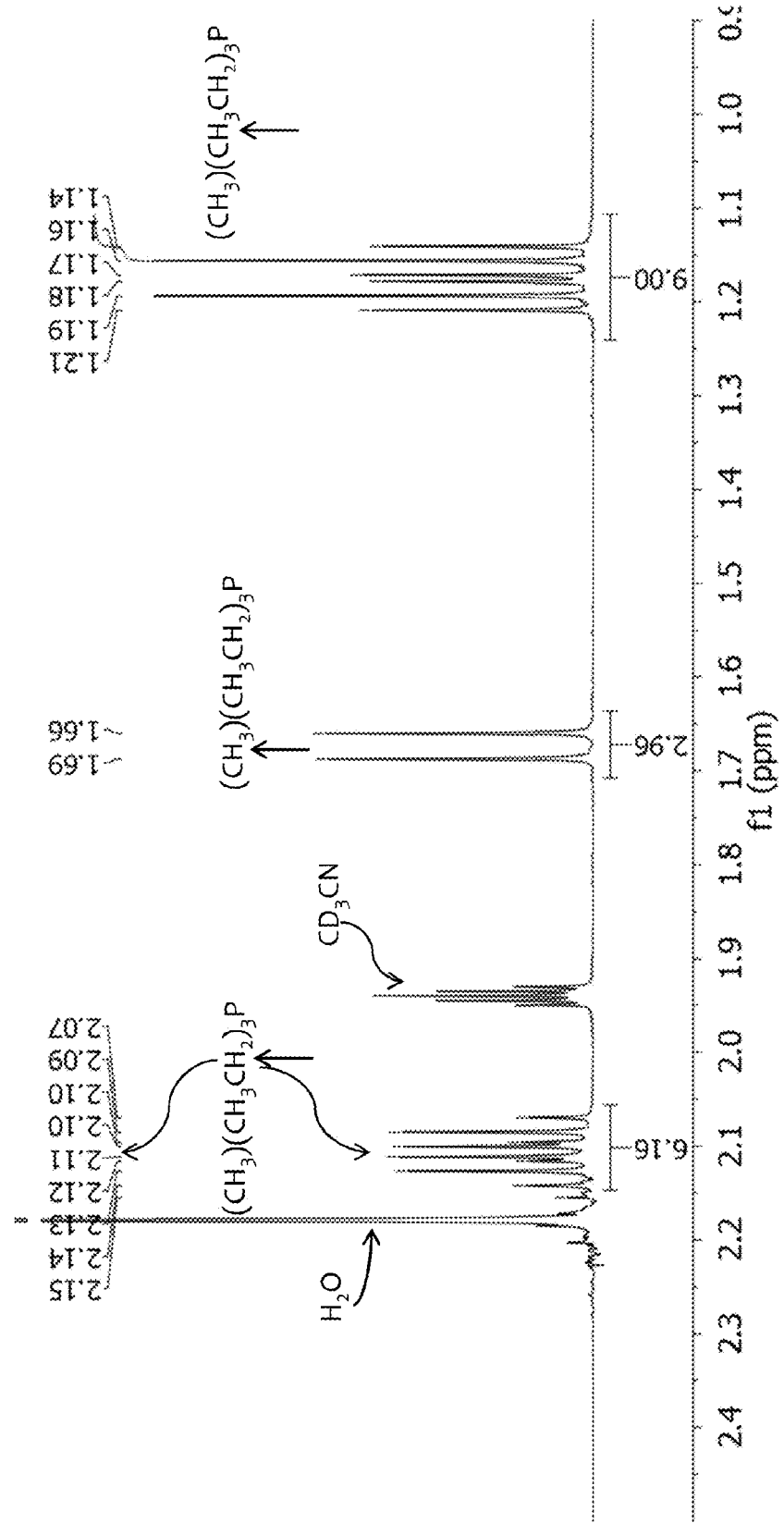
FIG. 15A and FIG. 15B show the $^1$H and $^{31}$P NMR spectra respectively for exemplary embodiments of phosphonium salt prepared as described in Example 9.
Figure 15B:
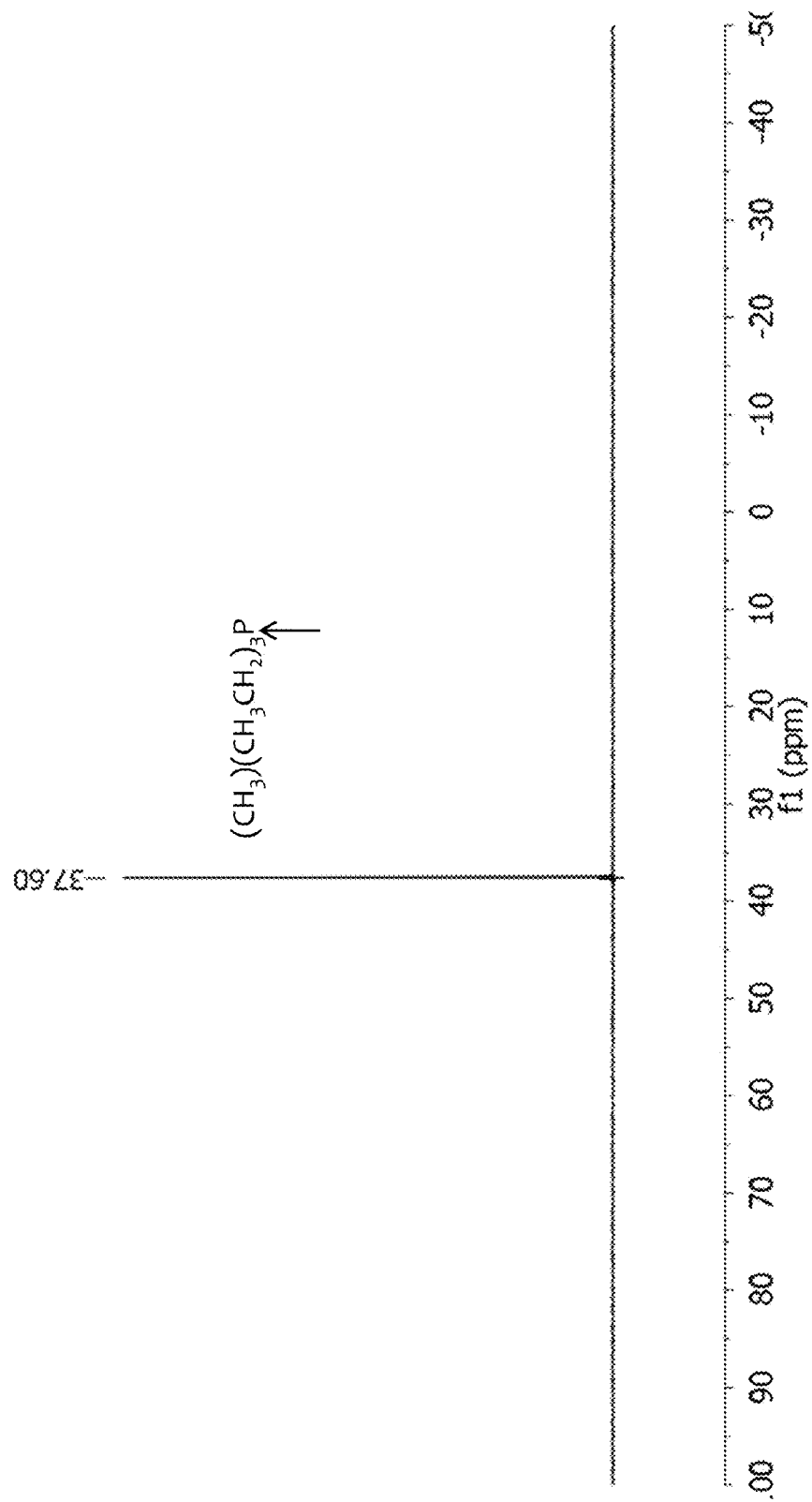
Figure 16:
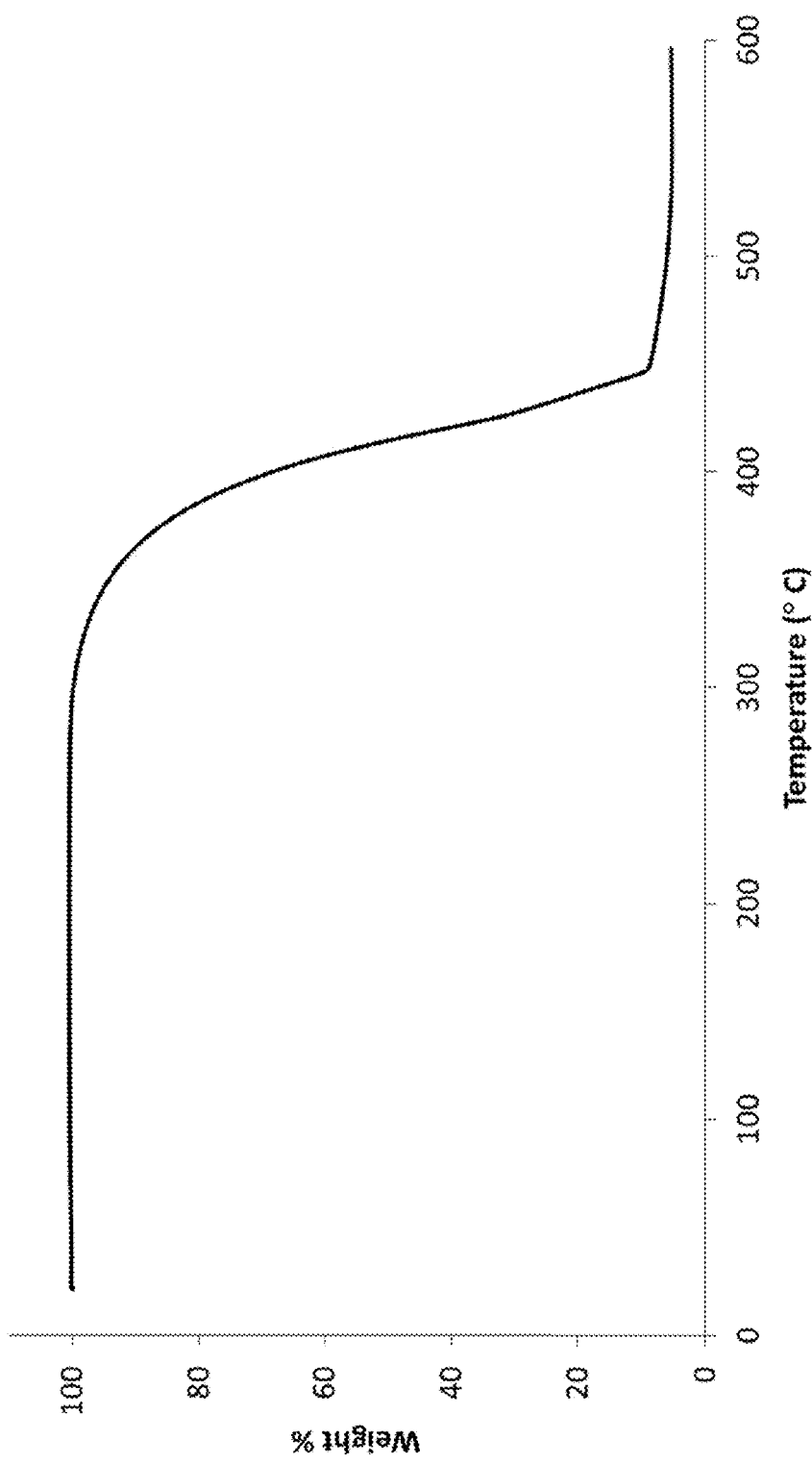
FIG. 16 is a graph showing thermogravimetric analysis (TGA) results for exemplary embodiments of phosphonium salt prepared according to Example 9.

In another experiment, 250 mg (0.96 mmol) triethylmethylphosphonium iodide is added to 15 mL deionized water followed by 163 mg (0.96 mmol) silver nitrate pre-dissolved in 5.0 mL deionized water. The reaction is stirred for 10 minutes, at which time the white to yellow precipitate is filtered off. The solids are then washed with 5.0 mL deionized water and the aqueous fractions are combined. The water is removed under vacuum on a rotary evaporator to leave a white solid residue, which is recrystallized from a 3:1 mixture of ethyl acetate and acetonitrile to give triethylmethylphosphonium nitrate. Yield: 176 mg, 94%. The phosphonium nitrate salt (176 mg, 0.90 mmol) is dissolved in 5 mL anhydrous acetonitrile. 113 mg (0.90 mmol) potassium tetrafluoroborate dissolved in 5 mL anhydrous acetonitrile is added to the phosphonium salt and after stirring 5 minutes the solids are removed by filtration. The solvent is removed on a rotary evaporator and the resulting off white solid recrystallized from hot 2-propanol to give analytically pure triethylmethylphosphonium tetrafluoroborate. Yield: 161 mg, 81%. The composition is confirmed by the $^1H$ NMR spectrum as shown in FIG. 15A and the $^{31}P$ NMR spectrum shown in FIG. 15B. Thermogravimetric Analysis (TGA) was performed on the material and the results are shown in FIG. 16.

Example 10

Figure 17A:
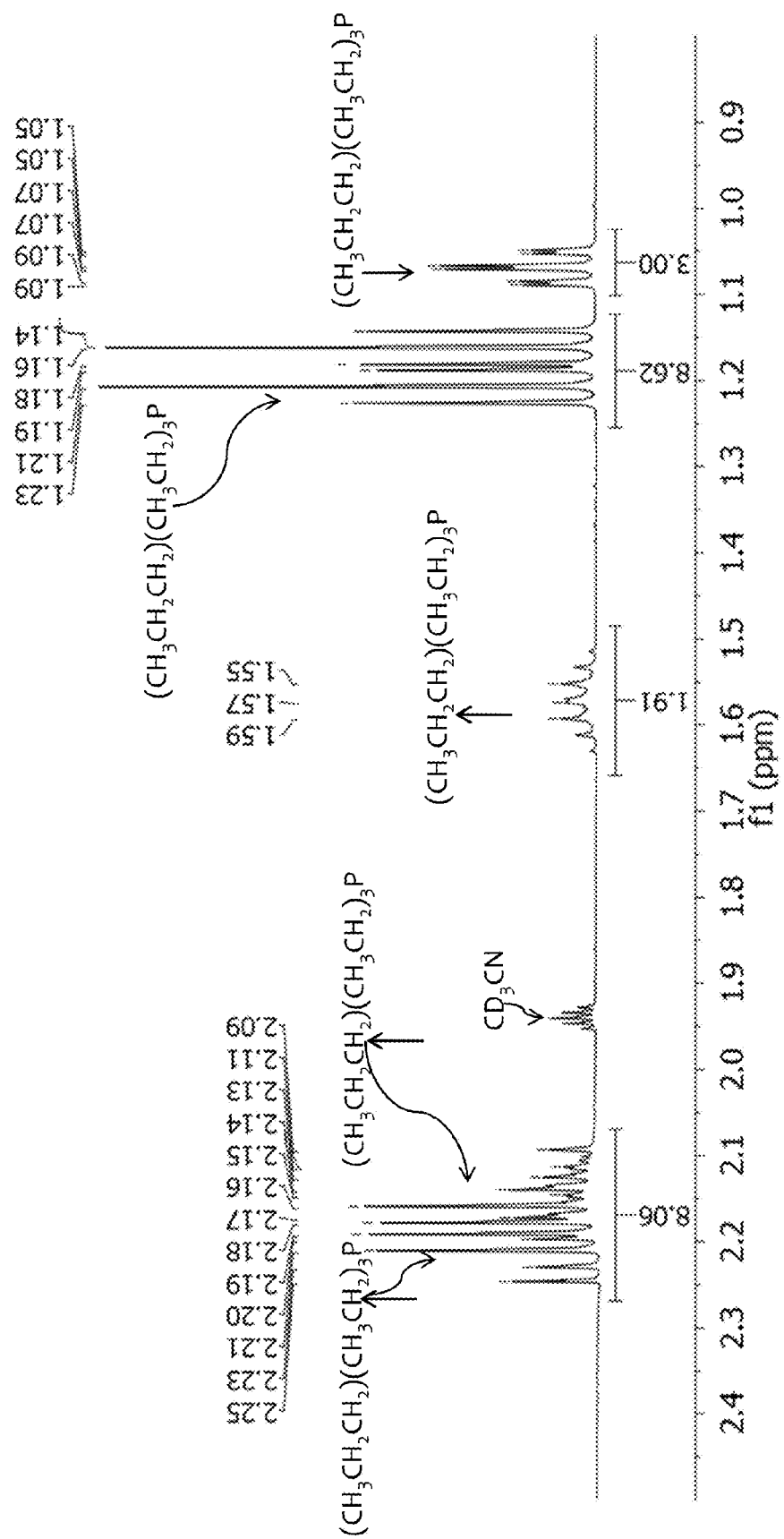
FIG. 17A and FIG. 17B show the $^1$H and $^{31}$P NMR spectra respectively for exemplary embodiments of phosphonium salt prepared as described in Example 10.
Figure 17B:
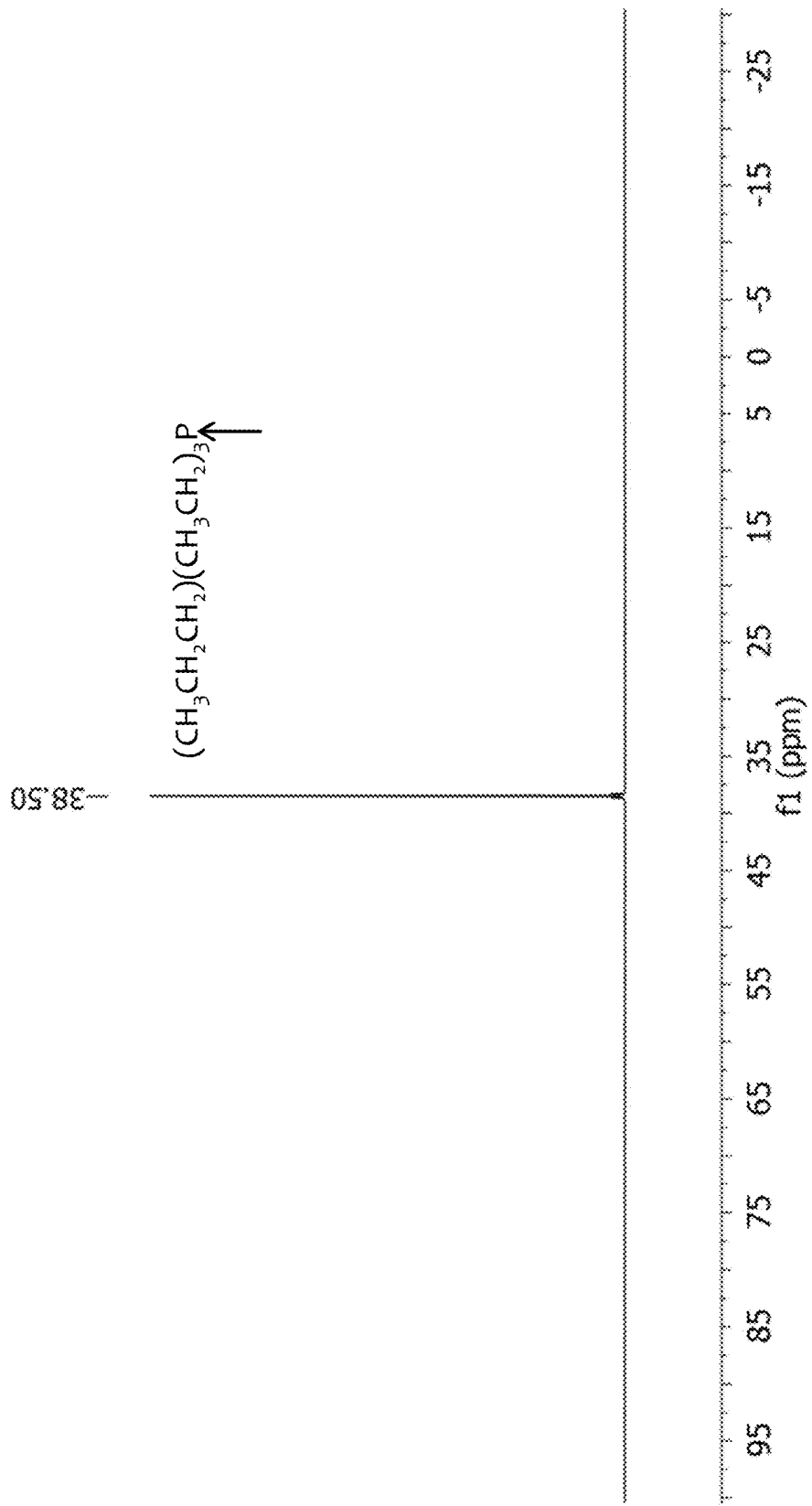
Figure 18:
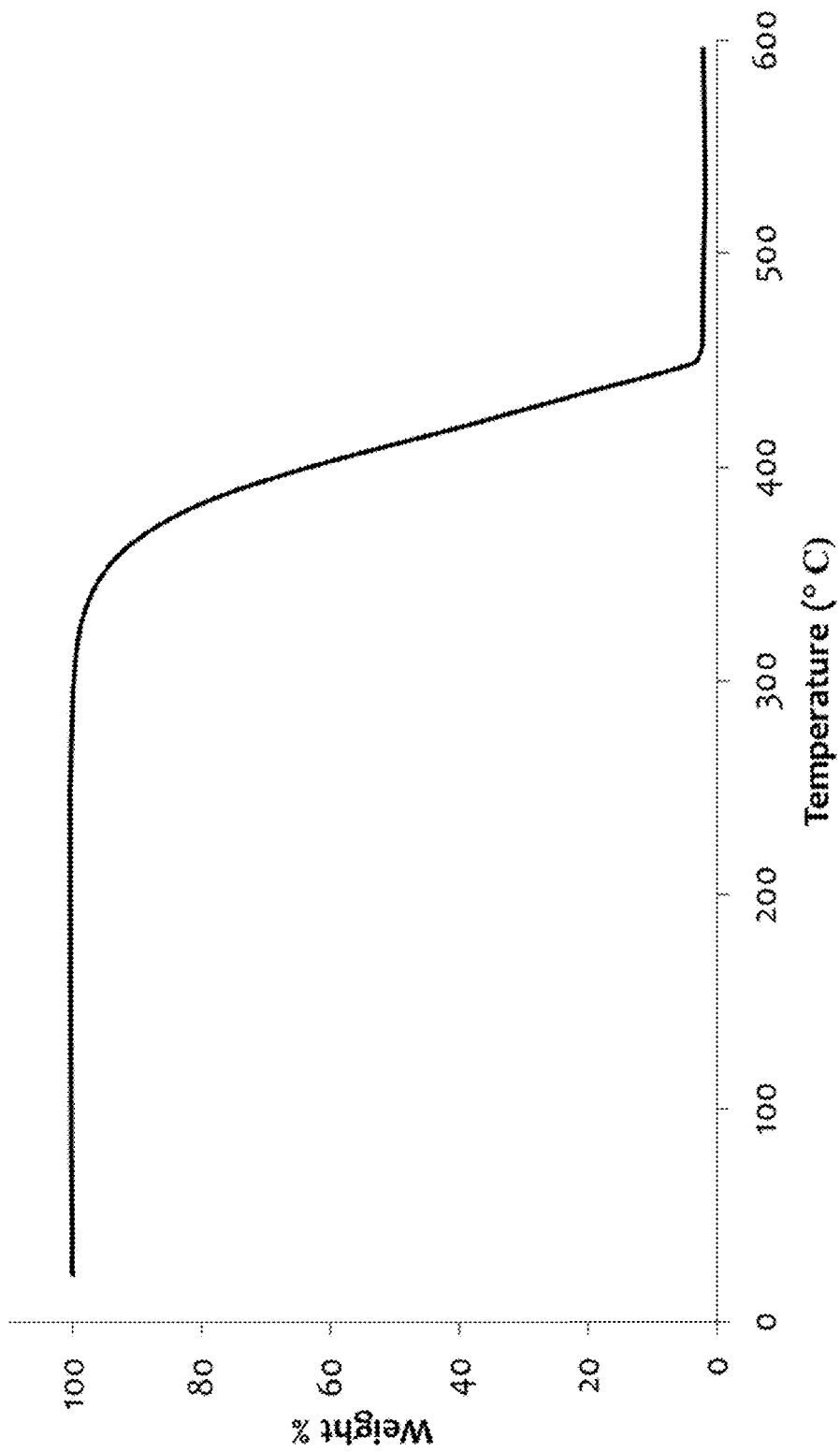
FIG. 18 is a graph showing thermogravimetric analysis (TGA) results for exemplary embodiments of phosphonium salt prepared according to Example 10.

In another experiment, 250 mg (1.04 mmol) of triethylpropylphosphonium bromide and 135 mg (1.06 mmol) of potassium tetrafluoroborate were combined in 10 mL of acetonitrile. A fine white precipitate of KBr started to form immediately. The mixture was stirred for 1 hour, filtered, and the solvent was removed on a rotary evaporator to afford a white solid. Yield: 218 mg, 85%. This crude product can be recrystallized from 2-propanol to afford analytically pure material. The composition is confirmed by the $^1H$ NMR spectrum as shown in FIG. 17A and the $^{31}P$ NMR spectrum shown in FIG. 17B. Thermogravimetric Analysis (TGA) was performed on the material and the results are shown in FIG. 18.

Example 11

Figure 19A:
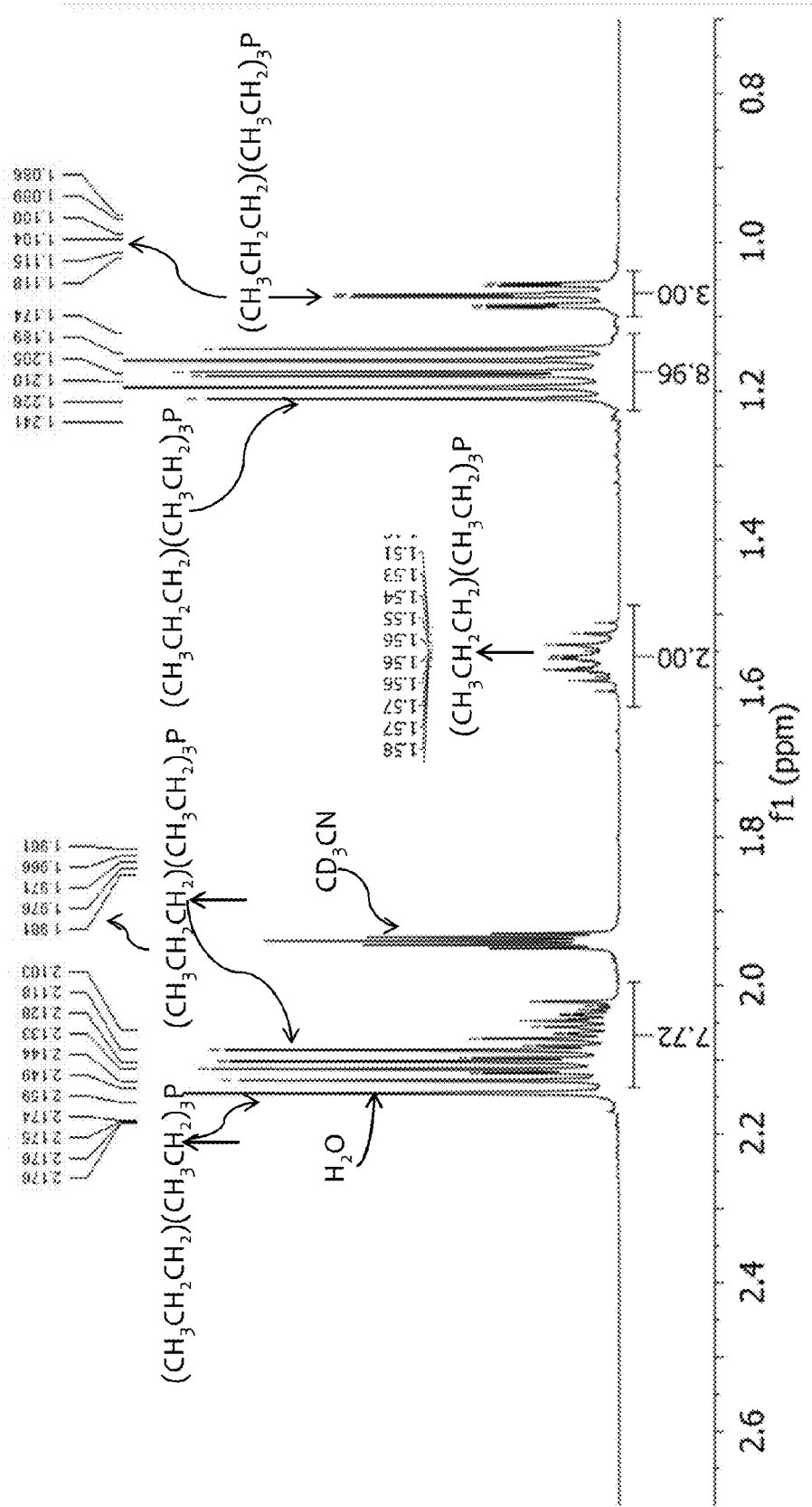
FIG. 19A and FIG. 19B show the $^1$H and $^{31}$P NMR spectra respectively for exemplary embodiments of phosphonium salt prepared as described in Example 11.
Figure 19B:
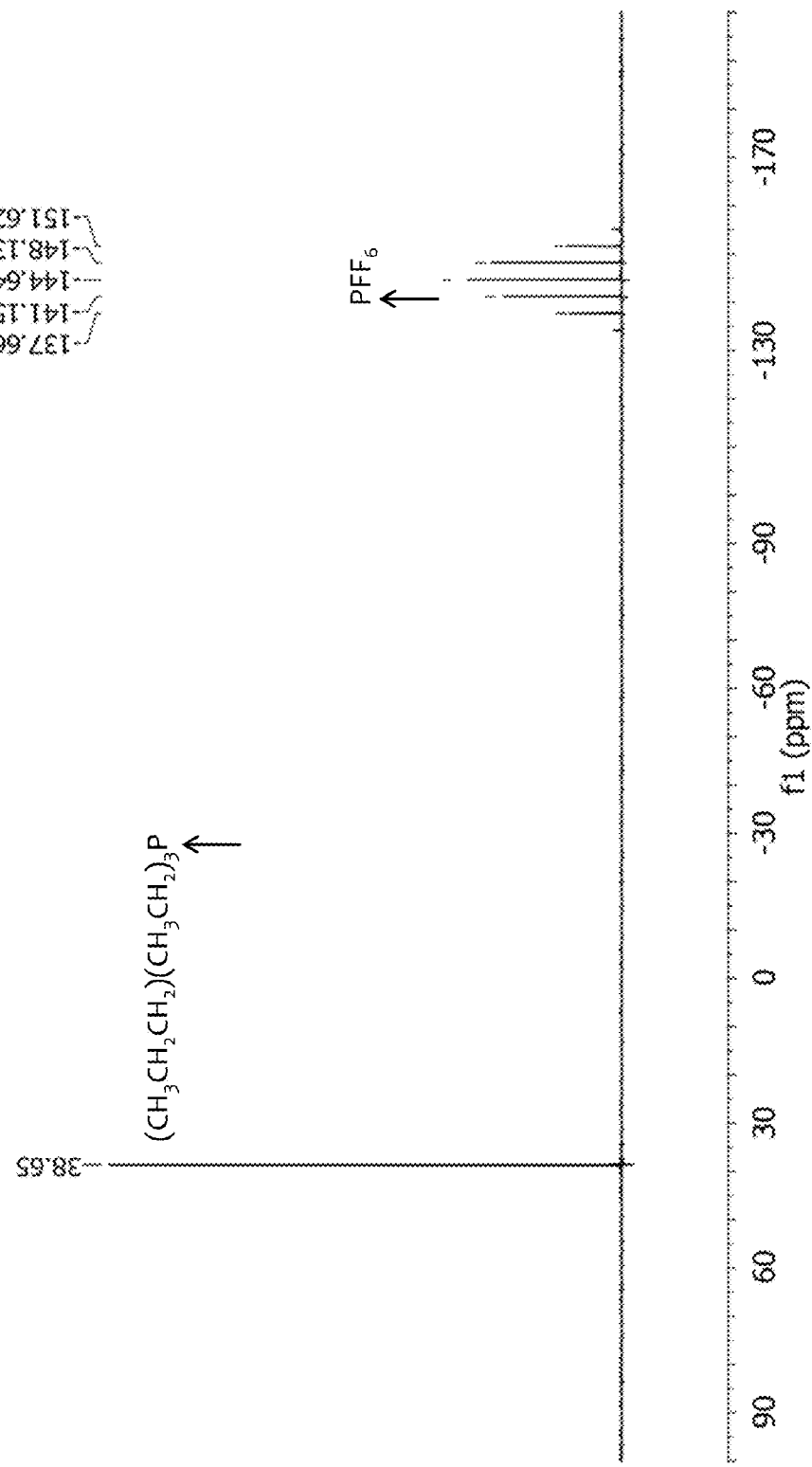
Figure 20:
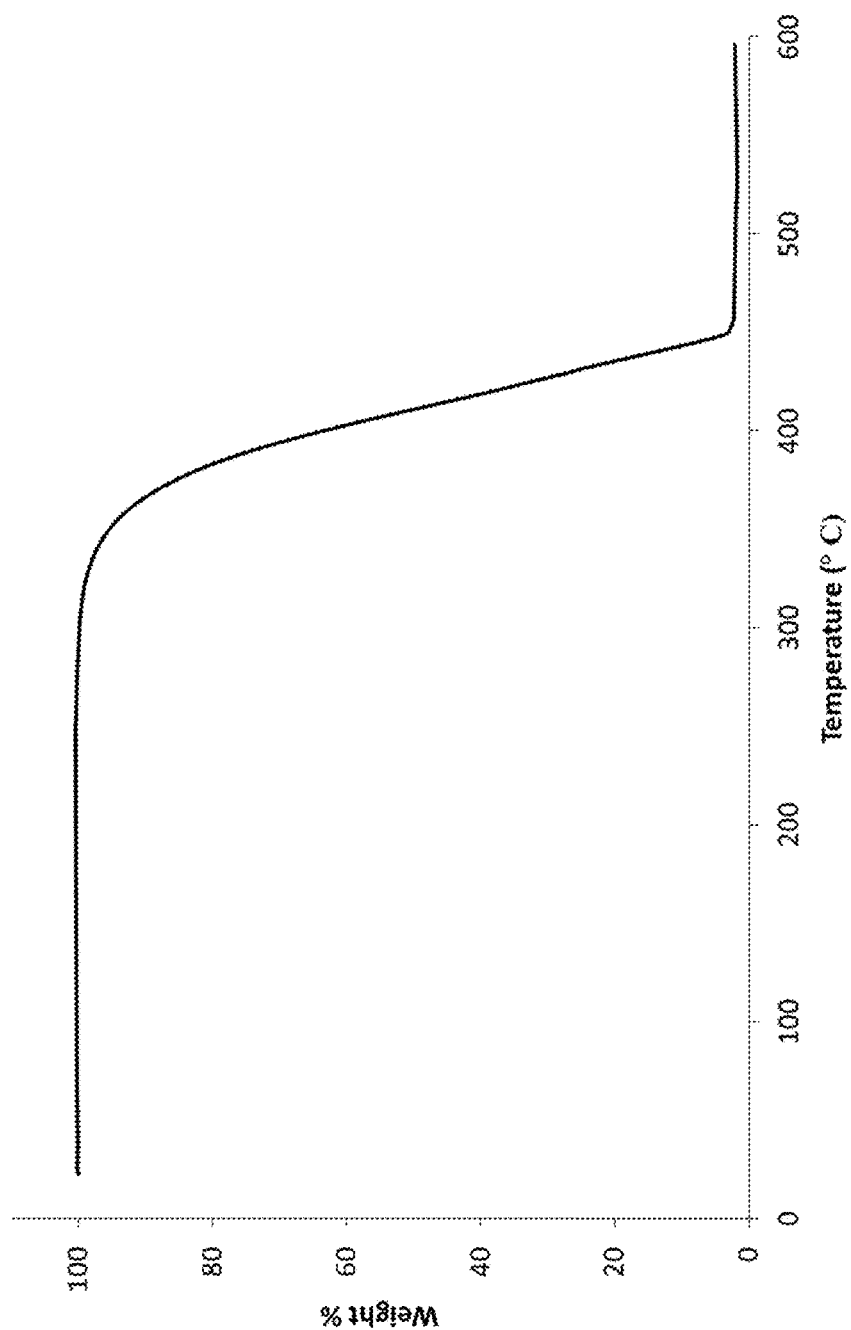
FIG. 20 is a graph showing thermogravimetric analysis (TGA) results for exemplary embodiments of phosphonium salt prepared according to Example 11.

In a further experiment, the reaction was performed in a glove box under an atmosphere of nitrogen. Triethylpropylphosphonium iodide 1.00 g, 3.47 mmol was dissolved in 20 mL anhydrous acetonitrile. To this solution, silver hexafluorophosphate 877 mg (3.47 mmol) was added with constant stirring. White precipitate of silver iodide was formed instantly and the reaction was stirred for 5 minutes. The precipitate was filtered and washed several times with anhydrous $CH_3CN$. The filtrate was brought out of glove box and evaporated to obtain white solid. The crude material was dissolved in hot isopropanol and passed through 0.2 μm PTFE membrane. The filtrate was cooled to obtain white crystals which were collected by filtration. Yield: 744 mg, 70%. The composition is confirmed by the $^1H$ NMR spectrum as shown in FIG. 19A and the $^{31}P$ NMR spectrum shown in FIG. 19B. Thermogravimetric Analysis (TGA) was performed on the material and the results are shown in FIG. 20.

Example 12

Figure 21A:
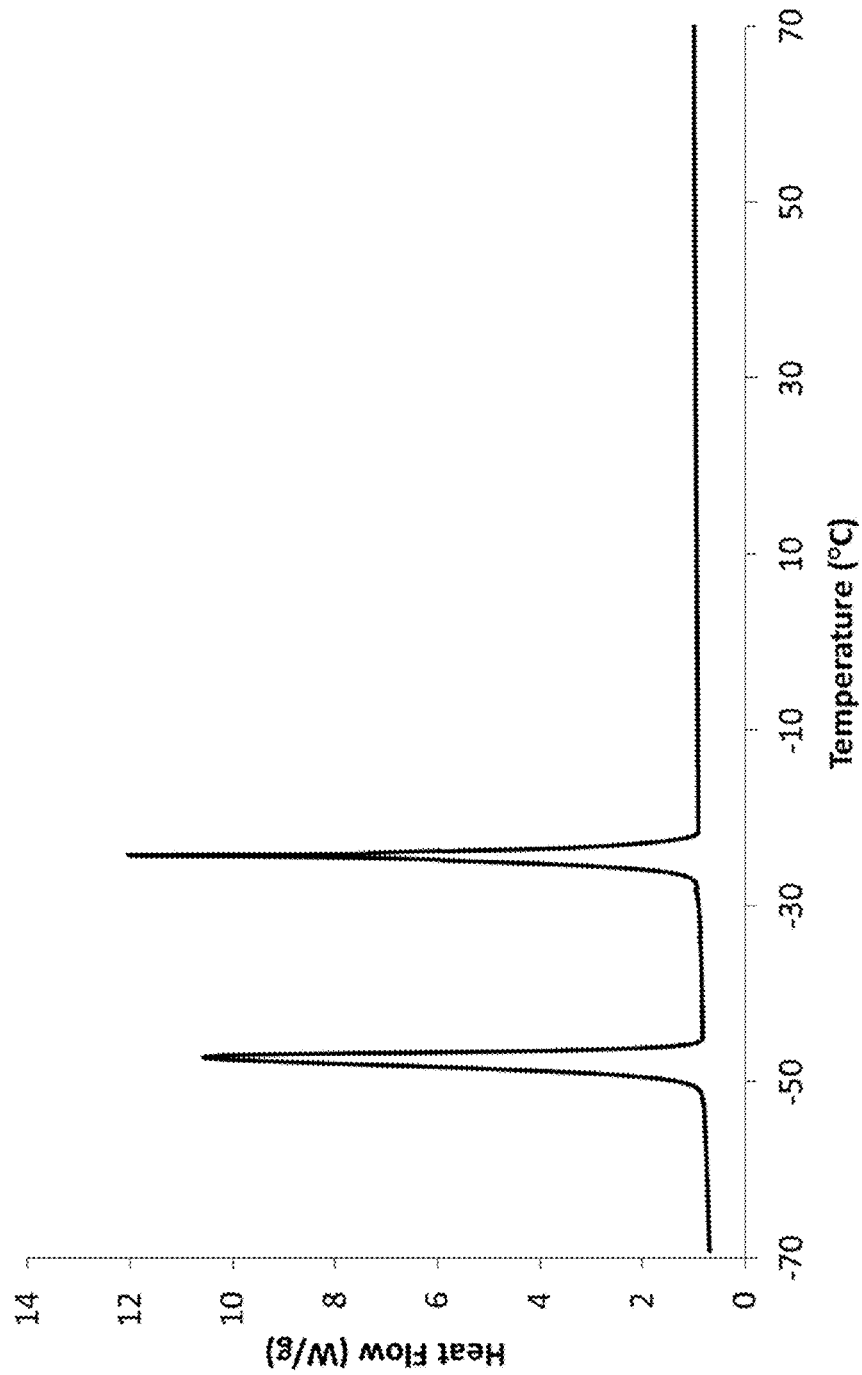
FIG. 21A and FIG. 21B are graphs showing differential scanning calorimetry (DSC) results for exemplary embodiments of phosphonium ionic liquids prepared according to Example 12.
Figure 21B:
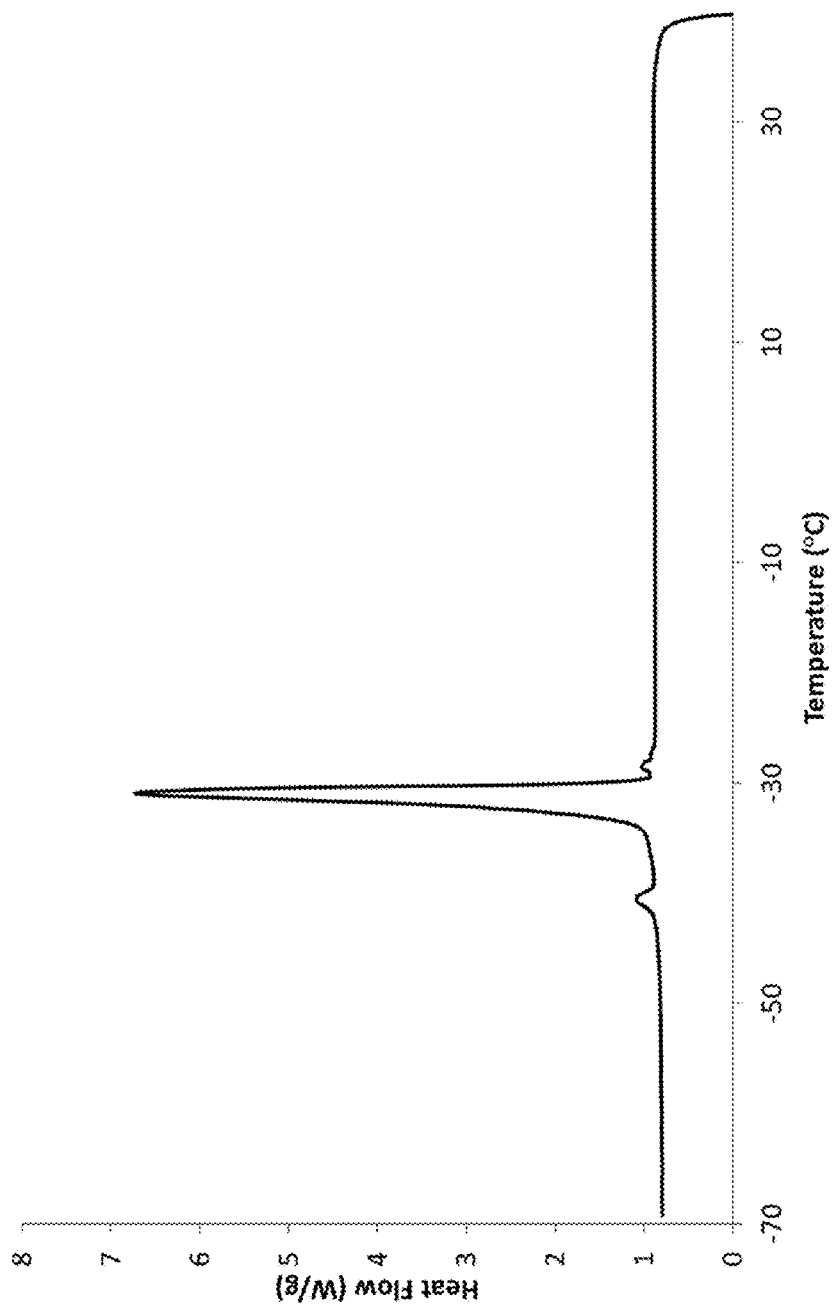

In this example, a ternary phosphonium ionic liquid composition comprising 1:3:1 mole ratio of $(CH_3CH_2CH_2)(CH_3)_3PCF_3BF_3/(CH_3CH_2CH_2)(CH_3CH_2)(CH_3)_2PCF_3BF_3/(CH_3CH_2CH_2)(CH_3CH_2)_2(CH_3)P\ CF_3BF_3$ is compared to a single component composition comprising $(CH_3CH_2CH_2)(CH_3CH_2)(CH_3)_2P\ CF_3BF_3$. Differential Scanning calorimetry (DSC) was performed on the materials and the results are shown in FIG. 21A for the single component composition and FIG. 21B for the ternary composition. As illustrated by FIGS. 21A and 21B, the ternary composition shows the advantages of a lower freezing temperature and therefore greater liquidus range compared to the single component composition.

Example 13

In another experiment, phosphonium salt $(CH_3CH_2CH_2)(CH_3CH_2)(CH_3)_2PC(CN)_3$ was prepared. This salt exhibits a low viscosity of 19.5 cP at 25° C., melting point of −10.0° C., onset decomposition temperature of 396.1° C., liquid range of 407° C., ionic conductivity of 15.2 mS/cm, and electrochemical voltage window of −1.5 5o+1.5 V when measured in an electrochemical cell with a Pt working electrode and a Pt counter electrode and an Ag/Ag reference electrode. The results are summarized in Table 14 below.

TABLE 14

| Viscosity at RT (cP) | Thermal Stability (° C.) | Melting Point (° C.) | Liquid Range (° C.) | Neat Conductivity (mS/cm) | Echem Window (V) |
|---|---|---|---|---|---|
| 19.5 | 396.1 | −10.9 | 407 | 13.9 | −1.5 V to +1.5 V |

Example 14

Figure 22:
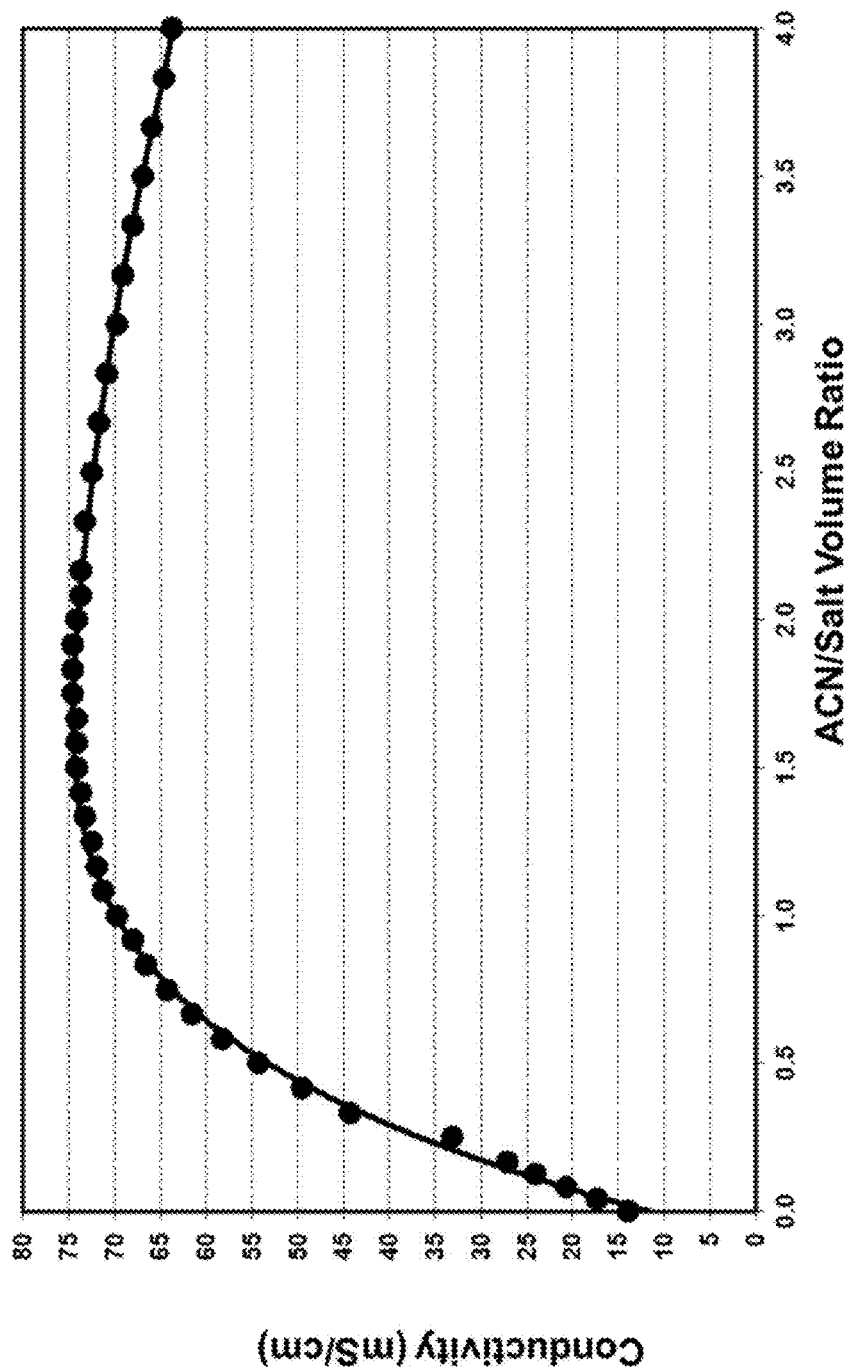
FIG. 22 depicts ionic conductivity as a function of ACN/salt volume ratio for phosphonium salt $(CH_3CH_2CH_2)(CH_3CH_2)(CH_3)_2PC(CN)_3$ in acetonitrile (ACN) as described in Example 14.

In another experiment, phosphonium salt $(CH_3CH_2CH_2)(CH_3CH_2)(CH_3)_2PC(CN)_3$ was prepared. The salt was dissolved in a solvent of acetonitrile (ACN) with ACN/salt volume ratios ranging from 0 to 4. The ionic conductivities of the resulting electrolyte solution were measured at room temperature and the results are shown in FIG. 22. As FIG. 22 shows, the ionic conductivity increases with the increase of ACN/salt ratio from 13.9 mS/cm at zero ratio (neat ionic liquid) to a peak value of 75 mS/cm at ratios between 1.5 and 2.0.

Example 15

Figure 23:
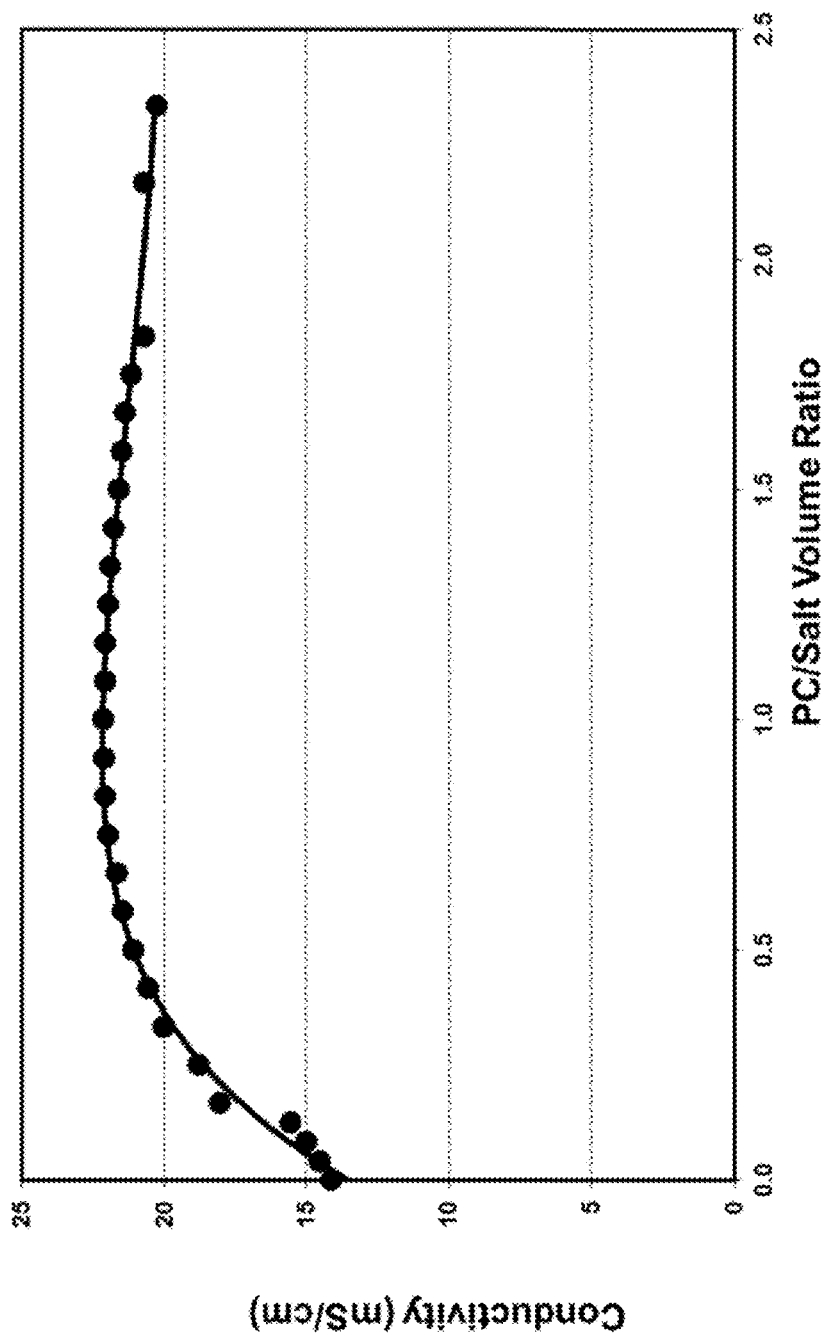
FIG. 23 depicts ionic conductivity as a function of PC/salt volume ratio for phosphonium salt $(CH_3CH_2CH_2)(CH_3CH_2)(CH_3)_2PC(CN)_3$ in propylene carbonate (PC) as described in Example 15.

In another experiment, phosphonium salt $(CH_3CH_2CH_2)(CH_3CH_2)(CH_3)_2PC(CN)_3$ was prepared. The salt was dissolved in a solvent of propylene carbonate (PC) with PC/salt volume ratios ranging from 0 to 2.3. The ionic conductivities of the resulting electrolyte solution were measured at room temperature and the results are shown in FIG. 23. As FIG. 23 shows, the ionic conductivity increases with the increase of PC/salt ratio from 13.9 mS/cm at zero ratio (neat ionic liquid) to a peak value of 22 mS/cm at ratios between 0.75 and 1.25.

Examples 16-35

In further experiments, various phosphonium salts were prepared. The salts were dissolved in a solvent of acetonitrile (ACN) to form electrolyte solutions at 1.0 M concentration. The ionic conductivities of the resulting electrolyte solutions were measured at room temperature. The electrochemical stable voltage window (Echem Window) was determined in an electrochemical cell with a Pt working electrode and a Pt counter electrode and an Ag/Ag+ reference electrode. The results are summarized in Table 15. The electrolytes exhibited ionic conductivity at room temperature greater than about 28 mS/cm, or greater than about 34 mS/cm, or greater than about 41 mS/cm, or greater than about 55 mS/cm, or greater than about 61 mS/cm. In one arrangement, the Echem window was between about −3.2 V and +2.4 V. In another arrangement, the Echem window was between about −3.0 V and +2.4 V. In yet another arrangement, the Echem window was between about −2.0 V and +2.4 V.

Table 15

| Example | Cation | Anion | Conductivity (mS/cm) | Echem Window (V) |
|---|---|---|---|---|
| 16 | $(CH_3CH_2CH_2)(CH_3CH_2)(CH_3)_2P^+$ | $C(CN)_3^-$ | 69.0 | −1.7 to +1.1 |
| 17 | $(CH_3CH_2CH_2)(CH_3CH_2)(CH_3)_2P^+$ | $CF_3BF_3^-$ | 64.0 | −3.0 to +2.4 |
| 18 | $(CH_3CH_2CH_2)(CH_3CH_2)(CH_3)_2P^+$ | $CF_3SO_3^-$ | 43.7 | −2.0 to +1.9 |
| 19 | $(CH_3CH_2CH_2)(CH_3CH_2)(CH_3)_2P^+$ | $BF_4^-$ | 55.5 | −2.0 to +1.9 |
| 20 | $(CH_3CH_2CH_2)(CH_3CH_2)(CH_3)_2P^+$ | $(CF_3CO)_2N^-$ | 41.5 | −1.6 to +2.0 |
| 21 | $(CH_3CH_2CH_2)(CH_3CH_2)(CH_3)_2P^+$ | $(CF_3)_2PO_2^-$ | 45.6 | −1.8 to +1.8 |
| 22 | $(CH_3CH_2CH_2)_2(CH_3)_2P^+$ | $CF_3SO_3^-$ | 38.7 | −2.0 to +2.4 |
| 23 | $(CH_3CH_2CH_2)_2(CH_3)_2P^+$ | $CH_3C_6H_4SO_3^-$ | 28.6 | N/A |
| 24 | $(CH_3CH_2CH_2)_2(CH_3)_2P^+$ | $C(CN)_3^-$ | 61.5 | −1.8 to +1.1 |
| 25 | $(CH_3CH_2CH_2)_2(CH_3)_2P^+$ | $(CF_3SO_2)_2N^-$ | 43.1 | −3.2 to +2.4 |
| 27 | $(CH_3CH_2CH_2)_2(CH_3)_2P^+$ | $CH_2CHBF_3^-$ | 41.0 | −1.0 to +1.0 |
| 28 | $((CH_3)_2CH)(CH_3CH_2)(CH_3)_2P^+$ | $C_4H_4SO_4N$ | 32.5 | N/A |
| 29 | $((CH_3)_2CH)(CH_3CH_2)(CH_3)_2P^+$ | $C_6H_6BF_3^-$ | 37.6 | N/A |
| 30 | $((CH_3)_2CH)(CH_3CH_2)(CH_3)_2P^+$ | $C_6H_3F_2BF_3^-$ | 37.1 | N/A |
| 31 | $((CH_3)_2CHCH_2)(CH_3CH_2)_2(CH_3)_2P^+$ | $CH_2CHBF_3^-$ | 45.7 | −1.8 to +1.8 |
| 32 | $((CH_3)_2CHCH_2)_2(CH_3CH_2)(CH_3)P^+$ | $CF_3SO_3^-$ | 46.8 | N/A |
| 33 | $((CH_3)_2CHCH_2)_2(CH_3CH_2)(CH_3)P^+$ | $(CF_3SO_2)_2N^-$ | 37.5 | N/A |
| 34 | $((CH_3)_2CHCH_2)_2(CH_3CH_2)(CH_3)P^+$ | $CH_3CH_2BF_3^-$ | 34.3 | N/A |
| 35 | $((CH_3)_2CHCH_2)_2(CH_3CH_2)(CH_3)P^+$ | $BF_4^-$ | 33.9 | N/A |

Examples 36-41

In further experiments, various phosphonium salts were prepared and compared to an ammonium salt as control. The salts were dissolved in a solvent of propylene carbonate (PC) to form electrolyte solutions at 1.0 M concentration. The ionic conductivities of the resulting electrolyte solutions were measured at room temperature. The electrochemical voltage window (Echem Window) was determined in an electrochemical cell with a Pt working electrode and a Pt counter electrode and an Ag/Ag+ reference electrode. The results are summarized in Table 16 demonstrating that the phosphonium salts exhibit higher conductivity and wider electrochemical voltage stability window compared to the control—ammonium analog. In one arrangement, the Echem window was between about −2.4 V and +2.5 V. In another arrangement, the Echem window was between about −1.9 V and +3.0 V.

TABLE 16

| Example | Electrolyte Salts | Conductivity (mS/cm) | Echem Window (V) |
|---|---|---|---|
| 36 | $(CH_3CH_2CH_2)(CH_3CH_2)(CH_3)_2PBF_4$ | 16.9 | −2.6 to +2.1 |
| 37 | $(CH_3CH_2CH_2)(CH_3CH_2)(CH_3)_2PCF_3BF_3$ | 15.9 | −1.9 to +3.0 |
| 38 | [1:3:1 ratio $(CH_3CH_2CH_2)(CH_3)_3P/(CH_3CH_2CH_2)(CH_3CH_2)(CH_3)_2 P/(CH_3CH_2CH_2)(CH_3CH_2)_2(CH_3)P]BF_4$ | 15.2 | −2.0 to +2.3 |
| 39 | $(CH_3CH_2CH_2)(CH_3CH_2)_3PBF_4$ | 17.6 | −2.5 to +2.2 |
| 40 | $(CH_3CH_2)_4PBF_4$ | 17.4 | −2.4 to +2.5 |
| 41 | $(CH_3CH_2)_3(CH_3)NBF_4$ | 14.9 | −1.7 to +1.9 |

Examples 42-45

Figure 24:
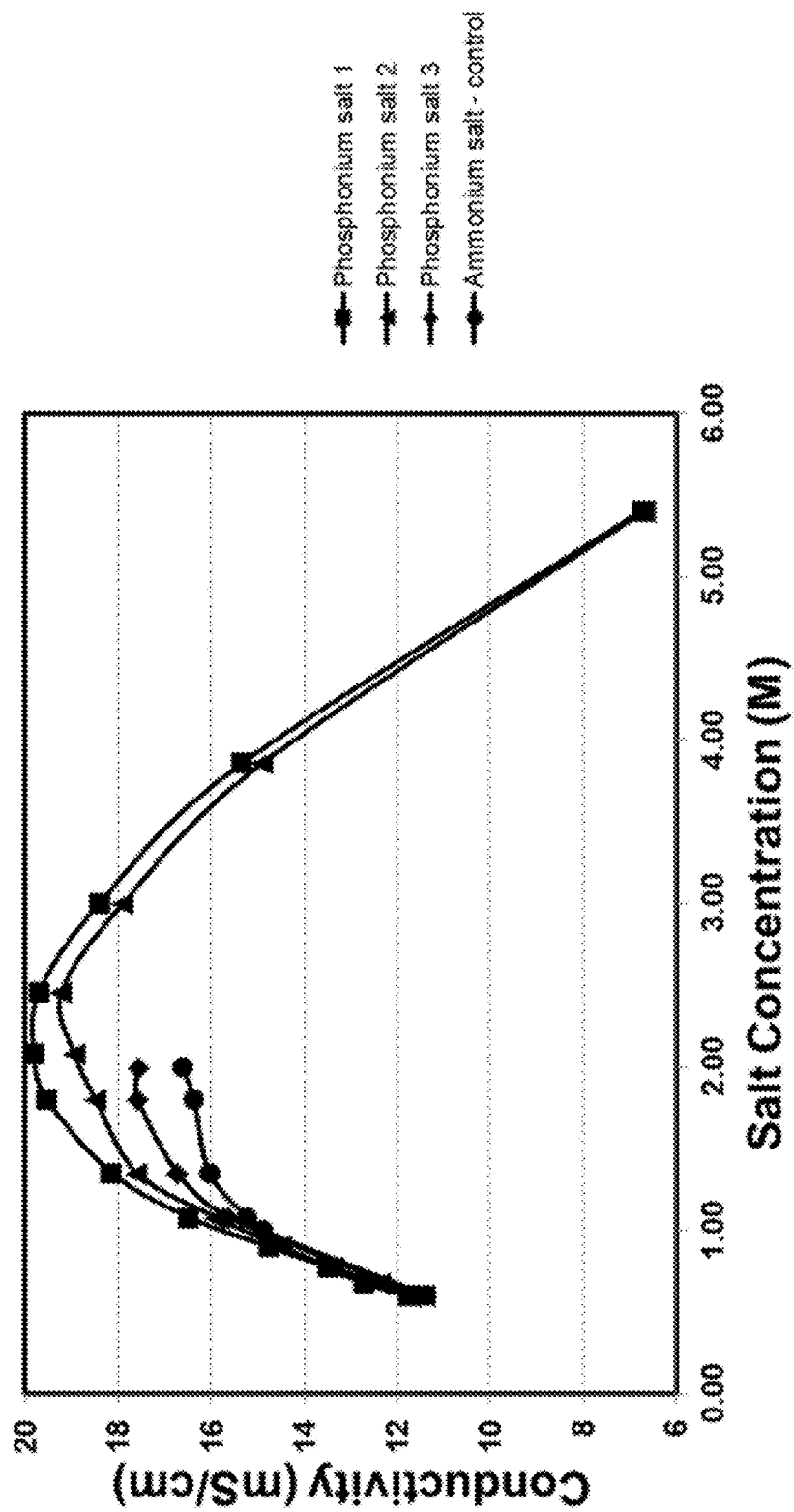
FIG. 24 depicts ionic conductivity as a function of molar concentration of phosphonium salts compared to an ammonium salt in propylene carbonate as described in Examples 42-45.

In further experiments, various phosphonium salts were prepared and compared to an ammonium salt as control. The salts were dissolved in a solvent of propylene carbonate (PC) to form electrolyte solutions at concentrations ranging from 0.6 M up to 5.4 M. The ionic conductivities of the resulting electrolyte solutions were measured at room temperature and the results are presented in FIG. 24. The numerical values of conductivity at 2.0 M concentration are shown in Table 17 illustrating that the phosphonium salts exhibit higher conductivity compared to the control-ammonium analog.

TABLE 17

| Example | | Salts | Conductivity (mS/cm) |
|---|---|---|---|
| 42 | Phosphonium salt 1 | $(CH_3CH_2CH_2)(CH_3CH_2)(CH_3)_2PBF_4$ | 19.8 |
| 43 | Phosphonium salt 2 | $(CH_3CH_2CH_2)(CH_3CH_2)(CH_3)_2PCF_3BF_3$ | 18.9 |
| 44 | Phosphonium salt 3 | [1:3:1 ratio $(CH_3CH_2CH_2)(CH_3)_3P/(CH_3CH_2CH_2)(CH_3CH_2)(CH_3)_2P/(CH_3CH_2CH_2)(CH_3CH_2)_2(CH_3)P]BCF_3F_3$ | 17.6 |
| 45 | Ammonium salt conytrol | $(CH_3CH_2)_3(CH_3)NBF_4$ | 16.6 |

Example 46

Figure 25:
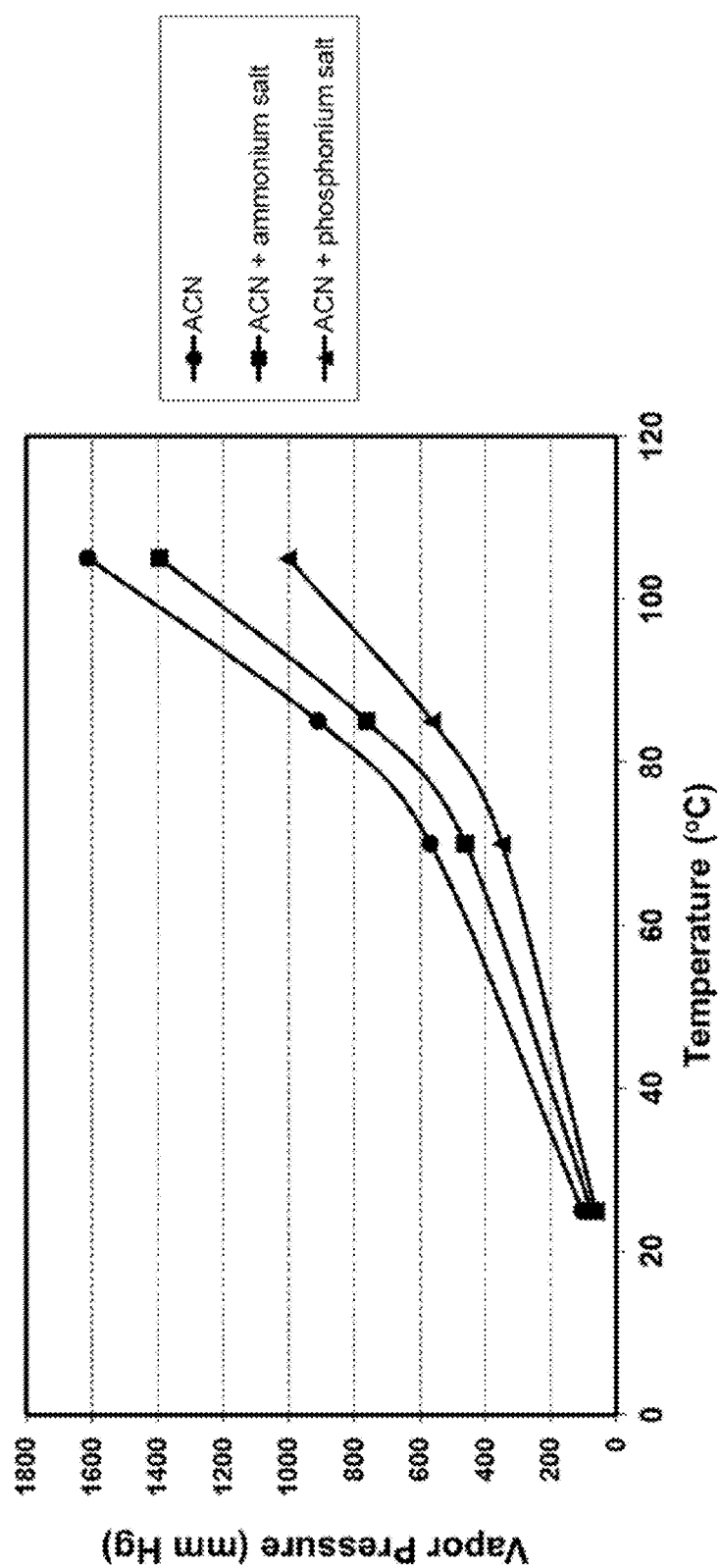
FIG. 25 depicts vapor pressure as a function of temperature for acetonitrile, acetonitrile with 1.0 M ammonium salt, and acetonitrile with 1.0 M phosphonium salt as described in Example 46.

In another experiment, phosphonium salt —$(CH_3CH_2CH_2)(CH_3CH_2)(CH_3)_2PCF_3BF_3$ was prepared and compared to an ammonium salt $(CH_3CH_2)_3(CH_3)NBF_4$ as control. The salts were dissolved in a solvent of acetonitrile (ACN) to form electrolyte solutions at 1.0 M concentration. The vapor pressures of the solutions were measured by pressure Differential Scanning calorimeter (DSC) at temperatures from 25 to 105° C. The ionic conductivities of the resulting electrolyte solutions were measured at room temperature. As illustrated in FIG. 25, the vapor pressure of ACN is lowered by 39% with the phosphonium salt compared to 27% with the ammonium salt at 25° C., 38% with the phosphonium salt compared to 13% for the ammonium salt at 105° C. The significant suppression in vapor pressure by phosphonium salt is an advantage in reducing the flammability of the electrolyte solution thus improving the safety of EDLC operation.

Examples 47-50

In another experiment, phosphonium salt was used as an additive in a lithium battery conventional electrolyte solution. In one embodiment of the present invention, a conventional electrolyte solution of 1.0 M $LiPF_6$ in a mixed solvent of EC (ethylene carbonate) and DEC (diethyl carbonate) at 1:1 weight ratio, noted as EC:DEC 1:1, was provided by Novolyte Technologies (part of BASF Group). The phosphonium salt $(CH_3CH_2CH_2)(CH_3CH_2)(CH_3)_2PCF_3BF_3$ was added to the conventional electrolyte solution at 20 w %. In another embodiment of the present invention, a conventional electrolyte solution of 1.0 M $LiPF_6$ in a mixed solvent of EC (ethylene carbonate), DEC (diethyl carbonate) and EMC (ethylmethyl carbonate) at 1:1:1 weight ratio, noted as EC:DEC:EMC 1:1:1, was provided by Novolyte Technologies (part of BASF Group). The phosphonium salt $(CH_3CH_2CH_2)(CH_3CH_2)(CH_3)_2PCF_3BF_3$ was added to the conventional electrolyte solution at 10 w %. Fire self-extinguishing test was performed by putting 1 g sample of the electrolyte solution into a glass dish, igniting the sample, and recording time needed for the flame to extinguish. The self-extinguishing time (SET) is normalized to the mass of the sample. The results are summarized in Table 18 below. The phosphonium additive in concentrations between 10 and 20 w % decreased the fire self-extinguishing time by 33 to 53%. This is an indication that the safety and reliability of lithium ion batteries can be substantially improved by using the phosphonium salt as an additive in the conventional lithium ion electrolytes.

TABLE 18

| Example | Solvent | Conventional Salt | Phosphonium Additive (w %) | SET (s/g) |
|---|---|---|---|---|
| 47 | EC:DEC 1:1 | 1.0M $LiPF_6$ | 0 | 67 |
| 48 | EC:DEC 1:1 | 1.0M $LiPF_6$ | 20 | 31 |
| 49 | EC:DEC:EMC | 1.0M $LiPF_6$ | 0 | 75 |
| 50 | EC:DEC:EMC | 1.0M $LiPF_6$ | 10 | 51 |

Example 51

Figure 26:
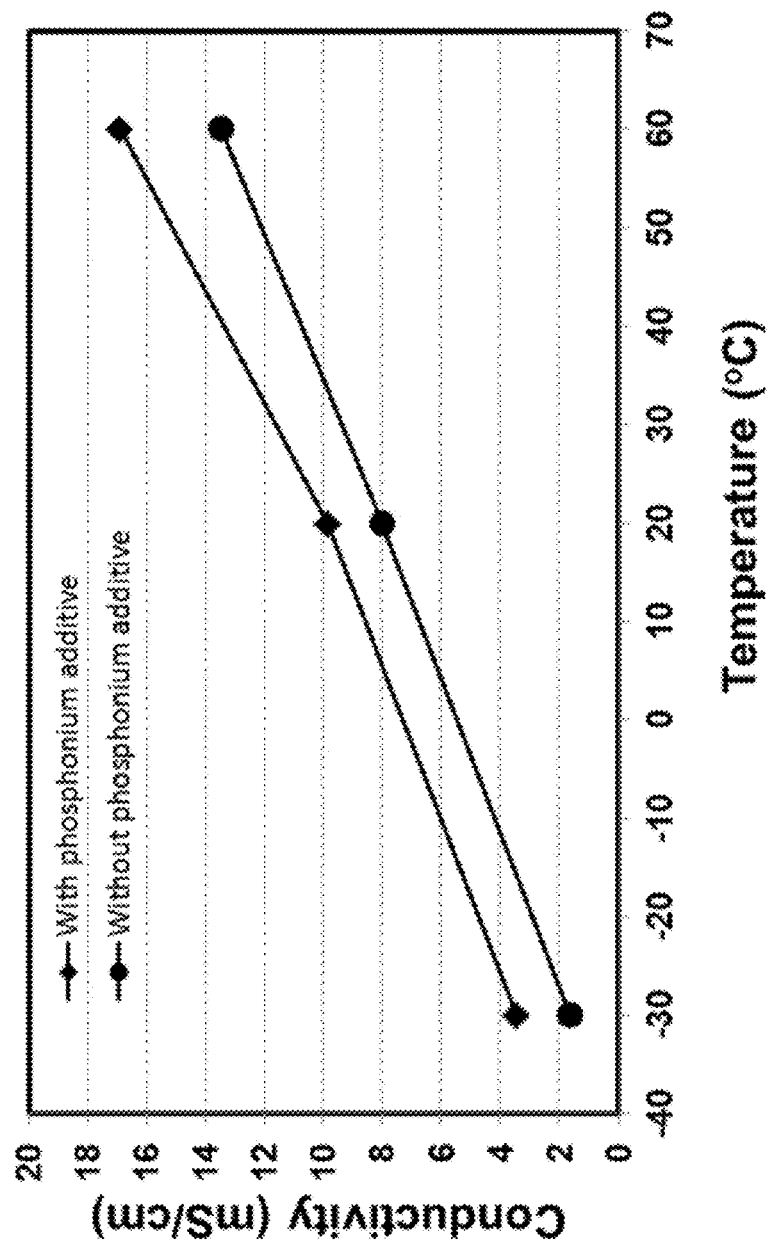
FIG. 26 shows the impact of phosphonium salt $(CH_3CH_2CH_2)(CH_3CH_2)(CH_3)_2PC(CN)_3$ on ionic conductivity of 1.0 M LiPF6 in EC:DEC 1:1 at different temperatures from −30 to 60° C. as described in Example 51.

In another experiment, phosphonium salt was used as an additive in a lithium battery standard electrolyte solution. In one embodiment of the present invention, a standard electrolyte solution of 1.0 M $LiPF_6$ in a mixed solvent of EC (ethylene carbonate) and DEC (diethyl carbonate) at 1:1 weight ratio, noted as EC:DEC 1:1, was provided by Novolyte Technologies (part of BASF Group). The phosphonium salt $(CH_3CH_2CH_2)(CH_3CH_2)(CH_3)_2PC(CN)_3$ was added to the standard electrolyte solution at 10 w %. The ionic conductivities of both the standard electrolyte solution and the solution with phosphonium additive were measured at different temperatures from −30 to 60° C. As illustrated in FIG. 26, the phosphonium additive improves the ionic conductivity of the electrolyte solution in a broad temperature range. At −30° C., the ionic conductivity is increased by 109% as a result of the phosphonium additive. At +20° C., the ionic conductivity is increased by 23% as a result of the phosphonium additive. At +60° C., the ionic conductivity is increased by about 25% as a result of the phosphonium additive. In general, ionic conductivity of the standard electrolyte solution increased by at least 25% as a result of the phosphonium additive Example 52

Figure 27:
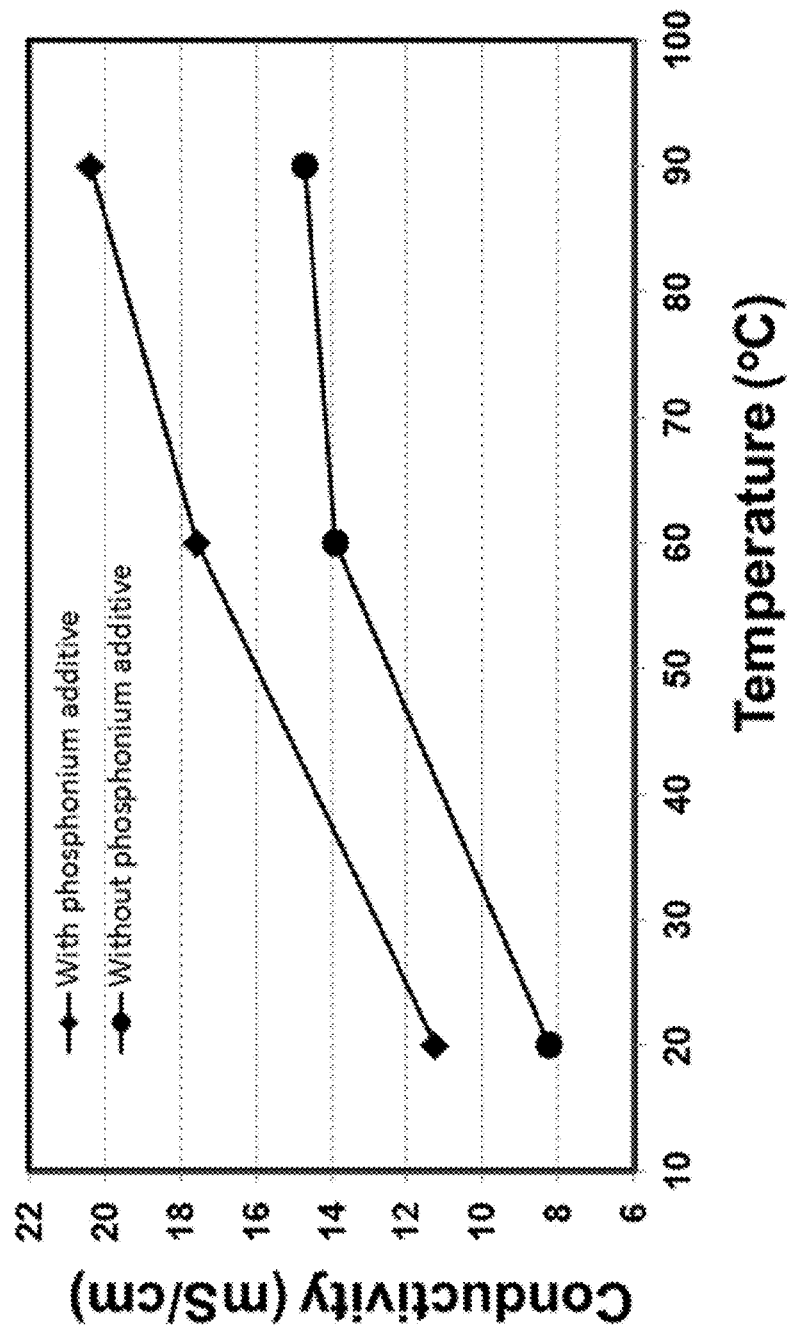
FIG. 27 shows the impact of phosphonium salt $(CH_3CH_2CH_2)(CH_3CH_2)(CH_3)_2PCF_3BF_3$ on ionic conductivity of 1.0 M LiPF6 in EC:DEC 1:1 at different temperatures from 20 to 90° C. as described in Example 52.

In another experiment, phosphonium salt was used as an additive in a lithium battery standard electrolyte solution. In one embodiment of the present invention, a standard electrolyte solution of 1.0 M $LiPF_6$ in a mixed solvent of EC (ethylene carbonate), DEC (diethyl carbonate) and EMC (ethylmethyl carbonate) at 1:1:1 weight ratio, noted as EC:DEC:EMC 1:1:1, was provided by Novolyte Technologies (part of BASF Group). The phosphonium salt $(CH_3CH_2CH_2)(CH_3CH_2)(CH_3)_2PCF_3BF_3$ was added to the standard electrolyte solution at 10 w %. The ionic conductivities of both the standard electrolyte solution and the solution with phosphonium additive were measured at different temperatures from 20 to 90° C. As illustrated in FIG. 27, the phosphonium additive improves the ionic conductivity of the electrolyte solution in a broad temperature range. At 20° C., the ionic conductivity is increased by about 36% as a result of the phosphonium additive. At 60° C., the ionic conductivity is increased by about 26% as a result of the phosphonium additive. At 90° C., the ionic conductivity is increased by about 38% as a result of the phosphonium additive. In general, ionic conductivity of the standard electrolyte solution increased by at least 25% as a result of the phosphonium additive.

Example 53

Figure 28:
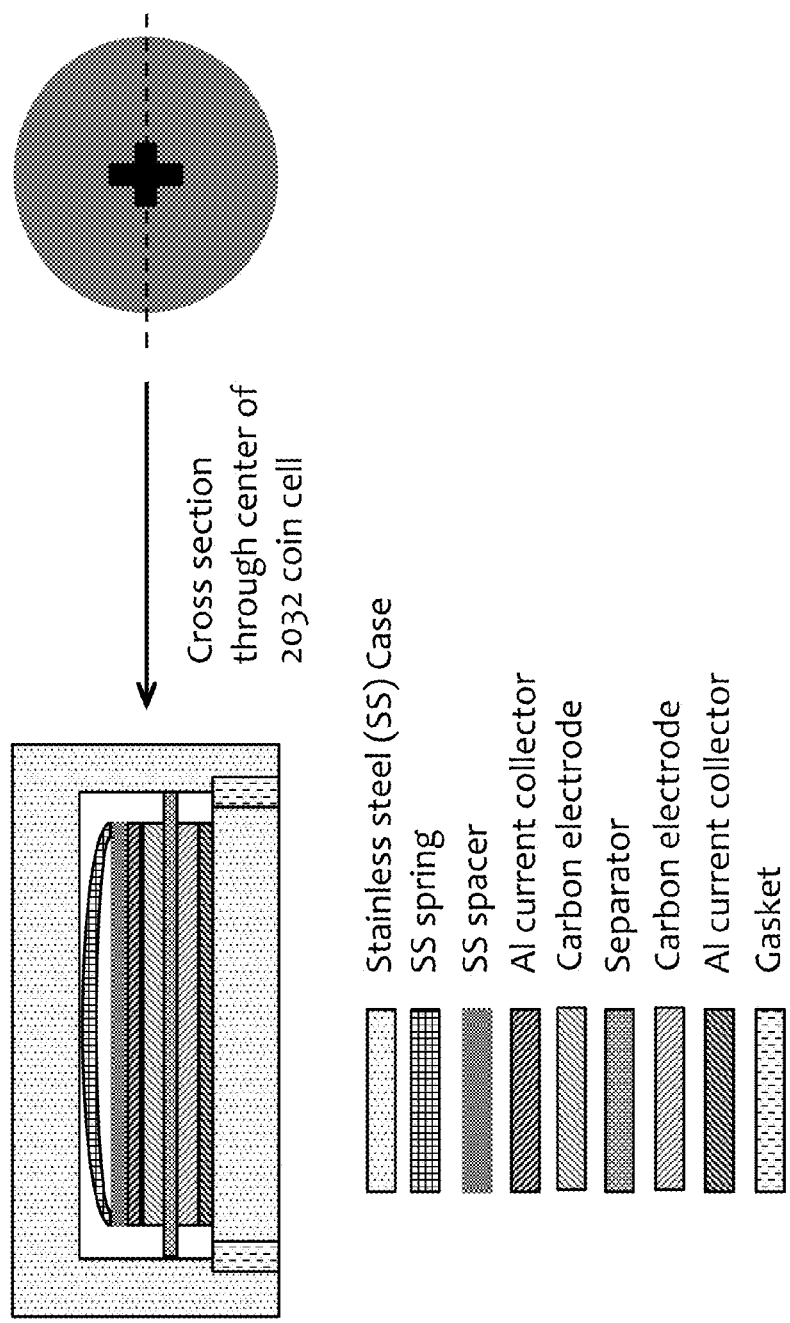
FIG. 28 is cross sectional view of an EDLC coin cell according to one embodiment of the present invention as described in Example 53.
Figure 29:
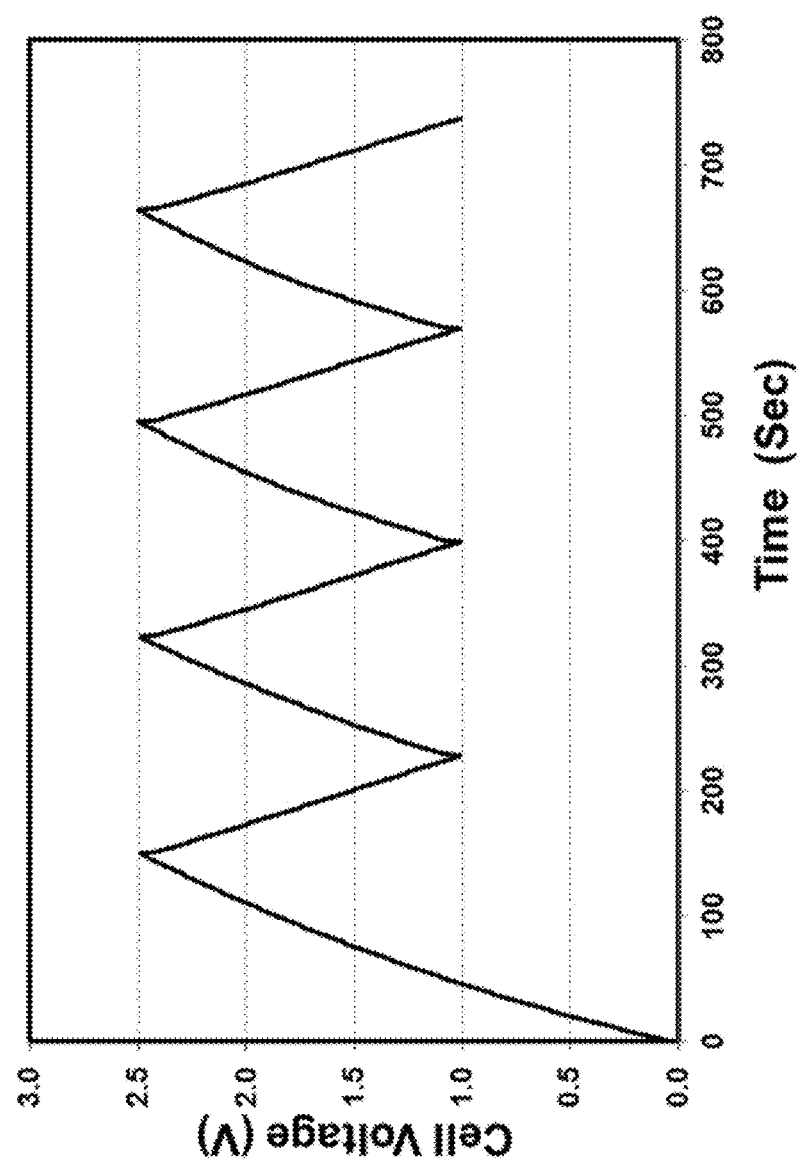
FIG. 29 shows the charge-discharge curve for a coin cell with 1.0 M phosphonium salt $—(CH_3CH_2CH_2)(CH_3CH_2)(CH_3)_2CF_3F_3$ in propylene carbonate as described in Example 53.

In a further experiment, as illustrated in FIG. 28 a coin cell is comprised of two disk-shaped carbon electrodes of 14 mm diameter, a separator of 19 mm diameter sandwiched between the two electrodes, and an impregnating electrolyte solution. In one embodiment of the present invention, two carbon electrodes of 100 μm thickness were prepared from activated carbon (Kuraray YP-50F, 1500-1800 m$^2$/g), mixed with a binder and each bounded to a 30 μm thick aluminum current collector. The separator was prepared from 35 μm NKK cellulose separator (TF40-35). Both the carbon electrodes and the separator were impregnated with an electrolyte solution containing 1.0 M phosphonium salt in either acetonitrile or propylene carbonate. The assembly was placed into a 2032 coin cell case and sealed by applying appropriate pressure using a crimper. The finished cell had a diameter of 20 mm and a thickness of 3.2 mm. The entire assembly process was carried out in a nitrogen-filled glove box. The finished cell was characterized with a CHI potentiostat by charging and discharging at a constant current. FIG. 29 shows the charge-discharge curve for such a coin cell with 1.0 M $(CH_3CH_2CH_2)(CH_3CH_2)(CH_3)_2CF_3F_3$ in propylene carbonate electrolyte. The cell was first charged from 0 V to 2.5 V then discharged to 1.0 V at 10 mA. The cell capacitance was determined to be 0.55 F.

Examples 54-57

Figure 30A:
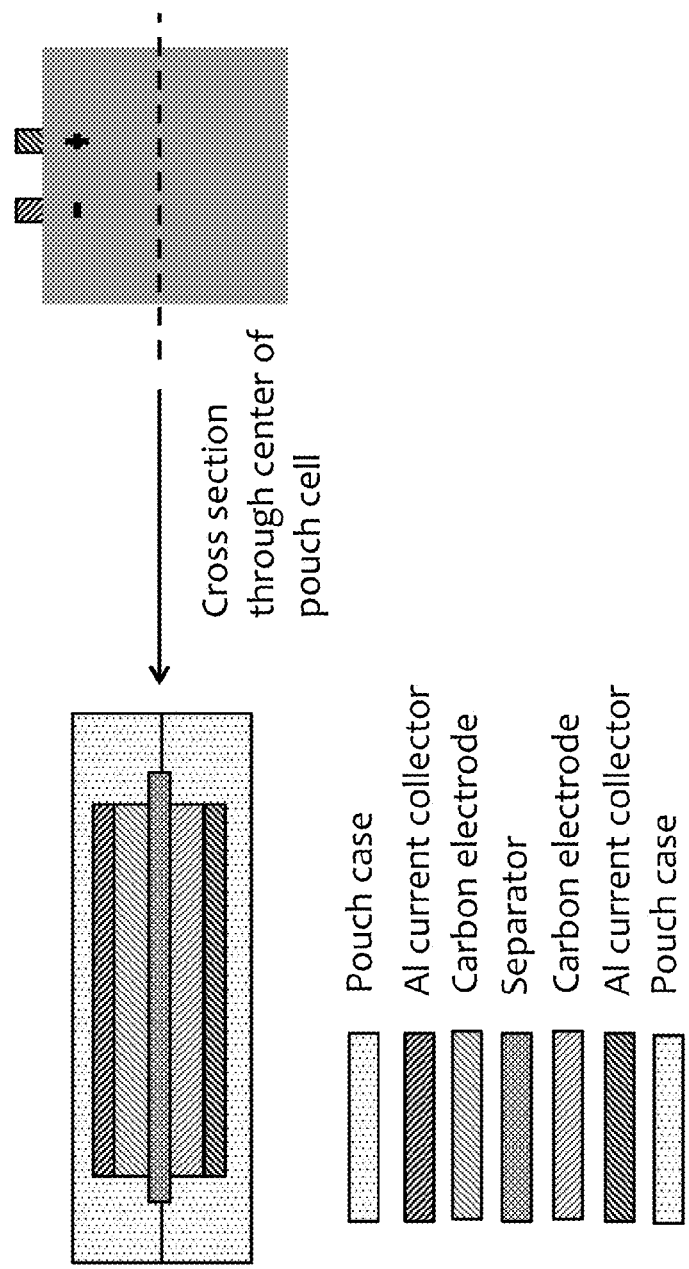
FIG. 30A is cross sectional view of an EDLC pouch cell according to one embodiment of the present invention as described in Examples 54-57.
Figure 30B:
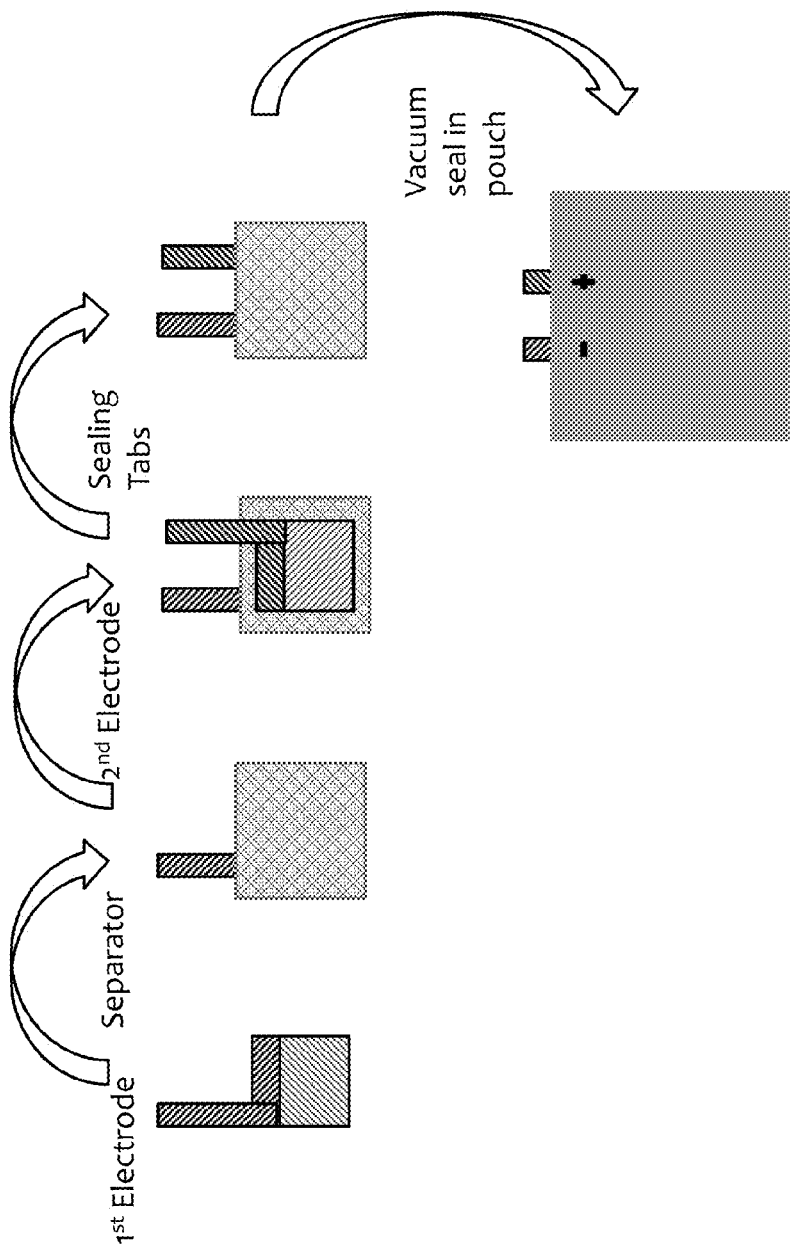
FIG. 30B illustrates the fabrication process of an EDLC pouch cell according to one embodiment of the present invention as described in Examples 54-57.
Figure 31A:
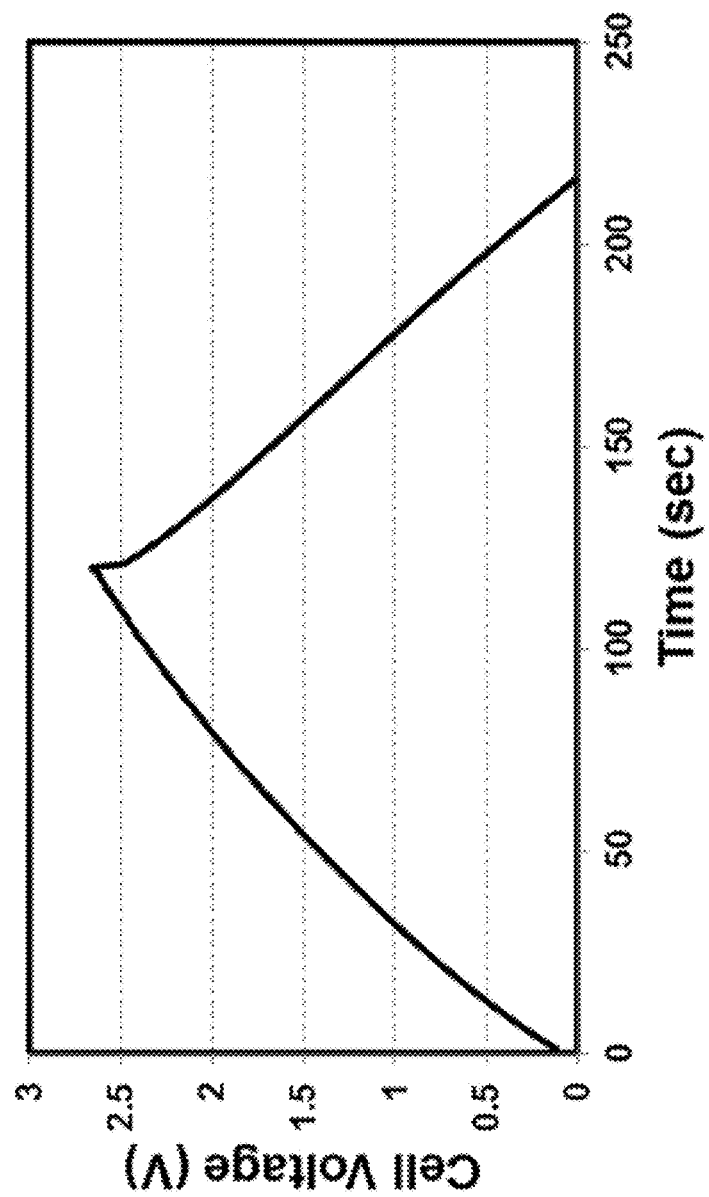
FIG. 31A shows the charge-discharge curve for a pouch cell with 1.0 M phosphonium salt $—(CH_3CH_2CH_2)(CH_3CH_2)(CH_3)_2CF_3F_3$ in propylene carbonate as described in Examples 54-57.
Figure 31B:
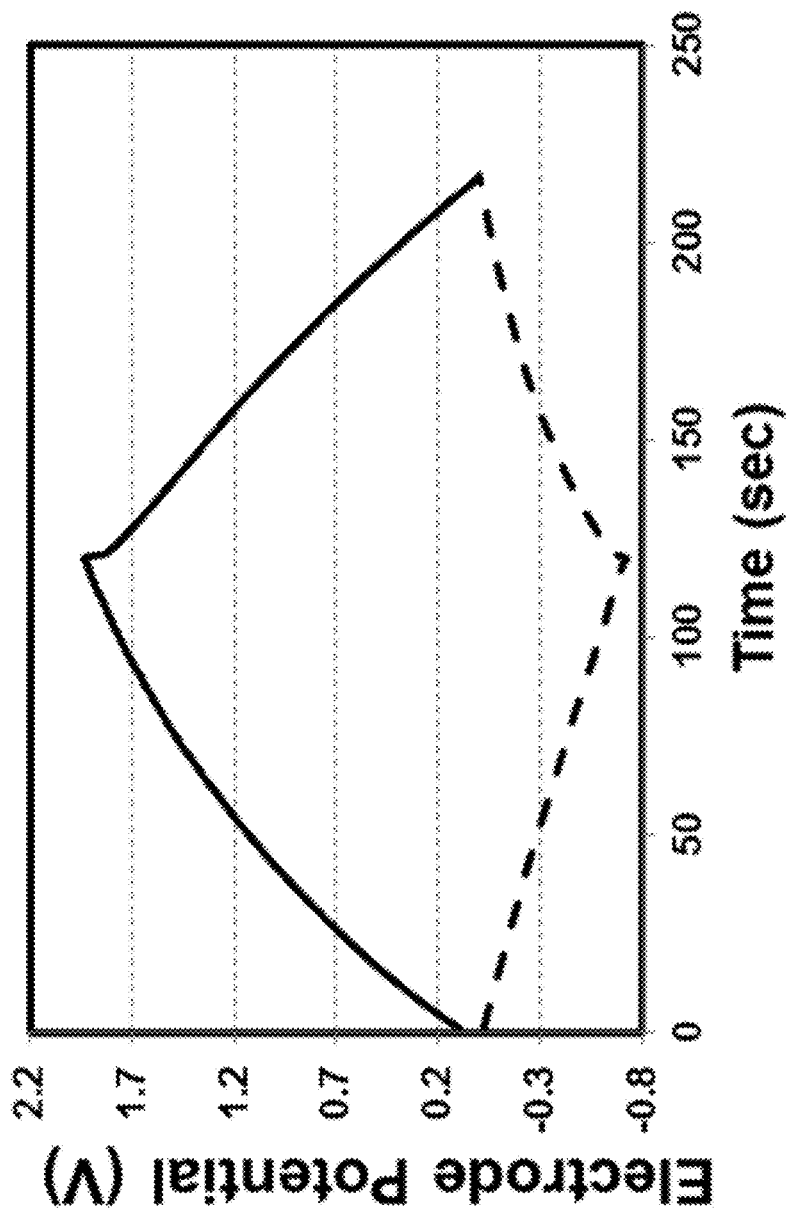
FIG. 31B shows the resolved electrode potential at the positive and negative carbon electrodes measured with a silver reference electrode as described in Examples 54-57.

In further experiments, as illustrated in FIG. 30A and FIG. 30B a pouch cell is comprised of two carbon electrodes of 15 mm×15 mm, a separate of 20 mm×20 mm sandwiched between the two electrodes, and an impregnating electrolyte solution. Optionally the pouch cell includes a third electrode—a reference electrode such as a silver electrode so that the potential at each carbon electrode can be determined. In one embodiment of the present invention, two carbon electrodes of 100 μm thickness were prepared from activated carbon (Kuraray YP-50F, 1500-1800 m$^2$/g), mixed with a binder and each bounded to a 30 μm thick aluminum current collector. The separator was prepared from 35 μm NKK cellulose separator (TF40-35). Both the carbon electrodes and the separator were impregnated with an electrolyte solution containing 1.0 M phosphonium salt in either acetonitrile or propylene carbonate. Once the assembly was aligned the two current collector tabs were held together using a hot melt adhesive tape to prevent leaking around the tabs. The assembly was then vacuumed sealed in an aluminum laminate pouch bag. The finished cell had dimensions of 70 mm×30 mm and a thickness of 0.3 mm. The entire assembly process was carried out in a nitrogen-filled glove box. The finished cell was characterized with a CHI potentiostat by charging and discharging at a constant current density. FIG. 31A shows the charge-discharge curve for a pouch cell with 1.0 M $(CH_3CH_2CH_2)(CH_3CH_2)(CH_3)_2CF_3F_3$ in propylene carbonate. The cell was charged and discharged between 0 and 2.7 V at 10 mA. FIG. 31B shows the resolved electrode potential at the positive and negative carbon electrodes measured with a silver reference electrode. In some cases, the pouch cell could be fully charged to high voltages up to 3.9 V. The results are summarized in Table 19 below. In one arrangement, the EDLC can be charged and discharged from 0 V to 3.9 V. In another arrangement, the EDLC can be charged and discharged from 0 V to 3.6 V. In another arrangement, the EDLC can be charged and discharged from 0 V to 3.3 V.

TABLE 19

| Example | Electrolyte Salts | Maximum Cell Voltage (V) | Capacitance (F) |
|---|---|---|---|
| 54 | $(CH_3CH_2CH_2)(CH_3CH_2)(CH_3)_2PCF_3BF_3$ | 3.9 | 0.61 |
| 55 | $(CH_3CH_2CH_2)(CH_3CH_2)(CH_3)_2PBF_4$ | 3.9 | 0.66 |
| 56 | [1:3:1 ratio $(CH_3CH_2CH_2)(CH_3)_3P/(CH_3CH_2CH_2)(CH_3CH_2)(CH_3)_2P/(CH_3CH_2CH_2)(CH_3CH_2)_2(CH_3)P]BF_4$ | 3.6 | 0.61 |
| 57 | $(CH_3CH_2CH_2)(CH_3CH_2)_3PBF_4$ | 3.3 | 0.60 |

Example 58

Figure 32:
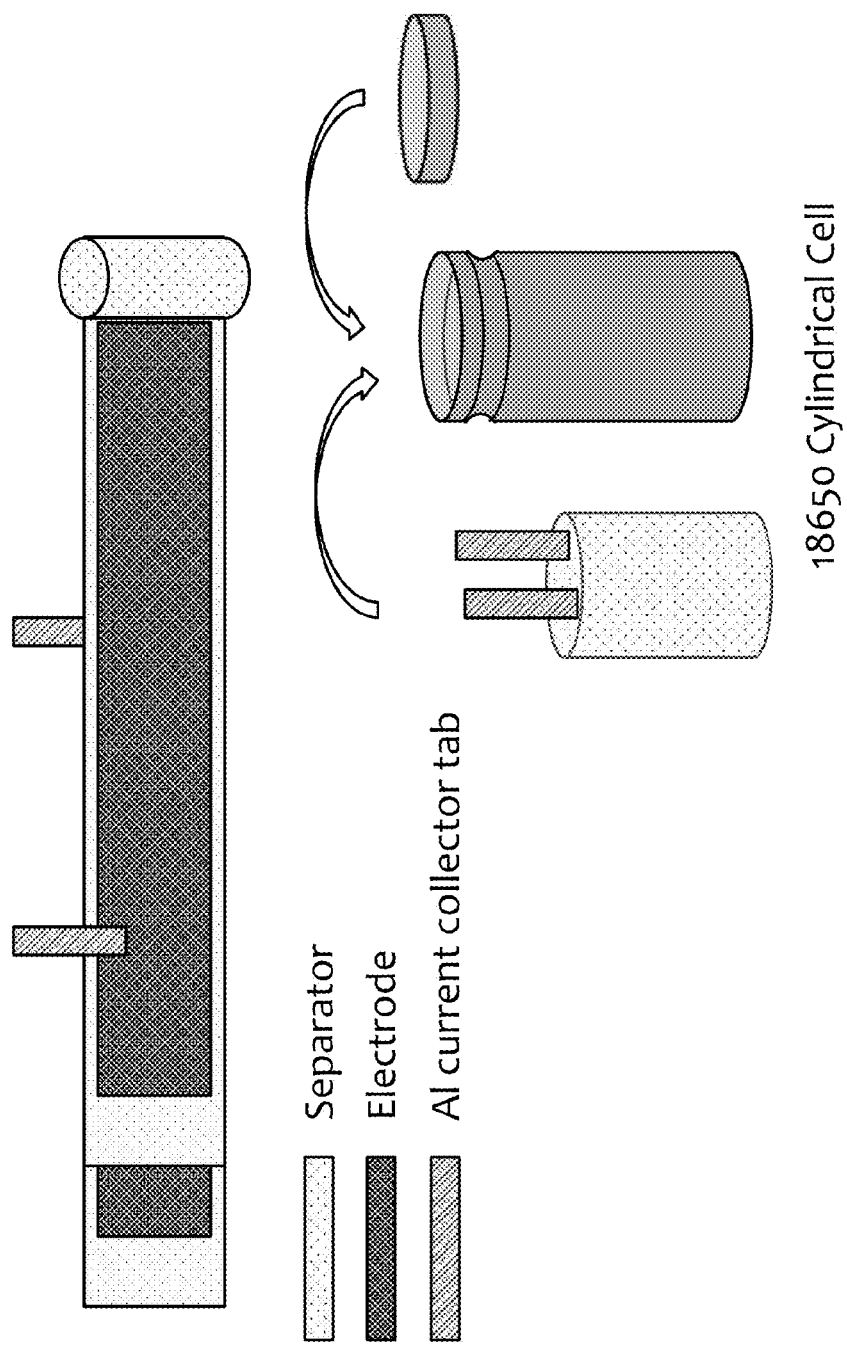
FIG. 32 is exploded view of an EDLC cylindrical cell according to one embodiment of the present invention as described in Example 58.
Figure 33:
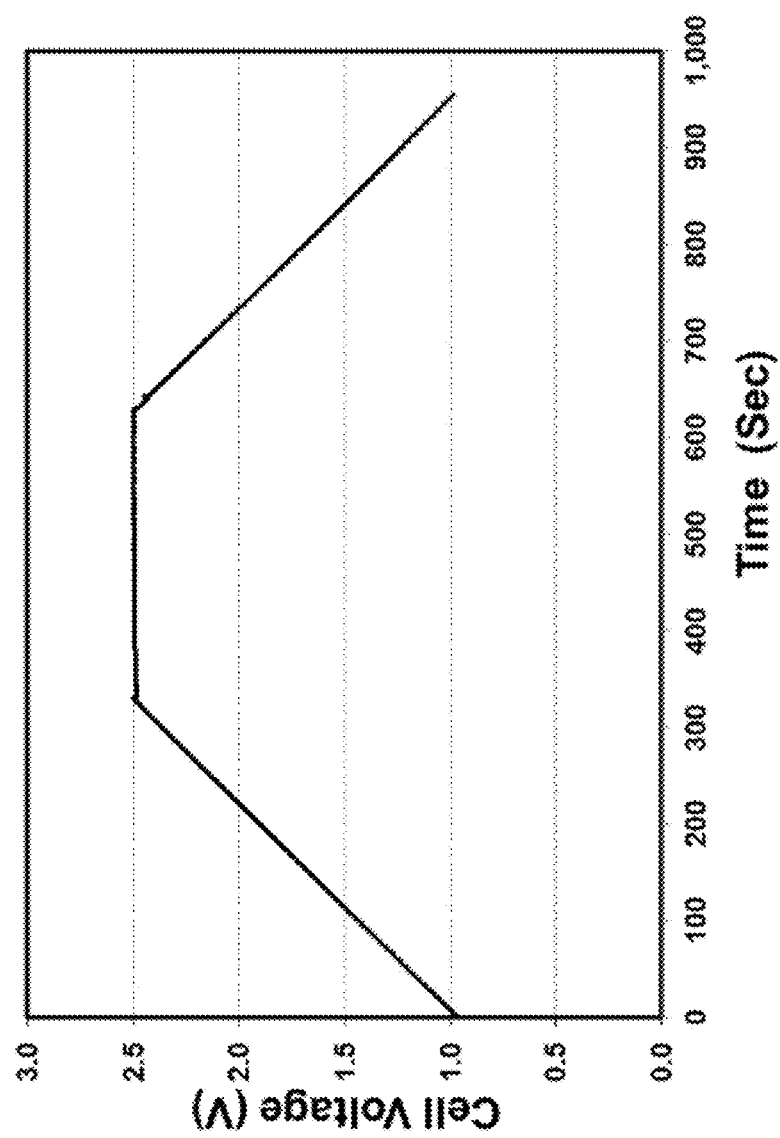
FIG. 33 shows the charge-discharge curve for a cylindrical cell with 1.0 M phosphonium salt $—(CH_3CH_2CH_2)(CH_3CH_2)(CH_3)_2CF_3F_3$ in propylene carbonate as described in Example 58.

In a further experiment, as illustrated in FIG. 32 a cylindrical cell is comprised of a first separator strip of 6 cm×50 cm, a first carbon electrode strip of 5.8 cm×50 cm placed on top of the first separator, a second separator strip of 6 cm×50 cm placed on top of the first carbon electrode, and a second carbon electrode strip of 5.8 cm×50 cm placed on top of the second separator. The electrode/separator assembly was wound in a jellyroll fashion into a tight cell core. In one embodiment of the present invention, carbon electrodes of 100 μm thickness were prepared from activated carbon (Kuraray YP-50F, 1500-1800 m²/g) mixed with a binder and bounded to both sides of a 30 μm thick aluminum current collector resulting in a double-sided electrode structure. The separator was prepared from 35 μm NKK cellulose separator (TF40-35). The jellyroll core was placed into an 18650 cylindrical cell case. An electrolyte solution containing 1.0 M phosphonium salt in either acetonitrile or propylene carbonate was added using a vacuum injection apparatus to ensure that the electrolyte permeated and completely filled the porosity of the separators and carbon electrodes. After electrolyte filling, a cap was placed to close the cell. The finished cylindrical cell had dimensions of 18 mm in diameter and 65 mm in length. The entire assembly process was carried out in a dry room or nitrogen-filled glove box. The finished cell was characterized with a PAR VersaSTAT 4-200 potentiostat by charging and discharging at a constant current. FIG. 33 shows the charge-discharge curve for such a cylindrical cell with an electrolyte solution of 1M $(CH_3CH_2CH_2)(CH_3CH_2)(CH_3)_2CF_3F_3$ in propylene carbonate. The cell was first charged from 1.0 V to 2.5 V, held at 2.5 V for 300 sec, and then discharged to 2.5 V at 600 mA. The cell capacitance was determined to be 132 F.

Examples 59-61

Figure 34:
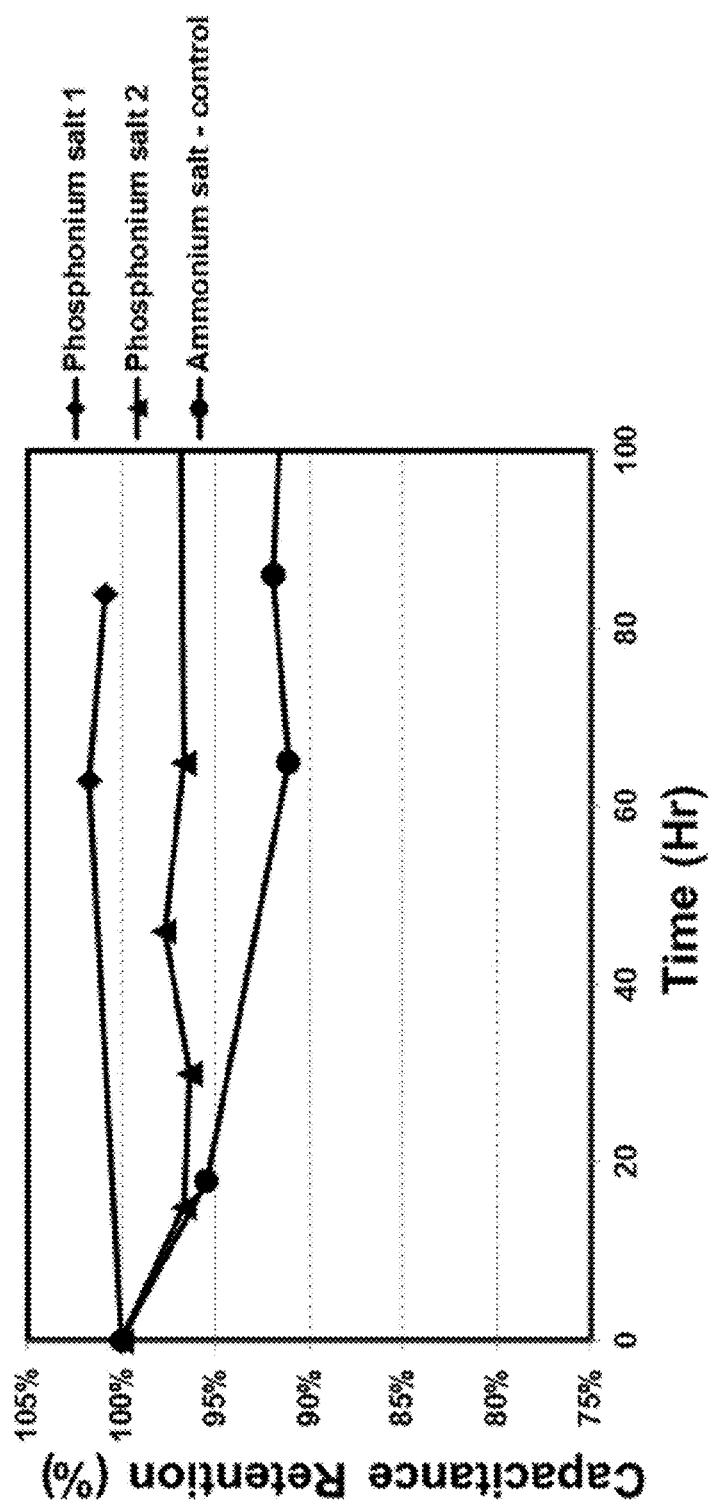
FIG. 34 shows capacitance retention at 2.7 V and 70° C. for pouch cells with 1.0 M phosphonium salts compared to an ammonium salt in propylene carbonate as described in Examples 59-61.

In further experiments, accelerated stress testing was performed at 2.7 V and 70° C. for pouch cells containing 1.0 M phosphonium salts in propylene carbonate compared to an ammonium salt as control. The cell performance stability was measured as retention of the initial capacitance. The results are show in FIG. 34. The numerical values of capacitance retention at 80 hour are shown in Table 20 illustrating that the cells with phosphonium salts exhibit higher retention compared to the cell with ammonium salt.

TABLE 20

| Example | Salts | | Capacitance Retention (%) |
|---|---|---|---|
| 59 | Phosphonium salt 1 | $(CH_3CH_2CH_2)(CH_3CH_2)(CH_3)_2PCF_3BF_3$ | 100 |
| 60 | Phosphonium salt 2 | $(CH_3CH_2CH_2)(CH_3CH_2)(CH_3)_2PBF_4$ | 97 |
| 61 | Ammonium salt conytrol | $(CH_3CH_2)_3(CH_3)NBF_4$ | 92 |

Example 62

Figure 35:
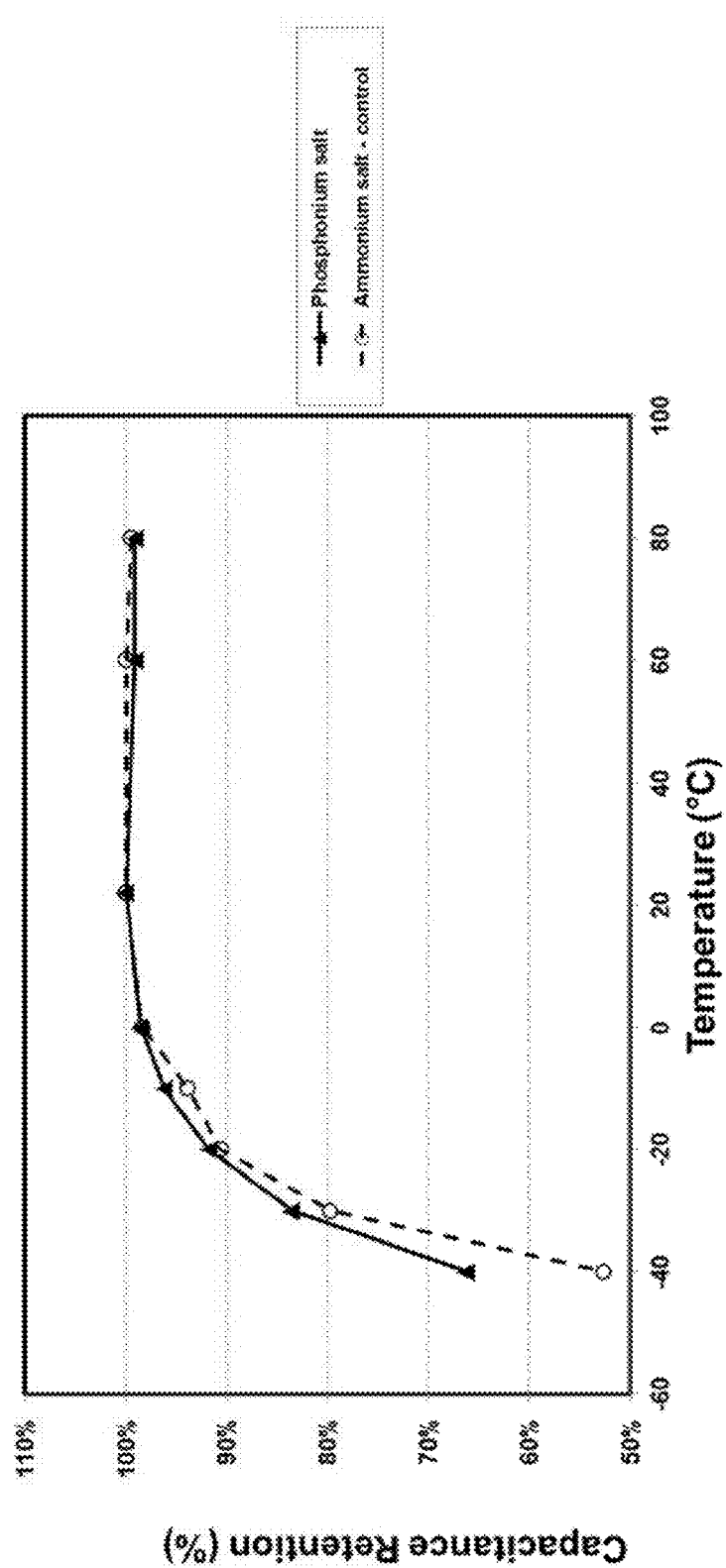
FIG. 35 shows capacitance retention at different temperatures for pouch cells with 1.0 M phosphonium salt compared to an ammonium salt in propylene carbonate as described in Example 62.

In further experiments, cell performance at different temperatures was tested from −40° C. to +80° C. for pouch cells containing an electrolyte solution of 1.0 M phosphonium salt —$(CH_3CH_2CH_2)(CH_3CH_2)(CH_3)_2PCF_3BF_3$ compared to pouch cells with an electrolyte solution of an ammonium salt —$(CH_3CH_2)_3(CH_3)NBF_4$ as control. The cell performance stability was measured as retention of the capacitance at 25° C. As illustrated in FIG. 35, the cells with phosphonium salts exhibit higher retention at temperatures below 0° C. compared to the cell with ammonium salt. As can be seen, the EDLCs made with the novel phosphonium electrolytes disclosed herein can be operated in a temperature range between −40° C. and +80° C. It is expected that the EDLCs made with the phosphonium electrolytes disclosed herein can be operated in a temperature range between about −50° C. and +120° C. Thus, with the materials and structures disclosed herein, it is now possible to make EDLCs that can function in extended temperature ranges. This makes it possible to implement these devices into broad applications that experience a wide temperature range during fabrication and/or operation.

The present invention is not to be limited in scope by the specific embodiments disclosed in the examples which are intended as illustrations of a few aspects of the invention and any embodiments which are functionally equivalent are within the scope of this invention. Indeed, various modifications of the invention in addition to those shown and described herein will become apparent to those skilled in the art and are intended to fall within the appended claims.

A number of references have been cited, the entire disclosures of which are incorporated herein by reference.

What is claimed is:

1. An electrochemical double layer capacitor (EDLC) comprising:
   a positive electrode;
   a negative electrode;
   a separator between the positive electrode and the negative electrode; and
   an electrolyte composition in contact with the positive electrode, the negative electrode, and the separator, wherein the electrolyte composition comprises:
   one or more phosphonium ionic liquids, or one or more phosphonium salts dissolved in a solvent, the one or more phosphonium ionic liquids or phosphonium salts comprising one or more cations of the formula:

$P(CH_3CH_2CH_2)_y(CH_3CH_2)_x(CH_3)_{4-x-y}$ (where $x,y=0$ to 4; $x+y\leq4$)

and one or more anions of the formula:

$(CF_3)_xBF_{4-x}$ (where $x=0$ to 4)

$(CF_3(CF_2)_n)_xPF_{6-x}$ (where $n=0$ to 2; $x=0$ to 4)

$(-OCO(CH_2)_nCOO-)(CF_3)_xBF_{2-x}$ (where $n=0$ to 2; $x=0$ to 2)

$(-OCO(CH_2)_nCOO-)_2B$ (where $n=0$ to 2)

$(-OSOCH_2SOO-)(CF_3)_xBF_{2-x}$ (where $x=0$ to 2)

$(-OCOCOO-)_x(CF_3)_yPF_{6-2x-y}$ ($x=1$ to 3; $y=0$ to 4; $2x+y\leq6$).

2. The EDLC of claim 1 wherein any one or more of the phosphonium salts may be liquid or solid at a temperature of 100° C. or below.

3. The EDLC of claim 1 wherein the phosphonium based cation is comprised of the formula: $(CH_3CH_2CH_2)_2(CH_3CH_2)(CH_3)P^+$.

4. The EDLC of claim 1 wherein the phosphonium based cation is comprised of the formula: $(CH_3CH_2CH_2)(CH_3CH_2)(CH_3)_2P^+$.

5. The EDLC of claim 1 wherein the phosphonium based cation is comprised of the formula: $(CH_3CH_2)_3(CH_3)P^+$.

6. The EDLC of claim 1 wherein the phosphonium based cation is comprised of the formula: $(CH_3CH_2CH_2)(CH_3CH_2)_3P^+$.

7. The EDLC of claim 1 wherein the phosphonium based cation is comprised of the formula: $(CH_3CH_2)_4P^+$.

8. The EDLC of claim 1 wherein the phosphonium based cation is comprised of the formula: $(CH_3CH_2CH_2)_3(CH_3)P^+$.

9. The EDLC of claim 1 wherein the phosphonium based cation is comprised of the formula: $(CH_3CH_2CH_2)_3(CH_3CH_2)P^+$.

10. The EDLC of claim 1 wherein the phosphonium based cation is comprised of the formula: $(CF_3CH_2CH_2)(CH_3CH_2)_3P^+$.

11. The EDLC of claim 1 wherein the phosphonium based cation is comprised of the formula: $(CF_3CH_2CH_2)_3(CH_3CH_2)P^+$.

12. The EDLC of claim 1 wherein the phosphonium based cation is comprised of the formula: $(CF_3CH_2CH_2)_3(CH_3)P^+$.

13. The EDLC of claim 1 wherein the phosphonium based cation is comprised of the formula: $(CF_3CH_2CH_2)_4P^+$.

14. The EDLC of claim 1 wherein the electrolyte composition comprises the phosphonium cations and one or more anions selected from the group consisting of: $PF_6^-$, $(CF_3)_3PF_3^-$, $(CF_3)_4PF_2^-$, $(CF_3CF_2)_4PF_2^-$, $(CF_3CF_2CF_2)_4PF_2^-$, $(—OCOCOO—)PF_4^-$, $(—OCOCOO—)(CF_3)_3PF$, $(—OCOCOO—)_3P$, $BF_4^-$, $CF_3BF_3^-$, $(CF_3)_2BF_2^-$, $(CF_3)_3BF$, $(CF_3)_4B^-$, $(—OCOCOO—)BF_2^-$, $(—OCOCOO—)BF(CF_3)$, $(—OCOCOO—)(CF_3)_2^-$$(—OSOCH_2SOO—)BF_2^-$, $(—OSOCF_2SOO—)BF_2^-$, $(—OSOCH_2SOO—)BF(CF_3)$, $(—OSOCF_2SOO—)BF(CF_3)$, $(-OSOCH_2SOO—)B(CF_3)_2$, $(—OSOCF_2SOO—)B(CF_3)_2$, $CF_3SO_3^-$, $(CF_3SO_2)_2N^-$, $(—OCOCOO—)_2PF_2^-$, $(CF_3CF_2)_3PF_3^-$, $(CF_3CF_2CF_2)_3PF_3^-$, $(—OCOCOO—)_2B^-$, $(—OCO(CH_2)_nCOO—)BF(CF_3)$, $(—OCOCR_2COO—)BF(CF_3)$, $(—OCOCR_2COO—)B(CF_3)_2$, $(—OCOCR_2COO—)_2B^-$, $CF_3BF(—OOR)_2$, $CF_3B(—OOR)_3$, $CF_3B(—OOR)F_2$, $(—OCOCOCOO—)BF(CF_3)$, $(—OCOCOCOO—)B(CF_3)_2$, $(—OCOCOCOO—)_2B^-$, $(—OCOCR^1R^2CR^1R^2COO—)BF(CF_3)$, and $(—OCOCR^1R^2CR^1R^2COO—)B(CF_3)_2$; and where R, $R^1$, and $R^2$ are each independently H or F.

15. The EDLC of claim 1 wherein the one or more anions are comprised of any one or more of: $^-O_3SCF_3$, $^-O_2CCF_3$, $^-O_2CCF_2CF_2CF_3$, $CF_3BF_3^-$, $C(CN)_3^-$, $PF_6^-$, $NO_3^-$, $^-O_3SCH_3$, $BF_4^-$, $^-O_3SCF_2CF_2CF_3$, $^-O_2CCF_2CF_3$, $^-O_2CH$, $^-O_2CC_6H_5$, $^-OCN$, $CO_3^{2-}$, $(—OCOCOO—)BF_2^-$, $(—OCOCOO—)(CF_3)_2B^-$, $(—OCOCOO—)_2B^-$, $(CF_3SO_2)_2N^-$, $(CF_3)_2BF_2^-$, $(CF_3)_3BF^-$, $CF_3CF_2BF_3^-$, or $^-N(CN)_2$.

16. The EDLC of claim 1 wherein the electrolyte composition comprises the phosphonium salts and one or more of the following solvents: acetonitrile, ethylene carbonate (EC), propylene carbonate (PC), butylene carbonate (BC), dimethyl carbonate (DMC), diethyl carbonate (DEC), ethylmethyl carbonate (EMC) or methyl ethyl carbonate (MEC), methyl propionate (MP), fluoroethylene carbonate (FEC), fluorobenzene (FB), vinylene carbonate (VC), vinyl ethylene carbonate (VEC), phenylethylene carbonate (PhEC), propylmethyl carbonate (PMC), diethoxyethane (DEE), dimethoxyethane (DME), tetrahydrofuran (THF), γ-butyrolactone (GBL), γ-valerolactone (GVL), or mixtures thereof.

17. The EDLC of claim 1 wherein the electrolyte composition comprises the phosphonium salt and the phosphonium salt is comprised of a cation of the formula: $(CH_3CH_2CH_2)(CH_3CH_2)(CH_3)_2P$ and an anion of any one or more of the formulas: $BF_4^-$, $PF_6^-$, $CF_3BF_3^-$, $(—OCOCOO—)BF_2^-$, $(—OCOCOO—)(CF_3)_2B^-$, $(—OCOCOO—)_2B^-$, $CF_3SO_3^-$, $C(CN)_3^-$, $(CF_3SO_2)_2N^-$, or combinations thereof.

18. The EDLC of claim 1 wherein the electrolyte composition comprises the phosphonium salt and the phosphonium salt is comprised of a cation of the formula: $(CH_3)(CH_3CH_2)_3P$ and an anion of any one or more of the formulas: $BF_4^-$, $PF_6^-$, $CF_3BF_3^-$, $(—OCOCOO—)BF_2^-$, $(—OCOCOO—)(CF_3)_2B^-$, $(—OCOCOO—)_2B^-$, $CF_3SO_3^-$, $C(CN)_3^-$, $(CF_3SO_2)_2N^-$, or combinations thereof.

19. The EDLC of claim 1 wherein the electrolyte composition comprises the phosphonium salt and the phosphonium salt is comprised of a cation of the formula: $(CH_3CH_2CH_2)(CH_3CH_2)_3P$ and an anion of any one or more of the formulas: $BF_4^-$, $PF_6^-$, $CF_3BF_3^-$, $(—OCOCOO—)BF_2^-$, $(—OCOCOO—)_2B^-$, $(—OCOCOO—)(CF_3)_2B^-$, $CF_3SO_3^-$, $C(CN)_3^-$, $(CF_3SO_2)_2N^-$, or combinations thereof.

20. The EDLC of claim 1 wherein the electrolyte composition comprises the phosphonium salt and the phosphonium salt is comprised of a cation of the formula: $(CH_3CH_2)_4P^+$ and an anion of any one or more of the formulas: $BF_4^-$, $PF_6^-$, $CF_3BF_3^-$, $(—OCOCOO—)BF_2^-$, $(—OCOCOO—)(CF_3)_2B^-$, $(—OCOCOO—)_2B^-$, $CF_3SO_3^-$, $C(CN)_3^-$, $(CF_3SO_2)_2N^-$ or combinations thereof.

21. The EDLC of claim 1 wherein the positive electrode active materials and the negative electrode active materials each are selected from the group consisting of carbon blacks, graphite, graphene; carbon-metal composites; polyaniline, polypyrrole, polythiophene; oxides, chlorides, bromides, sulfates, nitrates, sulfides, hydrides, nitrides, phosphides, or selenides of lithium, ruthenium, tantalum, rhodium, iridium, cobalt, nickel, molybdenum, tungsten, or vanadium, and combinations thereof.

22. The EDLC of claim 1 wherein the positive electrode active materials and the negative electrode active materials are the same.

23. The EDLC of claim 1 wherein the positive electrode active materials and the negative electrode active materials are different.

24. The EDLC of claim 1 wherein the electrolyte composition further comprises one or more conventional, non-phosphonium salts.

25. The EDLC of claim 24 wherein the phosphonium based ionic liquids or salts and the conventional salts are present in the electrolyte composition at a mole ratio in the range of 1:100 to 1:1, phosphonium based ionic liquid or salt: conventional salt.

26. The EDLC of claim 24 wherein the one or more conventional salts are selected from the group consisting of: tetraethylammonium tetrafluorborate (TEABF$_4$), triethylmethylammonium tetrafluoroborate (TEMABF$_4$), 1-ethyl-3-methylimidazolium tetrafluoroborate (EMIBF$_4$), 1-ethyl-3-methylimidazolium bis(trifluoromethanesulfonyl)imide (EMIIm), and 1-ethyl-3-methylimidazolium hexafluorophosphate (EMIPF$_6$).

27. The EDLC of claim 1 wherein one or more of the hydrogen atoms in the one or more cations or anions are substituted by fluorine.

28. An electrochemical double layer capacitor (EDLC) comprising:
   a positive electrode;
   a negative electrode;
   a separator between the positive electrode and the negative electrode; and
   an electrolyte composition in contact with the positive electrode, the negative electrode, and the separator, wherein the electrolyte composition comprises:

a phosphonium salt dissolved in a solvent, where the phosphonium salt is comprised of:
a cation comprised of a 1:3:1 mole ratio of: $(CH_3CH_2CH_2)(CH_3)_3P/(CH_3CH_2CH_2)(CH_3CH_2)(CH_3)_2P/(CH_3CH_2CH_2)(CH_3CH_2)_2(CH_3)P$; and
one or more anions of the formula $BF_4^-$, $PF_6^-$, $CF_3BF_3^-$, $(-OCOCOO-)BF_2^-$, $(-OCOCOO-)(CF_3)_2B^-$, $(-OCOCOO-)_2B^-$, $CF_3SO_3^-$, $C(CN)_3^-$, $(CF_3SO_2)_2N^-$ or combinations thereof.

29. The EDLC of claim 28 wherein the anions are comprised of a mixture of $BF_4-$ and $CF_3BF_3-$ at a concentration of $[BF_4-]:[CF_3BF_3-]$ mole ratio in the range of 100/1 to 1/1.

30. The EDLC of claim 28 wherein the anions are comprised of a mixture of $PF_6-$ and $CF_3BF_3-$ at a concentration of $[PF_6-]:[CF_3BF_3-]$ mole ratio in the range of 100/1 to 1/1.

31. The EDLC of claim 28 wherein the anions are comprised of a mixture of PF6- and BF4- at a concentration of $[PF_6-]:[BF_4-]$ mole ratio in the range of 100/1 to 1/1.

32. An electrochemical double layer capacitor (EDLC) comprising:
a positive electrode;
a negative electrode;
a separator between the positive electrode and the negative electrode; and
an electrolyte composition in contact with the positive electrode, the negative electrode, and the separator, wherein the electrolyte composition comprises:
a phosphonium salt dissolved in a solvent, where the phosphonium salt comprises:
a cation comprised of a 1:3:1 mole ratio of: $(CH_3CH_2CH_2)(CH_3)_3P/(CH_3CH_2CH_2)(CH_3CH_2)(CH_3)_2P/(CH_3CH_2CH_2)(CH_3CH_2)_2(CH_3)P$; and
an anion comprised of $CF_3BF_3^-$.

33. An electrochemical double layer capacitor (EDLC) comprising:
a positive electrode;
a negative electrode;
a separator between the positive electrode and the negative electrode; and
an electrolyte composition in contact with the positive electrode, the negative electrode, and the separator, wherein the electrolyte composition comprises:
a phosphonium salt dissolved in a phosphonium solvent, where the salt comprises:
a cation comprised of a 1:3:1 mole ratio of: $(CH_3CH_2CH_2)(CH_3)_3P/(CH_3CH_2CH_2)(CH_3CH_2)(CH_3)_2P/(CH_3CH_2CH_2)(CH_3CH_2)_2(CH_3)P$; and
an anion comprised of $BF_4^-$.

34. An electrochemical double layer capacitor (EDLC) comprising:
a positive electrode;
a negative electrode;
a separator between the positive electrode and the negative electrode; and
an electrolyte composition in contact with the positive electrode, the negative electrode, and the separator, wherein the electrolyte composition comprises:
a phosphonium salt dissolved in a solvent, where the phosphonium salt comprises:
a cation comprised of a 1:3:1 mole ratio of: $(CH_3CH_2CH_2)(CH_3)_3P/(CH_3CH_2CH_2)(CH_3CH_2)(CH_3)_2P/(CH_3CH_2CH_2)(CH_3CH_2)_2(CH_3)P$; and
an anion comprised of $PF_6^-$.

35. A hybrid energy storage system comprising an array of EDLCs according to claim 1 and an array of batteries.

* * * * *